(12) United States Patent
Tanoue et al.

(10) Patent No.: US 7,988,777 B2
(45) Date of Patent: Aug. 2, 2011

(54) AQUEOUS INK COMPOSITION AND URETHANE RESIN COMPOSITION FOR AQUEOUS INK COMPOSITION

(75) Inventors: Takeshi Tanoue, Nagano-ken (JP); Tsuyoshi Sano, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 190 days.

(21) Appl. No.: 11/794,002

(22) PCT Filed: Feb. 17, 2006

(86) PCT No.: PCT/JP2006/302883
§ 371 (c)(1),
(2), (4) Date: Jun. 25, 2007

(87) PCT Pub. No.: WO2006/088158
PCT Pub. Date: Aug. 24, 2006

(65) Prior Publication Data
US 2008/0022887 A1    Jan. 31, 2008

(30) Foreign Application Priority Data

Feb. 18, 2005 (JP) .................. 2005-042141
Mar. 9, 2005 (JP) .................. 2005-065926
May 10, 2005 (JP) .................. 2005-137394
May 10, 2005 (JP) .................. 2005-137395
Feb. 16, 2006 (JP) .................. 2006-039706
Feb. 16, 2006 (JP) .................. 2006-039707

(51) Int. Cl.
*C09D 11/00* (2006.01)
*C08G 18/08* (2006.01)
*C08L 75/00* (2006.01)

(52) U.S. Cl. ............... 106/31.6; 524/589

(58) Field of Classification Search ............ 524/589; 106/31.2
See application file for complete search history.

(56) References Cited

U.S. PATENT DOCUMENTS
4,320,170 A * 3/1982 Findlay .................. 428/336
(Continued)

FOREIGN PATENT DOCUMENTS
JP    09-124989    5/1997
(Continued)

OTHER PUBLICATIONS

Rhoplex WL-91 Technical data sheet, Rohm and Haas, 1998.*
Patent Abstracts of Japan and JPO computer English translation of JP 2004-315751 dated Nov. 11, 2004.
(Continued)

*Primary Examiner* — Mark Eashoo
*Assistant Examiner* — Liam J Heincer
(74) *Attorney, Agent, or Firm* — Ladas & Parry LLP

(57) ABSTRACT

An object of the present invention is to provide a black ink composition by which a recorded matter in which a fine surface defect on a recorded matter is effectively suppressed, can be obtained. For this object, the present invention is a black ink composition containing water, carbon black, and a water-soluble polyurethane resin, wherein when a content of carbon black is not less than 0.4% by weight and less than 1.5% by weight, a content of a solid matter of the water-soluble polyurethane resin is not less than 0.67-fold and not more than 2.5-fold a content of the carbon black and, when a content of the carbon black is less than 0.4% by weight, a content of a solid matter of the water-soluble polyurethane resin is not less than 7.5-fold a content of the carbon black.

29 Claims, 6 Drawing Sheets

U.S. PATENT DOCUMENTS

| | | | | |
|---|---|---|---|---|
| 5,262,464 | A * | 11/1993 | Koevenig et al. | 524/413 |
| 6,565,202 | B2 * | 5/2003 | Rose et al. | 347/100 |
| 6,676,738 | B2 * | 1/2004 | Sano et al. | 106/31.75 |
| 6,846,353 | B2 * | 1/2005 | Sano et al. | 106/31.6 |
| 7,513,944 | B2 * | 4/2009 | Sano et al. | 106/31.6 |
| 2003/0188665 | A1 * | 10/2003 | Sano et al. | 106/499 |
| 2003/0236321 | A1 * | 12/2003 | Sano et al. | 523/160 |
| 2004/0127601 | A1 * | 7/2004 | Sano et al. | 523/160 |

FOREIGN PATENT DOCUMENTS

| | | |
|---|---|---|
| JP | 10-204367 | 8/1998 |
| JP | 2000-001639 | 1/2000 |
| JP | 2003-335986 | 11/2003 |
| JP | 2004-225036 | 8/2004 |
| JP | 2004-225037 | 8/2004 |
| JP | 2004-315751 | 11/2004 |
| JP | 2005-089713 | 4/2005 |
| JP | 2005-255959 | 9/2005 |

OTHER PUBLICATIONS

Patent Abstracts of Japan and JPO computer English translation of JP 2005-255959 dated Sep. 22, 2005.

Patent Abstracts of Japan and JPO computer English translation of JP 2004-225036 dated Aug. 12, 2004.

Patent Abstracts of Japan and JPO computer English translation of JP 2004-225037 dated Aug. 12, 2004.

Patent Abstracts of Japan and JPO computer English translation of JP 2000-001639 dated Jan. 7, 2000.

Patent Abstracts of Japan and JPO computer English translation of JP 10-204367 dated Aug. 4, 1998.

Patent Abstracts of Japan and JPO computer English translation of JP 09-124989 dated May 13, 1997.

Patent Abstracts of Japan and JPO computer English translation of JP 2003-335986 dated Nov. 28, 2003.

Patent Abstracts of Japan and JPO computer English translation of JP 2005-089713 dated Apr. 7, 2005.

* cited by examiner

AQUEOUS INK COMPOSITION AND URETHANE RESIN COMPOSITION FOR AQUEOUS INK COMPOSITION

TECHNICAL FIELD

The present invention relates to an aqueous ink composition, more particularly, a black ink composition, and an ink set comprising this black ink composition, a recording method using the ink set, as well as a material recorded with the ink set, as well as a urethane resin composition for an aqueous ink composition.

BACKGROUND ART

For the purpose of obtaining a better monochromatic image or a gray scale by an ink jet recording method or the like, an ink set comprising two kinds or three kinds or more of black inks having different carbon black concentrations is used in some cases. As this kind of black ink, a black ink composition defining a carbon black concentration, and a solid matter concentration of a prescribed amount of a fine particle emulsion corresponding to the carbon black concentration is disclosed (JP-A-2004-225036, JP-A-2004-225037). Among such the black ink compositions, in a black ink composition having a low pigment concentration, a resin content is higher than that of a normal aqueous ink composition. According to these black ink compositions, phenomenon in which reflected light generated by reflection of a fluorescent lamp or natural light from an image recorded using a dilute black ink composition produces golden gloss, and phase shift in an image recorded using a black ink composition for intermediate gradation (phenomenon in which, by changing an observation angle of an observer relative to a recorded image printed on a recorded medium or by changing an irradiation angle of a light source, original lightness of gray is observed to be shifted to a black side or a white side, at a part of a recorded region) can be suppressed.

In addition, as an ink used in an ink jet printer or the like, an aqueous ink composition using a pigment is known, and a pigment is excellent in light resistance and water resistance as compared with a dye, and is utilized as a coloring agent of an ink which allows for the better color developed state for a longer period of time after recording. Since the pigment is generally insoluble in water, when the pigment is used in an ink, it is necessary to mix the pigment with a dispersant such as a resin, to stably disperse this in water. For stably dispersing the pigment in water, it is necessary to study a kind and a particle diameter of the pigment, a kind of a resin used, and a dispersing means, and many dispersing methods and ink compositions for ink jet recording have previously been proposed. JP-A-2000-1639 describes that the discharge stability and the film physical properties such as friction resistance can be improved using a polyurethane resin as an aqueous resin in an aqueous ink composition.

DISCLOSURE OF THE INVENTION

In a step from adhesion of an ink composition to form an image on a recording medium such as a recording paper to discharge from a printer, a recorded image is contacted with a recorded matter contact member such as a recording paper holding foot equipped in a printer in some cases. A recorded paper holding member is a gear-like rotation body in which an image contact part is a fine projection, in view of influence on an image, in many cases. The present inventors investigated matters recorded with the previous black ink composition having the aforementioned prescribed composition, and found that an extremely fine concave dot is linearly formed in a recorded matter after continuous printing, in some cases. Since such the finding on a recorded matter has not been perceived in other ink composition, this was extensively studied to find that a concave dot is a contact trace of a recorded matter contact member such as a recording paper holding member.

Accordingly, an object of the present invention is to provide a black ink composition and an ink set which can obtain a recorded matter in which a fine surface defect on the recorded matter is effectively suppressed, and a recording method and a recorded matter using the ink set. Another object of the present invention is to provide a black ink composition and an ink set which can obtain a recorded matter in which a surface defect is effectively suppressed and, at the same time, which has a better monochromatic image and a gray scale image, and a recording method and a recorded matter using the ink set.

In addition, in an aqueous ink composition, when a pigment dispersion is prepared using a resin dispersible in water such as a polyurethane resin by the previous method and, thereafter, a vehicle of an ink containing a water-soluble organic solvent is mixed into the pigment dispersion to prepare an aqueous ink composition such as an ink, a viscosity of an ink is rapidly increased immediately after preparation and, thereafter, a viscosity of an ink is gradually reduced in some cases. Such the change in a viscosity of an ink may deteriorate storage stability and, additionally, may deteriorate stability of discharge of an ink from a nozzle when prepared into an ink composition for an ink jet printer, in some cases. Furthermore, this is all the more in an ink having a large resin content such as the aforementioned black ink composition.

Accordingly, one object of the present invention is to provide a polyurethane resin composition which can effectively avoid or suppress a change in physical properties such as a change in a viscosity of an aqueous ink composition having a high polyurethane resin content such as the aforementioned black ink composition, and a process for producing the same. Another object of the present invention is to provide an aqueous ink composition which can effectively avoid or suppress a change in physical properties such as a change in a viscosity, and a process for producing the same.

The present inventors intensively studied and, as a result, found out that, by making such the black ink composition containing a prescribed amount of a water-soluble polyurethane resin, golden gloss and phase shift can be suppressed or avoided and, at the same time, occurrence of a surface defect on a recorded matter can be avoided or suppressed.

In addition, the present inventors variously studied a change in a viscosity of an ink composition and, as a result, found out a change in physical properties such as a viscosity is generated by mixing of a polyurethane resin and a water-soluble organic solvent at preparation of an aqueous ink composition and, further, by mixing a polyurethane resin and a water-soluble organic solvent in advance and leaving the mixture for a given time to prepare a polyurethane resin composition and adding the polyurethane resin composition to a pigment dispersion or other ink components in a step of producing an aqueous ink composition, a change in physical properties such as a viscosity can be suppressed or avoided to obtain an aqueous ink composition excellent in stability.

According to these findings, regarding an aqueous ink composition including a black ink composition, and production thereof, the following means is provided.

The present invention provides a black ink composition comprising water, carbon black and a water-soluble polyurethane resin, wherein when a content of the carbon black is not less than 0.4% by weight and less than 1.5% by weight, a content of a solid matter of the water-soluble polyurethane resin is not less than 0.67-fold and not more than 2.5-fold a content of the carbon black, and when a content of the carbon black is less than 0.4% by weight, a content of a solid matter of the water-soluble polyurethane resin is not less than 7.5-fold a content of the carbon black.

The water-soluble polyurethane resin may have an acid value of not less than 10 and not more than 300, a weight average molecular weight of not less than 100 an not more than 200000, and a glass transition temperature of not lower than −50° C. and not higher than 200° C., and a maximum particle diameter of the resin may be not greater than 0.3 μm. In this composition, when a content of the carbon black is not less than 0.4% by weight and less than 1.5% by weight, a solid matter of the water-soluble polyurethane resin may be not less than 0.2% by weight and not more than 4% by weight and, when a content of the carbon black is less than 0.4% by weight, a solid matter of the water-soluble polyurethane resin may be not less than 1% by weight and not more than 10% by weight.

In one preferable embodiment of the present invention, the composition contains a fine particle emulsion. In this preferable embodiment, the fine particle emulsion may be selected from a polyalkylene-type emulsion. In this case, furthermore, a total content of a solid matter of the water-soluble polyurethane resin and a solid matter of the fine particle emulsion may be not less than 0.5% by weight and not more than 20% by weight.

The present invention provides a black ink composition comprising water and carbon black, for use in combination with other black ink composition having a higher carbon black concentration than a carbon black concentration of the black ink composition, wherein the composition contains a water-soluble polyurethane resin, and a content of a solid matter of the water-soluble polyurethane resin is not less than 0.2% by weight and not more than 10% by weight.

In the black ink composition of the invention, a solid matter content of the water-soluble polyurethane resin may be not less than 0.5% by weight and not more than 5% by weight. The composition preferably contains a fine particle emulsion, and a content of a solid matter of the water-soluble polyurethane resin is preferably not less than 40% by weight and not more than 80% by weight of a total amount of the water-soluble polyurethane resin and a solid matter of the fine particle emulsion. The other black ink composition preferable contains not less than 1.5% by weight of carbon black. The other black ink composition may contain not less than 6% by weight of carbon black. In this case, the other black ink composition may contain a self-dispersion carbon black.

In the ink composition of the present invention, it is preferable that a content of the carbon black is not less than 0.4% by weight and less than 1.5% by weight, and a content of a solid matter of the water-soluble polyurethane resin is not less than 0.2% by weight and not more than 4% by weight. It is also preferable that a content of the carbon black and a content of a solid matter of the water-soluble polyurethane resin is not less than 1% by weight and not more than 10% by weight.

In another preferable embodiment of any of ink compositions of the present invention, at least a part of the water-soluble polyurethane resin contains a water-soluble polyurethane resin, a water-soluble organic solvent and water, and is added as a polyurethane resin composition having no substantial change in a viscosity.

In this preferable embodiment, the water-soluble organic solvent is preferably one or two or more kinds of diols. The composition preferably contains the water-soluble organic solvent at not less than 10 wt % and not more than 50 wt % relative to a solid matter of the water-soluble polyurethane resin. The water-soluble organic solvent preferably contains one or two or more kinds of diols and, one or two or more kinds of triols. In this case, the triols preferably contain glycerin.

The polyurethane resin composition may contain the triols at not less than 10 wt % and not more than 100 wt % relative to a solid matter of the water-soluble polyurethane resin, and the diols may contain 1,2-hexanediol and the triols may contain glycerin. In this case, the polyurethane resin composition may contain not less than 0.5 wt % and not more than 20 wt % of the water-soluble organic solvent, and not less than 5 wt % and not more than 50 wt % of the water-soluble polyurethane resin. In this case, the polyurethane resin composition is preferably obtained by aging g accompanying with heating. In this case, a viscosity change rate (ΔV) of the ink composition according to any one of claims 15 to 24 obtained based on the following equation (1) from viscosities, obtained by sealing a prescribed amount of the polyurethane resin composition, allowing this to stand still at a constant temperature of 70° C.±3° C. for 24 hours, and measuring viscosities at initiation of the allowing to stand still and after completion of the allowing to stand still, is not more than 2.5%.

$$\Delta V(\%) = |V - V_0|/V_0 \times 100 \tag{1}$$

The black ink compositions may contain a coloring agent for a complementary color. The composition may be an ink composition for ink jet recording.

The present invention provides an ink set comprising:

one or two or more kinds of black ink compositions as defined in any of claims 1 to 26, and other black ink composition having a higher carbon black concentration than a carbon black concentration of these black ink compositions.

In one preferable embodiment of the ink set of the present invention, any of the one or two or more kinds of black ink compositions as defined above is a black ink composition having a carbon black content of less than 0.4% by weight, and a black ink composition having a carbon black content of not less than 0.4% by weight and less than 1.5% by weight, and the other black ink composition is a composition having a carbon black content of not less than 1.5% by weight.

In any of the ink sets of the present invention, the other black ink composition may be a composition containing not less than 6% by weight of carbon black. In this case, the other black ink composition may be a composition containing self-dispersion carbon black.

In another preferable embodiment of the ink sets of the present invention, the set contains a cyan ink composition, a magenta ink composition, and a yellow ink composition. In this case, the set preferably contains a light cyan ink composition, and a light magenta ink composition.

In this case, further, the color ink composition other than the black ink composition may contain a water-soluble polyurethane resin. In this case, at least a part of the water-soluble polyurethane resin in the color ink composition preferably contains a water-soluble polyurethane resin, a water-soluble organic solvent and water, and is added as a polyurethane resin composition having no substantial change in a viscosity.

The present invention provides a recording method of discharging droplets of an ink composition, and adhering the droplets to a recording medium to form an image, comprising using any of ink sets as defined above.

The present invention provides a recorded matter having an image on a recording medium, comprising an image consisting of an adhesion layer of an ink composition contained in any of ink sets as defined above on the recording medium.

The present invention provides a polyurethane resin composition for an aqueous ink composition, comprising a water-soluble polyurethane resin, a water-soluble organic solvent and water, wherein the composition has no substantial change in a viscosity. In the polyurethane resin composition of the present invention, the water-soluble organic solvent is preferably one or two or more kinds of diols. The water-soluble organic solvent may be 1,2-hexanediol. The composition may contain the water-soluble organic solvent at not less than 10 wt % and not more than 50 wt % relative to a solid matter of the water-soluble polyurethane resin.

In the polyurethane resin composition of the present invention, the water-soluble organic solvent may contain one or two or more kinds of diols, and one or two or more kinds of triols. In this case, the triols preferably contain glycerin. In this case, the composition preferably contains the triols at not less than 10 wt % and not more than 100 wt % relative to a solid matter of the water-soluble polyurethane resin. In this case, the diols contain 1,2-hexanediol and the triols contain glycerin.

In the polyurethane resin composition of the present invention, the water-soluble organic solvent may contain one or two or more kinds of diols, and one or two or more kinds of triols.

In this case, further, the diols contain 1,2-hexanediol and the triols contain glycerin.

In the polyurethane resin composition of the present invention, the composition may contain not less than 0.5 wt % and not more than 20 wt % of the water-soluble organic solvent, and not less than 5 wt % and not more than 50 wt % of the water-soluble polyurethane resin. The composition may be obtained by aging accompanying with heating. A viscosity change rate ($\Delta V$) obtained based on the following equation (1) from viscosities, obtained by sealing a prescribed amount of the polyurethane resin composition, allowing this to stand still at a constant temperature of 70° C.±3° C. for 24 hours, and measuring viscosities at initiation of the allowing to stand still and after completion of the allowing to stand still, may be not more than 2.5%.

$$\Delta V(\%) = |V - V_0|/V_0 \times 100 \quad (1)$$

The aqueous ink composition is a black ink composition containing carbon black, and may be an aqueous ink composition in which, when a content of the carbon black is not less than 0.4% by weight and less than 1.5% by weight, a content of a solid matter of the water-soluble polyurethane resin is not less than 0.67-fold and not more than 2.5-fold a content of the carbon black and, when a content of the carbon black is less than 0.4% by weight, a content of a solid matter of the water-soluble polyurethane resin is not less than 7.5-fold a content of the carbon black. It is preferable to use this for preparing an ink composition of a black ink set having shades.

The present invention provides a process for producing a polyurethane resin composition for an aqueous ink composition, comprising an aging step of reducing a viscosity of a mixture containing a water-soluble polyurethane resin, a water-soluble organic solvent and water. In this producing process of the present invention, the aging step may be a step of allowing the mixture to stand still under condition of not lower than 60° C. and not higher than 80° C. and not shorter than 120 hours and not longer than 216 hours. In this case, the aging step is preferably a step of allowing the mixture to stand still. In this producing process of the present invention, the water-soluble organic solvent may be one or two or more kinds of diols, and one or two or more kinds of triols.

The present invention provides a polyurethane resin composition for an aqueous ink, obtained by a process for producing a polyurethane resin composition for an aqueous ink as defined above.

The present invention provides a producing process for an aqueous ink composition, comprising a step of preparing the aqueous ink composition using the following (a) to (c):
(a) a pigment dispersion solution containing water and a pigment,
(b) a polyurethane resin composition containing a water-soluble polyurethane resin, a water-soluble organic solvent and water, and having no substantial change in a viscosity, and
(c) a component of the aqueous ink composition other than the (a) and (b).

The (a) pigment dispersion solution may contain a water-dispersible styrene-acrylic acid resin.

In this producing process of the present invention, the aqueous ink composition may be a black ink composition containing carbon black, and when a content of the carbon black is not less than 0.4% by weight and less than 1.5% by weight, a content of a solid matter of the water-soluble polyurethane resin is not less than 0.67-fold and not more than 2.5-fold and, when a content of the carbon black is less than 0.4% by weight, a content of a solid matter of the water-soluble polyurethane resin is not less than 7.5-fold a content of the carbon black.

The present invention provides a color ink composition comprising a colored pigment, wherein when a content of the colored pigment is not less than 1.5% by weight and less than 7% by weight, a content of a solid matter of the water-soluble polyurethane resin is not less than 0.04-fold and not more than 0.35-fold of the colored pigment and, when a content of the colored pigment is not less than 0.5% by weight and less than 1.5% by weight, a content of a solid matter of the water-soluble polyurethane resin is not less than 0.67-fold and not more than 2.5-fold of the colored pigment, and wherein the color ink composition contains a polyurethane resin composition as defined above.

The present invention provides an aqueous ink composition, obtained by any of processes for producing an aqueous ink composition. The present invention provides an aqueous ink composition, obtained by mixing a pigment dispersion solution with any of polyurethane resin compositions as defined above.

BEST MODE FOR CARRYING OUT THE INVENTION

Figure 1:
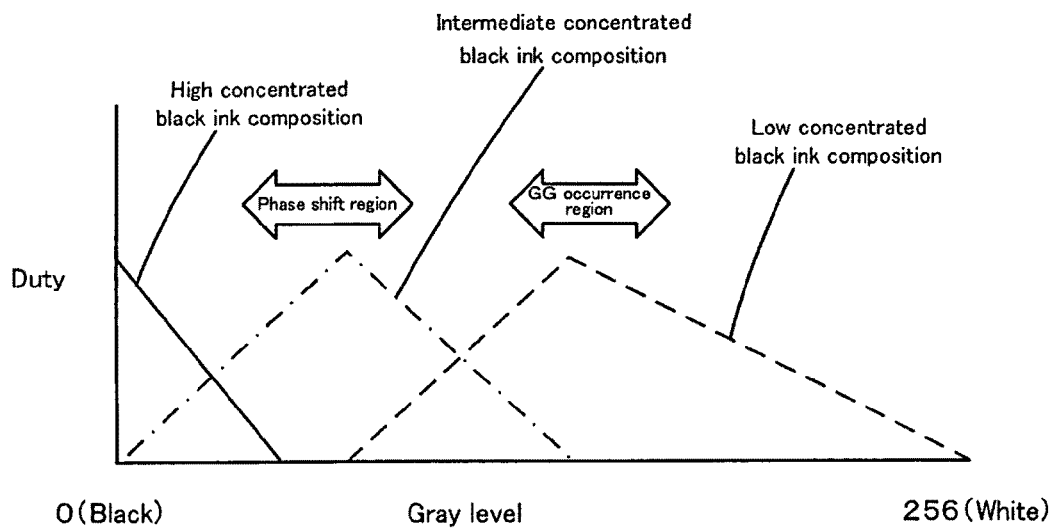
FIG. 1 is a graph schematically showing a region where phase shift and golden gross occur when a gray scale is printed using three kinds of black ink compositions.

An embodiment of the present invention includes various aspects such as a black ink composition, an ink set, a recording method using the ink set and a recorded matter. These various invention aspects are all related to a black ink composition. According to the black ink composition of the present invention, a recorded matter having the better state in which a surface defect or the like is avoided or suppressed can be provided by inclusion of a prescribed amount of a water-soluble polyurethane resin. In addition, the black ink composition of the present invention can provide a recorded matter provided with a monochromic image or a gray scale image in which a surface defect is avoided or suppressed and, at the same time, by inclusion of a prescribed amount of carbon black, golden gloss and phase shift are effectively avoided or suppressed. According to the black ink composition of the present invention, by inclusion of a prescribed amount of a water-soluble urethane resin, adherability of a resin component of an ink composition to a recorded matter contacting member or the like is reduced, thereby, a disadvantage such as solidification of an adhered material and expansion of a contact member is suppressed. For this reason, even when contact of a contact member with a recorded matter is repeated, a contact part is not expanded, and a trace of contact is hardly left. In addition, it is thought that the black ink composition, by inclusion of a prescribed amount of a water-soluble urethane resin, can retain flowability (viscosity) to such an extent that, even when a contact member is contacted with a black ink composition before solidification on a recorded matter, the contact trace does not remain, for a certain term.

In addition, other embodiment of the present invention includes various aspects such as a polyurethane resin composition containing a water-soluble polyurethane resin, a water-soluble organic solvent and water, and having no substantial change in viscosity, a process method for producing the composition, a process method for producing an aqueous ink composition using the composition, and an aqueous ink composition. By preparing an aqueous ink composition using the composition of the present invention, an aqueous ink composition in which a change in viscosity is avoided or suppressed, is obtained. The polyurethane resin composition of the present invention can be obtained, preferably, by performing an aging step of reducing viscosity of a mixture containing a water-soluble polyurethane resin, a water-soluble organic solvent and water. In addition, an aqueous ink composition can be prepared by using the polyurethane resin composition of the present invention, a pigment dispersion containing water and a pigment, and remaining components. By mixing the polyurethane resin composition of the present invention into the pigment dispersion, an aqueous ink in which a change in viscosity is avoided or suppressed, can easily be obtained. When the thus produced aqueous ink composition is used as an ink composition for an ink jet printer, an ink in which stability of discharge from a nozzle is maintained, can be provided. In addition, according to such the aqueous ink composition, since it is not necessary to wait stabilization of viscosity before supply to markets, effective production and supply become possible.

Hereinafter, for convenience of explanation, various embodiments of a black ink composition, an ink set, a recording method and a recorded matter which are the first embodiment of the present invention will be explained first and, thereafter, a polyurethane resin composition and the like which are the second aspect will be explained. Although the second embodiment of the present invention is suitable for preparing a black ink composition which is the first embodiment of the present invention, the second embodiment can be generally used in an aqueous ink composition.

(Black Ink Composition)

The black ink composition of the present invention is a black ink composition which is used in combination with one or two or more kinds of other black ink compositions in some cases. By such the combination, "phase shift" and "golden gloss" can be avoided or suppressed.

The "phase shift" is phenomenon in which, when an observation angle of an observer is changed, or an irradiation angle of a light source is changed relative to a recorded image printed on a recording medium, lightness of gray is shifted at a part of a region recorded with a black ink composition for intermediate gradation, and a color is observed to be shifted to a black side or a white side than the original gray, as described above. When phase shift occurs, since the region is seen to be a fainter gray than the original gray, is seen to be a darker gray than the original gray, or becomes completely black, it becomes very difficult to distinguish a contour of an image. Such the phenomenon easily occurs when a recorded image is recorded, particularly, on a recording medium of a luster system such as a gloss tone and a semigloss tone, and is relatively unlikely to occur on a recording medium of a mat tone.

A region where phase shift occurs will be explained based on FIG. 1. As schematically shown in FIG. 1, by changing a use ratio of a concentrated black ink composition K1, an intermediate gradation black ink composition K2, and a pale black ink composition K3, a gray scale from black to white can be suitably made. Like this, when three kinds of black ink compositions K1, K2 and K3 are used, stability of gray balance, and methamerism can be dramatically improved, as described above. However, as shown in a "phase shift occurrence region" of FIG. 1, phase shift occurs mainly in a region recorded with the intermediate gradation black ink composition K2.

The "phase shift occurrence region" extends to a region of a gray level of about 30 to about 60 around a center of a region of a gray level of about 35 to about 55 (wherein a gray level of 0 is absolute black, and a gray level of 255 is absolute white). And, a lightness range of the "phase shift occurrence region" extends to a region of about 20 to about 35 around a central region of about 25 to about 30. When a black and white monochromic image is recorded using two or more kinds of black ink compositions, a black ink composition used in recording a phase shift occurrence region is usually an intermediate gradation black ink composition having carbon black at an amount of not less than 0.4% by weight and not more than 1.5% by weight relative to a total weight of the black ink composition (hereinafter, a black ink composition containing carbon black in the concentration range is particularly referred to as first black ink composition).

On the other hand, "golden gloss" (hereinafter, abbreviated as GG in some case) is phenomenon in which, when an observation angle of an observer is changed, or an irradiation angle of a light source is changed relative to a recorded image printed on a recording medium, a part of a region recorded with a pale black ink composition glitters gold, as described above. According to study of the present inventor, golden gloss occurs only at a specified region. When this golden gloss occurs, it becomes impossible to distinguish a color tone of a recorded matter not only in the occurrence region but also in a region in vicinity of it, and it becomes very difficult to distinguish even a contour of a recorded image.

A region, where golden gloss occurs, is mainly a region recorded with a pale black ink composition K3 as shown in the "GG occurrence region" of FIG. 1 (i.e. golden gloss occurrence region). The "GG occurrence region" extends to a region of about 90 to about 160 around a center of a region of a gray level of about 100 to about 140 (wherein a gray level of 0 is absolute black, and a gray level of 255 is absolute white) And, a lightness range of the "GG occurrence region" extends to a region of about 40 to about 70 around a central region of about 50 to about 60. When a black and white monochromic image is recorded using two or more kinds of black ink compositions, a black ink composition used in recording the GG occurrence region is usually a black ink composition of a relatively low concentration having carbon black at an amount of less than 0.4% by weight (particularly, an amount of not less than 0.01% by weight and less than 0.4% by weight) relative to a total weight of the black ink composition (hereinafter, a black ink composition containing carbon black of the concentration range is particularly referred to as second black ink composition).

(Water-Soluble Polyurethane Resin)

The present black ink composition contains a water-soluble polyurethane resin. The water-soluble polyurethane resin is not particularly limited, but a water-soluble polyurethane resin obtained by reacting a diisocyanate compound and a diol compound can be used. Examples of the diisocyanate compounds include alicyclic diisocyanate compounds such as hexamethylene diisocyanate, 2,2,4-trimethylhexamethylene diisocyanate, hydrogenated xylylene diisocyanate, 1,4-cyclohexane diisocyanate, and 4,4-dicyclohexylmethane diisocyanate, aromatic aliphatic diisocyanate compounds such as xylylene diisocyanate and tetramethylxylylene diisocyanate, aromatic diisocyanate compounds such as toluoylene diisocyanate and phenylmethane diisocyanate, and diisocyanates obtained by modifying them (carbodiimide, urethodione, urethoimine-containing modified diisocyanates, etc.).

Examples of the diol compounds include diol compounds obtained by (co)polymerizing alkylene oxide such as ethylene oxide and propylene oxide, and heterocyclic ether such as tetrahydrofuran. Specific examples of such the diol compounds include polyether diols such as polyethylene glycol, polypropylene glycol, polytetramethylene ether glycol, and polyhexamethylene ether glycol, polyester diols such as polyethylene adipate, polybutylene adipate, polyneopentyl adipate, poly-3-methylpentyl adipate, polyethylene/butylene adipate, and polyneopentyl/hexyl adipate, polylactone diols such as polycaprolactone diol, and polycarbonate diol. Among them, one or more kinds of a polyether system, a polyester system and a polycarbonate system are preferable.

In addition to those described above, a diol compound having an acidic group such as a carboxylic acid group and a sulfonic acid group can be also used, and specific examples thereof include dimethylol acetic acid, dimethylol propionic acid, and dimethylol butyric acid. Among them, dimethylol propionic acid is preferable. Two or more kinds of these diol compounds may be used jointly.

Upon synthesis of a water-soluble polyurethane-based resin, a low-molecular polyhydroxy compound may be added. Examples of the low-molecular polyhydroxy compound include glycol used as a raw material of polyesterdiol, alkylene oxide low mole-adduct, trivalent alcohols such as glycerin, trimethylolethane, and trimethylolpropane, and alkylene oxide low mole-adduct thereof. And, the thus obtained urethane prepolymer can be water-extended after neutralization of an acid group derived from dimethylolalkanoic acid, or while neutralizing, or chain-extended with di(tri)amine. Examples of polyamine used upon chain extension include hexamethylenediamine, isophoronediamine, hydrazine, piperazine and the like, and two or more kinds of them may be used jointly.

Examples of the water-soluble polyurethane resin include desirably polyether-based polyurethane resins, polyester-based polyurethane resins, and polycarbonate-based polyurethane resins obtained by using polyether-based, polyester-based, and polycarbonate-based diols as a diol compound. A form of the water-soluble polyurethane resin is not particularly limited. Representative examples include an emulsion type, for example, a self-emulsification emulsion, and a self-stabilization type. Particularly, among the aforementioned compounds, polyurethane resins in which diol having an acidic group such as a carboxylic acid group and a sulfonic acid group is used, a low-molecular polyhydroxy compound is added, or urethane resins introducing an acid group, inter alia, urethane resins having carboxyl group are desirable. Furthermore, it is desirable to crosslink these functional groups such as a carboxyl group by crosslinking treatment described later, from a viewpoint of improvement in glossiness, improvement in friction resistance and the like.

As the water-soluble polyurethane resin, water-soluble polyurethane resins which have been neutralized, may be used. Examples of a base used in neutralization include alkylamines such as butylamine and triethylamine, alkanolamines such as monoethanolamine, diethanolamine, and triethanolamine, and inorganic bases such as morpholine, ammonia, and sodium hydroxide.

From a viewpoint of suppression of a surface defect and golden gloss or phase shift on a recorded matter, an acid value of the polyurethane resin is preferably 10 to 300, further preferably 20 to 100. The acid value is a mg amount of necessary KOH for neutralizing a 1 g of a resin. In addition, from a viewpoint of suppression of a surface defect and golden gloss or phase shift on a recorded matter, a weight average molecular weight (Mw) before crosslinking of the polyurethane resin is preferably 1000000 to 200000, more preferably 10000000 to 50000. Mw is measured, for example, with GPC (gel permeation chromatography). From a viewpoint of suppression of a surface defect and golden gloss or phase shift on a recorded matter, a glass transition temperature (Tg; measured according to JIS K6900) of the polyurethane resin is preferably −50 to 200° C., further preferably −50 to 100° C. Further, the polyurethane resin is dispersed in a fine particle manner in some cases, or adsorbed on a pigment in some cases in the pigment dispersion solution of the present invention, and from a viewpoint of suppression of a surface defect and golden gloss or phase shift on a recorded matter, a maximum particle diameter of the polyurethane resin is preferably not more than 0.3 μm, and an average particle diameter is further preferably not more than 0.2 μm (further preferably not more than 0.1 μm). The average particle diameter is an average value of a molecular diameter (volume 50% diameter) as a particle which is actually formed by the pigment in a dispersion solution, and can be measured, for example, using Microtrac UPA (Microtrac Inc.).

Preferable examples of the water-soluble polyurethane resin include NeoRez R-960 (manufactured by Zeneca), NeoRez R-989 (manufactured by Zeneca), NeoRez R-9320 (manufactured by Zeneca), NeoRad NR-440 (manufactured by Zeneca), Hydran AP-30 (manufactured by Dainippon Ink and Chemicals, Incorporated), Hydran APX-601 (manufactured by Dainippon Ink and Chemicals, Incorporated), Hydran SP-510 (manufactured by Dainippon Ink and Chemicals Incorporated), Hydran SP-97 (manufactured by Dainippon Ink and Chemicals, Incorporated), Elastron MF-60 (manufactured by Dai-ichi Kogyo Seiyaku Co., Ltd.), Elastron MF-9 (manufactured by Dai-ichi Kogyo Seiyaku Co., Ltd.), M-1064 (manufactured by Dai-ichi Kogyo Seiyaku Co., Ltd.), Izelax S-1020 (manufactured by Hodogaya Chemical Co., Ltd.), Izelax S-1040 (manufactured by Hodogaya Chemical Co., Ltd.), Izelax S-1085C (manufactured by Hodogaya Chemical Co., Ltd.), Izelax S-4040N (manufactured by Hodogaya Chemical Co., Ltd.), Neothane UE-5000 (manufactured by Toagosei Co., Ltd.), RU-40 series (manufactured by Stal Japan), U Coat UWS-145 (manufactured by Sanyo Chemical Industries, Ltd.), Parmalin UA-150 (manufactured by Sanyo Chemical Industries, Ltd.), WF-41 series (manufactured by Stal Japan), and WPC-101 (manufactured by Japan Urethane Industry).

In the black ink composition of the present invention, an aged water-soluble polyurethane resin composition can be used together with the water-soluble polyurethane resin, or as a water-soluble polyurethane resin. An aged polyurethane resin composition will be explained in detail in a later section.

It is preferable that the black ink composition of the present invention contains the water-soluble polyurethane resin at not less than 0.2% by weight and not more than 10% by weight as a resin solid matter. Within this range, adherability and a viscosity of the black ink composition can be effectively reduced, and a surface defect on a recorded matter can be avoided or suppressed. In addition, phase shift and golden gloss can be further effectively avoided or suppressed simultaneously. The content is more preferably not less than 0.5% by weight and not more than 5% by weight.

Particularly, in the first black ink composition, it is preferable that a solid matter of the water-soluble polyurethane resin is not less than 0.2% by weight and not more than 4% by weight. Within this range, a surface defect can be effectively avoided or suppressed in a carbon black concentration region of the first black ink composition. And, phase shift can be also effectively avoided or suppressed. The content is more preferably not less than 0.5% by weight and not more than 2% by weight. When the content is not less than 0.5% by weight, a resin layer having a resin film of a suitable thickness can be imparted to an ink layer formed of the first black ink composition to avoid or suppress golden gloss more. When the content is not more than 2% by weight, it is easy to retain a viscosity of the first black ink composition in a suitable range, and discharge stability can be maintained. Further preferably, the content is not more than 1.5% by weight.

In addition, in the second black ink composition, it is preferable that a solid matter of the water-soluble polyurethane resin is not less than 1% by weight and not more than 10% by weight. Within this range, a surface defect can be effectively avoided or suppressed at a carbon black concentration region of the second black ink composition. In addition, golden gloss can be also effectively avoided or suppressed. More preferably, the content is not less than 2% by weight and not more than 6% by weight. When the content is not less than 2% by weight, a resin layer having a resin film of a suitable thickness can be imparted to an ink layer formed of the second black ink composition to avoid or suppress golden gloss more and, when the content is not more than 6% by weight, a viscosity of the second black ink composition can be easily retained in a suitable range, and discharge stability can be maintained. Further preferably, the content is not more than 4% by weight.

Further, for example, when the first black ink composition and the second black ink composition and, other black ink composition having a high carbon black concentration (e.g. not less than 1.5% by weight) are used by combining them, in a relationship between the first black ink composition and the second black ink composition, it is preferable that a solid matter concentration of a water-soluble polyurethane resin in the second black ink composition is higher than the first solid matter concentration. If an absolute amount of a solid matter of the water-soluble polyurethane is large when a content of carbon black is small, an ink layer provided with a resin film having a stable thickness can be formed. A resin solid matter concentration of the water-soluble polyurethane resin of the second black ink composition is preferably 2-fold or more, more preferably 3-fold or more a solid matter concentration of the same resin of the first black ink composition. In view of a difference in a carbon black concentration between the first black ink composition and the second ink composition, when the concentration ratio is not less than 2-fold, a resin film of a stable thickness can be formed, and a surface defect, phase shift and golden gloss on a recorded matter can be effectively avoided or suppressed in each composition, regardless of a carbon black concentration.

In addition, it is preferable that a solid matter of the water-soluble polyurethane resin is not less than 0.67-fold and not more than 2.5-fold a carbon black content, in the first black ink composition. Within a concentration ratio of this range, a surface defect on a recorded matter can be suppressed while phase shift is avoided or suppressed. The ratio is more preferably not less than 1.0-fold, further preferably not less than 1.2-fold. And, the ratio is more preferably not more than 2.0-fold, further preferably not more than 1.6-fold.

In addition, in the second black ink composition, it is preferable that a solid matter of a water-soluble polyurethane resin is not less than 7.5-fold a carbon black content. When the ratio is not less than 7.5-fold, a surface defect on a recorded matter can be suppressed while golden gloss is avoided or suppressed. The ratio is preferably not less than 10-fold, further preferably not less than 12-fold, most preferably not less than 13-fold.

(Fine Particle Emulsion)

The black ink composition of the present invention may contain a fine particle emulsion. The fine particle emulsion which can be contained in the black ink composition of the present invention can take a form of an aqueous dispersion solution in which a dispersion medium is water, and a dispersoid is a polymer fine particle. A lowest film forming temperature (MFT) of a polymer fine particle contained in this fine particle emulsion is not particularly limited, but is preferably not higher than 25° C., more preferably 0 to 25° C., further preferably 10 to 20° C. MFT is measured according to JIS K6800. By printing on a recording medium using the ink composition of the present invention containing an emulsion having MFT in the above range, a protective film covering a printed surface is automatically formed at room temperature.

A glass transition temperature (Tg) of the polymer fine particle contained in the fine particle emulsion is preferably −15 to 10° C., further preferably −5 to 5° C. from a viewpoint that MFT of the emulsion is adjusted in the above range. Tg is measured according to JIS K6900. Examples of other method of adjusting MFT of the emulsion in the above range include a method of using a commercially available MFT decreasing agent.

The polymer fine particle has an average particle diameter of preferably 5 to 200 nm, further preferably 5 to 100 nm from a viewpoint of dispersion stability in the ink composition.

In addition, the polymer fine particle preferably has a hydrophilic part and a hydrophobic part. A structure of the polymer fine particle may be any of a single phase structure, a plural phase structure (core shell structure) and the like. The core shell structure is enough that it is a structure in which different two or more kinds of polymers are present in the phase-separated state, and may be, for example, a structure in which a shell part completely covers a core part, a structure in which a shell part covers a part of a core part, a structure in which a part of a polymer in a shell part forms a domain in a polymer in a core part, or a multilayer structure of 3 or more layers, in which one or more layers having different compositions are contained between a core part and a shell part.

As the polymer fine particle, a fine particle in which a core part consists of a polymer having an epoxy group, and a shell part consists of a polymer having a carboxyl group, is preferable when the core shell structure is used. By inclusion of such the polymer fine particle in an ink composition, since an epoxy group of the core part and a carboxyl group of the shell part are bound to form a network structure at formation of the protective film, a strength of the protective film can be improved.

In addition, it is preferable that the polymer fine particle has not less than 1% by weight and not more than 10% by weight of a structure derived from an unsaturated vinyl monomer having a carboxyl group, and has not less than 0.2% by weight and not more than 4% by weight of a structure crosslinked with a crosslinking monomer having preferably 2 or more, further preferably 3 or more polymerizable double bonds (structure derived from crosslinking monomer). By inclusion of such the polymer fine particle in an ink composition, since it becomes difficult to wet a nozzle plate surface with the ink, flight turning of ink droplets can be prevented, and discharge stability can be improved more.

Examples of the unsaturated vinyl monomer having a carboxyl group include acrylic acid, methacrylic acid, itaconic acid, fumaric acid, maleic acid and the like, and methacrylic acid is particularly preferable.

Examples of the crosslinking monomer include diacrylate compounds such as polyethylene glycol acrylate, triethylene glycol diacrylate, 1,3-butylene glycol diacrylate, 1,6-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, and 2,2-bis(4-acryloxydiethoxyphenyl)propane; triacrylate compounds such as trimethylolpropane triacrylate, trimethylolethane triacrylate, and tetramethylolmethane triacrylate; tetraacrylate compounds such as ditrimethylol tetraacrylate, tetramethylolmethane tetraacrylate, and pentaerythritol tetraacrylate; hexaacrylate compounds such as dipentaerythritol hexaacrylate; dimethacrylate compounds such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxyphenyl)propane; trimethacrylate compounds such as trimethylolpropane methacrylate, and trimethylolethane trimethacrylate; methylenebisacrylamide, divinylbenzene and the like.

The polymer fine particle is contained as the emulsion in the ink composition of the present invention and the emulsion can be produced by the known emulsion polymerization. For example, the emulsion of the polymer fine particle is produced by emulsion polymerizing an unsaturated vinyl monomer in water in the presence of a surfactant (emulsifier), a polymerization catalyst, a polymerization initiator, a molecular weight adjusting agent and a neutralizing agent.

Examples of the unsaturated vinyl monomer (monomer constituting the polymer fine particle) include acrylic acid ester monomers, methacrylic acid ester monomers, aromatic vinyl monomers, vinyl ester monomers, vinylcyan compound monomers, halogenated monomers, olefin monomers and diene monomers and the like, usually used in emulsion polymerization. Specific examples include acrylic acid esters such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate; methacrylic acid esters such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters such as vinyl acetate; vinyl cyan compounds such as acrylonitrile; halogenated monomers such as vinylidene chloride and vinyl chloride; aromatic vinyl monomers such as styrene, 2-methylstyrenevinyltoluene, tert-butylstyrene, chlorostyrene, vinylanisole, and vinylnaphthalene; olefins such as ethylene, propylene, and isopropylene; dienes such as butadiene and chloroprene; vinyl monomers such as vinyl ether, vinyl ketone, and vinylpyrrolidone.

Examples of the surfactant include anionic surfactants (sodium dodecylbenzenesulfonate, sodium laurate, ammonium salt of polyoxyethylene alkyl ether sulfate etc.) and nonionic surfactants (polyoxyethylene alkyl ether, polyoxyethylene alkyl ester, polyoxyethylene sorbitan fatty acid ester, polyoxyethylene alkyl phenyl ether, polyoxyethylene alkylamine, polyoxyethylene alkylamide etc.), and one or two or more kinds of them may be used. Alternatively, acetylene glycol [Olefin Y as well as Surfinol 82, 104, 440, 465 and 485 (all manufactured by Air Products and Chemicals Inc.)] may be used.

At production of the emulsion (the polymer fine particle), from a viewpoint of improvement in printing stability, it is preferable that, upon the emulsion polymerization, one or two or more kinds selected from the group consisting of acrylamides and hydroxy group-containing monomers are incorporated in addition to the unsaturated vinyl monomer. Examples of the acrylamides include acrylamide and N,N'-dimethylacrylamide and the like and, upon use, one or two or more of them can be used. In addition, examples of the hydroxy group-containing monomer include 2-hydroxyethyl acrylate, 2-hydroxyethyl methacrylate and 2-hydroxypropyl methacrylate and the like, and one or two or more kinds of them can be used.

When a fine particle having the core shell structure is used as the polymer fine particle, an emulsion containing it can be produced, for example, by the process disclosed in JP-A-4-76004 (emulsion polymerization of the unsaturated vinyl monomer at multiple stages) or the like. As described above, it is preferable that a polymer fine particle of a core shell structure consists of a polymer in which a core part thereof has an epoxy group, and examples of a method of introducing an epoxy group into a core part include a method of copolymerizing glycidyl acrylate, glycidyl methacrylate, allyl glycidyl ether or the like which is an unsaturated vinyl monomer having an epoxy group with other unsaturated vinyl monomer, and a method of adding an epoxy compound simultaneously when one or more kinds of unsaturated vinyl monomers are polymerized to prepare a core part (core particle), and complexing them. The former method is particularly preferable from a viewpoint of easy polymerization and polymerization stability.

A solid matter concentration of the fine particle emulsion in the black ink composition is preferably not less than 0.5% by weight and not more than 20% by weight, more preferably not less than 1% by weight. And, the concentration is more preferably not less than 0.5% by weight and not more than 10% by weight, more preferably not less than 1% by weight. When an addition amount is not less than 0.5% by weight, golden gloss and phase shift are suppressed, and printing quality is easily obtained and, when the concentration is not more than 10% by weight, storage stability of an ink, and choking recovery property can be maintained.

And, a solid matter concentration of the fine particle emulsion in the first black ink composition is preferably not less than 0.5% by weight and not more than 5% by weight, more preferably not more than 3% by weight. And, a solid matter concentration of the fine particle emulsion in the second black ink composition is preferably not less than 1% by weight and not more than 10% by weight, more preferably not more than 8% by weight, further preferably not more than 5% by weight.

When the present black ink composition contains the fine particle emulsion, a total amount of a solid matter of the water-soluble polyurethane resin and a solid matter of the fine particle emulsion is preferably not less than 0.5% and not more than 20% by weight. Within this range, a viscosity of the black ink composition is easily maintained in a suitable range, and discharge stability can be maintained. The total amount is more preferably not less than 1% by weight, further preferably not less than 1.5% by weight, and more preferably not more than 10% by weight, further preferably not more than 8% by weight.

In addition, when the first black ink composition contains the fine particle emulsion, a total amount of a solid matter of the water-soluble polyurethane resin and a solid matter of the fine particle emulsion is preferably not less than 0.8% and not more than 10% by weight. Within this range, a viscosity of the black ink composition is easily maintained in a suitable range, and discharge stability can be maintained. The total amount is more preferably not less than 1% by weight, further preferably not less than 1.5% by weight, and more preferably not more than 8% by weight, further preferably not more than 5% by weight.

When the second black ink composition contains the fine particle emulsion, a total amount of a solid matter of the water-soluble polyurethane resin and a solid matter of the fine particle emulsion is preferably not less than 0.2% and not more than 20% by weight. Within this range, better printing quality and discharge stability can be maintained, and ink reliability can be also maintained. The total amount is more preferably not less than 0.5% by weight, further preferably not less than 1% by weight, and more preferably not more than 15% by weight, further preferably not more than 8% by weight.

In the first black ink composition of the present invention, a solid matter content of the fine particle emulsion is an amount which is 2-fold or more a content of the carbon black. An upper limit is not particularly limited, but when the content is 10-fold or more a content of the carbon black, discharge becomes worse in some cases. When a content of the fine particle emulsion is less than 2-fold a content of the carbon black, phase shift cannot be sufficiently suppressed.

In addition, in the second black ink composition of the present invention, a solid matter content of the fine particle emulsion is an amount which is 20-fold or more a content of the carbon black. An upper limit is not particularly limited, but when the content is 50-fold or more a content of the carbon black, discharge becomes worse in some cases. When a content of the fine particle emulsion is less than 20-fold a content of the carbon black, golden gloss can not be sufficiently suppressed.

In addition, a solid matter of the water-soluble polyurethane resin can be not less than 40% by weight and not more than 80% by weight of a total amount of the solid matter and a solid matter of the fine particle emulsion. When the solid matter is less than 40% by weight, it becomes difficult to suppress or avoid a surface defect, golden gloss and phase shift on a recorded matter and, when the solid matter exceeds 80% by weight, it becomes difficult to retain a viscosity of the black ink composition in a suitable range and it becomes difficult to maintain discharge stability. In addition, in the first black ink composition, a solid matter of the water-soluble polyurethane resin is preferably not less than 40% by weight and not more than 60% by weight of the total amount and, in the second black ink composition, the solid matter is preferably not less than 50% by weight and not more than 80% by weight. In addition, in a relationship between the first black ink composition and the second black ink composition, it is preferable that a ratio relative to a total amount of the solid matter and a solid matter of the water-soluble polyurethane resin in the second black ink composition is high.

(Polyalkylene-Type Emulsion)

As a resin component constituting the polymer fine particle, particularly, a polyalkylene-based resin can be used. That is, the present black ink composition can contain an emulsion of a polyalkylene-based resin (hereinafter, referred to as polyalkylene-type emulsion). As the polyalkylene-based resin, a polymer containing mainly an olefin-based skeleton can be used.

Preferable examples of the polyalkylene-based resin in the present invention include high density polyethylene, medium density polyethylene, low density polyethylene, polypropylene, polybutene, poly-4-methylpentene-1, a copolymer of ethylene and α-olefin, an ethylene-propylene rubber, an ethylene-propylene-diene-tercopolymer (EPDM), an ethylene-vinyl acetate copolymer, a butyl rubber, a butadiene rubber, a low crystalline ethylene-propylene copolymer, a propylene-butene copolymer, and an ethylene-vinyl ester copolymer. Two or more kinds of these resins may be used. Examples of the polyalkylene-based resin include an emulsion of polyolefin-based resins such as polyethylene and polypropylene. Inter alia, a polypropylene-based polymer is preferably used. The polyalkylene-based resin can be utilized as a form of an emulsion by the known method. The polyalkylene-type emulsion is usually applied as an aqueous emulsion to the present black ink composition.

The polyalkylene resin may be modified with unsaturated carboxylic acid or its anhydride. Examples of the unsaturated carboxylic acid or its anhydride for modification include acrylic acid, methacrylic acid, crotonic acid, maleic acid, cinnamic acid, itaconic acid, citraconic acid, and fumaric acid; and unsaturated carboxylic acid anhydrides such as maleic anhydride, itaconic acid anhydride, and citraconic acid anhydride.

When the black ink composition of the present invention contains a polyalkylene-type emulsion, a solid matter of the polyalkylene-type emulsion is preferably not less than 0.5% by weight and not more than 10% by weight, more preferably not less than 1% by weight, and more preferably not more than 5% by weight, further preferably not more than 3% by weight. And, a solid matter concentration of the polyalkylene-type emulsion in the first black ink composition is preferably not less than 0.5% by weight and not more than 5% by weight, more preferably not more than 3% by weight. And, a solid matter concentration of the polyalkylene-type emulsion in the second black ink composition is preferably not less than 1% by weight and not more than 10% by weight, more preferably not more than 8% by weight, further preferably not more than 5% by weight.

In addition, a total amount of a solid matter of the water-soluble polyurethane resin and a solid matter of the polyalkylene-type emulsion is preferably not less than 0.5% by weight and not more than 20% by weight. Within this range, a viscosity of the black ink composition is easily retained in a suitable range, and discharge stability can be maintained. The total amount is more preferably not less than 1% by weight, further preferably not less than 1.5% by weight, and more preferably not more than 10% by weight, further preferably not more than 8% by weight.

In addition, when the first black ink composition contains the polyalkylene-type emulsion, a total amount of a solid matter of the water-soluble polyurethane resin and a solid matter of the polyalkylene-type emulsion is preferably not less than 0.8% by weight and not more than 10% by weight. Within this range, better printing quality and discharge stability can be maintained. The total amount is more preferably not less than 1% by weight, further preferably not less than 1.5% by weight, and more preferably not more than 8% by weight, further preferably not more than 5% by weight.

When the second black ink composition contains the polyalkylene-type emulsion, a total amount of a solid matter of the water-soluble polyurethane resin and a solid matter of the polyalkylene-type emulsion is preferably not less than 0.2% by weight and not more than 20% by weight. Within this range, better printing quality and discharge stability can be maintained. The total amount is more preferably not less than 0.5% by weight, further preferably not less than 1% by weight, and more preferably not more tan 15% by weight, further preferably not more than 8% by weight.

(Other Resin Component)

In addition, the black ink composition of the present invention may contain other resin component depending on the case. Other resin component means a resin component which is usually used in production of the black ink composition, and examples include resin-based disperasants, for example, polyvinyl alcohols, polyvinylpyrrolidones, acryl-based resins such as polyacrylic acid, acrylic acid-acrylonitrile copolymer, potassium acrylate-acrylonitrile copolymer, vinyl acetate-acrylic acid ester copolymer, and acrylic acid-acrylic acid ester, styrene-acryl resins such as styrene-acrylic acid copolymer, styrene-methacrylic acid copolymer, styrene-methacrylic acid-acrylic acid ester copolymer, styrene-α-methylstyrene-acrylic acid copolymer, and styrene-α-methylstyrene-acrylic acid-acrylic acid ester copolymer, styrene-maleic acid copolymer, styrene-maleic anhydride copolymer, vinylnaphthalene-acrylic acid copolymer, vinylnaphthalene-maleic acid copolymer, vinyl acetate-based copolymer such as vinyl acetate-ethylene copolymer, vinyl acetate-fatty acid vinyl ethylene copolymer, vinyl acetate-maleic acid ester copolymer, vinyl acetate-crotonic acid copolymer, and vinyl acetate-acrylic acid copolymer, and salts thereof, as well as resin-based surfactants, for example, polyoxyethylene alkyl ether, polyoxyethylene alkyl ester, polyoxyethylene sorbitan fatty acid ester, polyoxyethylene alkyl phenyl ether, polyoxyethylene alkylamine, and polyoxyethylene alkylamide.

(Carbon Black)

As carbon black for use in the black ink composition of the present invention, in addition to titanium oxide and iron oxide, carbon black produced by the known method such as a contact method, a furnace method and a thermal method can be used.

In addition, in the present invention, self-dispersion carbon black may be used in that it is particularly excellent in color developability on a mat-based medium or a plain paper. The self-dispersion carbon black is carbon black which can be dispersed and/or dissolved in an aqueous medium without using a dispersant. Herein, "dispersed and/or dissolved in an aqueous medium without a dispersant" refers to the state where carbon black is stably present in an aqueous medium without using a dispersant for dispersing carbon black. Examples of such the self-dispersion carbon black include carbon black in which many hydrophilic functional groups and/or a salt thereof (hereinafter, referred to as dispersibility imparting group) are bound to a surface directly or indirectly via an alkyl group, an alkyl ether group, an aryl group or the like.

Examples of the hydrophilicity imparting group include acidic groups such as —COOH, —CO, —OH, —SO$_3$H and —PO$_3$H$_2$, and quaternary ammonium as well as a salt thereof.

The self-dispersion carbon black is produced, for example, by binding (grafting) the dispersibility imparting group or an active species having the dispersibility imparting group to a surface of carbon black by subjecting a carbon black surface to physical treatment or chemical treatment. As the physical treatment, vacuum plasma treatment and the like can be exemplified. Examples of the chemical treatment include a wet oxidizing method of oxidizing a pigment surface with an oxidizing agent in water, a method of binding p-aminobenzoic acid to a pigment surface to bind a carboxyl group thereto via a phenyl group.

In the present invention, a self-dispersion pigment which is subjected to surface treatment by oxidation treatment with hypohalogen acid and/or hypohalogen acid salt, or oxidation treatment with ozone, is preferable in terms of high color development. Examples of the self-dispersion carbon black in the present invention include typically oxidization-treated carbon black in which the acidic group or a salt thereof is introduced by such the oxidation treatment.

From the above explanation, specifically, examples of carbon black for use in the present invention are not limited to, but include No. 2300, No. 900, HCF88, No. 33, No. 20B, No. 40, No. 45, No. 52, MA7, MA8, MA100, No. 2200B and the like manufactured by Mitsubishi Chemical Corporation, Raven5750, Raven5250, Raven5000, Raven3500, Raven1255, Raven700 and the like manufactured by Columbia, Regal400R, Regal330R, Regal660R, Mogul L, Monarch700, Monarch800, Monarh880, Monarch900, Monarh1000, Monarch1100, Monarh1300, Monarch1400 and the like manufactured by Cabot, Color BlackFW1, Color BlackFW2, Color BlackFW2V, Color BlackFW18, Color BlackFW200, Color BlackS150, Color BlackS160, Color BlackS170, Printex 35, Printex U, Printex V, Printex 140U, Special Black 6, Special Black 5, Special Black 4A, Special Black 4, Special Black 250 and the like manufactured by Degussa.

A particle diameter of carbon black is not particularly limited, but is preferably not more than 10 μm, further preferably not more than 0.1 μm. In the ink set in accordance with the present invention, carbon black contained in respective black ink compositions may be the same or different.

In the first black ink composition of the present invention, a content of carbon black is an amount which can be used in recording a phase shift occurrence region and, specifically, is not less than 0.4% by weight and less than 1.5% by weight, further preferably not less than 0.5% by weight and not more than 1.2% by weight, particularly not less than 0.6% by weight and not more than 1.0% by weight relative to a total weight of the black ink composition. In addition, a content of carbon black in the second black ink composition is an amount which can be used in recording a GG occurrence region and, specifically, is less than 0.4% by weight, particularly, not less than 0.01% by weight and less than 0.4% by weight, preferably not less than 0.05% by weight and not more than 0.3% by weight, more preferably not less than 0.1% by weight and not more than 0.25% by weight relative to a total weight of the black ink composition.

In addition, the black ink composition of the present invention may contain a coloring agent for color complementarity for achromatizing tingeing property (red tingeing property at a concentrated part, or particularly, yellow tingeing property at a pale part) originally possessed by carbon black. A coloring agent for color complementarity means a coloring agent which is contained in a black ink composition for reducing or diminishing tingeing generated in a recorded image with a black ink to obtain an achromatic image, and examples include Color Index Pigment Blue 60 (C.I.PB60), Color Index Pigment Blue 15:3, and Color Index Pigment Blue 15:4.

The Pigment Blue 60 is preferably used in a black ink composition having a carbon black content of not less than 0.01% by weight and not more than 1% by weight, and a content thereof is not limited, but is, for example, preferably an amount of 0.01 to 0.5% by weight relative to a total weight of the black ink composition. In addition, the Pigment Blue 15:3 and Pigment Blue 15:4 are preferably used in a black ink composition having a carbon black content of not less than 1% by weight and not more than 10% by weight, and a content thereof is not particularly limited, but is, for example, preferably not less than 0.1 parts by weight and not more than 5 parts by weight relative to a total weight of the black ink composition.

(Composition of Black Ink Composition and Process for Producing the Same)

The black ink composition of the present invention can be prepared as an aqueous ink containing the same incorporation components as those of the previously known black ink composition. In addition, it can be utilized as an ink for the previously known various recording methods, preferably can be utilized as an ink for ink jet recording.

Components other than the aforementioned components and a process for producing an ink when the black ink composition of the present invention is for ink jet recording and, particularly, is an aqueous ink composition will be briefly explained below.

In the black ink composition of the present invention, it is preferable that carbon black is added to an ink composition, for example, as a pigment dispersion solution in which carbon black is dispersed in an aqueous medium with a dispersant. As the dispersant which is used in preparing a pigment dispersion solution, dispersants which are generally used in preparing a pigment dispersion solution, for example, a polymer dispersant and a surfactant can be used.

An amount of the dispersant contained in the black ink composition of the present invention is not particularly limited, but is preferably in a range of not less than 0.01% by weight and not more than 10%, more preferably not less than 0.1% by weight and not more than 5% by weight. When a content of the dispersant is less than 0.01% by weight, the surface activity effect is not sufficiently obtained and, when the content exceeds 10% by weight, the case where this becomes a cause for deteriorated discharge due to precipitation of a crystal, formation of a liquid crystal, or reduction in stability of a pigment, is recognized.

As the dispersant, in addition to the conventional surfactants, a dispersant which is conventionally used for preparing a pigment dispersion solution, for example, a polymer dispersant can be suitably used. It would be apparent to a person skilled in the art that a dispersant contained in this pigment dispersion solution functions also as a dispersant and a surfactant of the black ink composition. As a more preferable dispersant, a polymer dispersant, particularly a resin dispersant can be used. Preferable examples of the polymer dispersant include natural polymers. Specific examples include proteins such as glue, gelatin, casein, and albumin, natural gums such as gum arabic and gum tragacanth, glucosides such as saponin, alginic acid, alginic acid derivatives such as alginic acid propylene glycol ester, alginic acid triethanolamine, and ammonium alginate, and cellulose derivatives such as methyl cellulose, carboxymethyl cellulose, hydroxyethyl cellulose, and ethylhydroxy cellulose.

Preferable examples of the polymer dispersant also include synthetic polymers. Specific examples thereof include polyvinyl alcohols, polyvinyl pyrrolidones, acryl-based resins such as polyacrylic acid, acrylic acid-acrylonitrile copolymer, acrylic acid salt-acrylonitrile copolymer, vinyl acetate-acrylic acid ester copolymer, and acrylic acid-acrylic acid ester copolymer, styrene-acryl resins such as styrene-acrylic acid copolymer, styrene-methacrylic acid copolymer; styrene-methacrylic acid-acrylic acid ester copolymer, styrene-α-methylstyrene-acrylic acid copolymer, and styrene-α-methylstyrene-acrylic acid-acrylic acid ester copolymer, styrene-maleic acid copolymer, styrene-maleic anhydride copolymer, isobutylene-maleic acid resin, rosin-modified maleic acid resin, vinylnaphthalene-acrylic acid copolymer, vinylnaphthalene-maleic acid copolymer, and vinyl acetate-based copolymers such as vinyl acetate-ethylene copolymer, vinyl acetate-fatty acid vinyl ethylene copolymer, vinyl acetate-maleic acid ester copolymer, vinyl acetate-crotonic acid copolymer, and vinyl acetate-acrylic acid copolymer, and salts thereof. Among them, styrene-acrylic acid copolymer, styrene-methacrylic acid copolymer, acrylic acid-acrylic acid ester copolymer, and styrene-maleic anhydride copolymer are preferable as the dispersant.

As the resin dispersant, commercially available resin dispersants can be used and, specific examples include Johncryl 68 (molecular weight 10000, acid value 195), Johncryl 61J (molecular weight 10000, acid value 195), Johncryl 680 (molecular weight 3900, acid value 215), Johncryl 682 (molecular weight 1600, acid value 235), Johncryl 550 (molecular weight 7500, acid value 200), Johncryl 555 (molecular weight 5000, acid value 200), Johncryl 586 (molecular weight 3100, acid value 105), Johncryl 683 (molecular weight 7300, acid value 150), Johncryl B-36 (molecular weight 6800, acid value 250, all of which are manufactured by BASF Japan Ltd.

The black ink composition of the present invention can contain a surfactant. Specific examples of the surfactant include anionic surfactants (e.g. sodium dodecylbenzenesulfonate, sodium laurate, and ammonium salt of polyoxyethylene alkyl ether sulfate), nonionic surfactants (e.g. polyoxyethylene alkyl ether, polyoxyethylene alkyl ester, polyoxyethylene sorbitan fatty acid ester, polyoxyethylene alkyl phenyl ether, polyoxyethylene alkylamine, and polyoxyethylene alkylamide), amphoteric surfactants (e.g. N,N-dimethyl-N-alkyl-N-carboxymethylammonium betaine, N,N-dialkylaminoalkylene carboxylic acid salt, N,N,N-trialkyl-N-sulfoalkyleneammonium betaine, N,N-dialkyl-N,N-bispolyoxyethylene ammonium sulfate ester betaine, and 2-alkyl-1-carboxymethyl-1-hydroxyethylimidazolinium betaine), and these can be used alone, or by combining two or more kinds of them.

This addition can improve permeability of the black ink composition into a recording medium, and recording having little blur can be expected in various recording media. As a preferable example of an acetylene glycol-based surfactant for use in the black ink composition used in the present invention, there can be exemplified a compound represented by the general formula (1):

[Chemical formula 1]

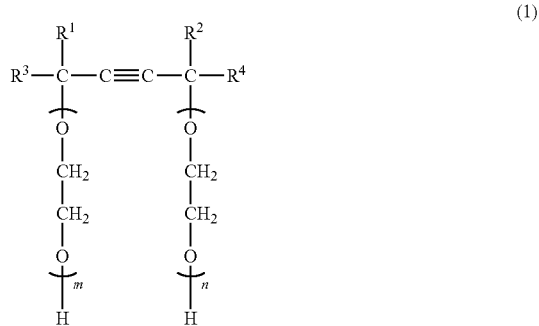

(1)

(wherein $0 \leq m+n \leq 50$, and each of $R^1$, $R^2$, $R^3$ and $R^4$ is an independent alkyl group, preferably an alkyl group of a carbon number of 6 or less).

Among the compounds represented by the general formula (1), particularly preferable examples include 2,4,7,9-tetramethyl-5-decyne-4,7-diol, 3,6-dimethyl-4-octyne-3,6-diol, and 3,5-dimethyl-1-hexyne-3-ol. As the acetylene glycol-based surfactant represented by the general formula (1), commercially available products may be utilized, and examples include Surfinol 104, 82, 465, 485 and TG (all available from Air Products and Chemicals Inc.), and Orphin STG, and Orphin E1010 (all are trade name manufactured by Nisshin Chemical Industry Co., Ltd.).

It is preferable that the black ink composition of the present invention contains a silicone-based surfactant represented by the general formula (2):

[Chemical formula 2]

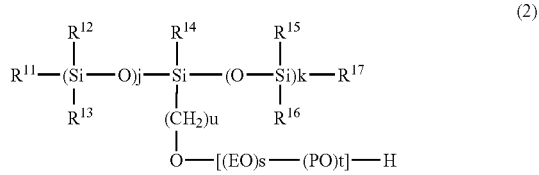

(2)

(wherein $R^{11}$ to $R^{17}$ represent independently a C1-6 alkyl group, j and k represent independently an integer of 1 or more, EO represents an ethyleneoxy group, PO represents a propyleneoxy group, s and t represent an integer of 0 or more, provided that s+t represents an integer of 1 or more, and EO and PO may be in any order in [ ], and may be random or block). This addition can improve permeability of the black ink composition into a recording medium.

A preferable compound in the silicone-based surfactant represented by the general formula (2) is a compound in which $R^{11}$ to $R^{17}$ are independently a C1-6 alkyl group, more preferably a methyl group, j and k are independently an integer of 1 or more, more preferably 1 to 2, and s and t represent an integer of 0 or more, provided that s+t is an integer of 1 or more, more preferably s+t is 2 to 4 in the general formula (2).

A particularly preferable compound in the silicone-based surfactant represented by the general formula (2) is a compound in which j and k are the same number, and are 1 to 3, particularly 1 or 2 in the formula (2), and a further preferable compound represented by the general formula (2) is a compound in which all of $R^{11}$ to $R^{17}$ represent a methyl group, j represents 1, k represents 1, u represents 1, s represents an integer of 1 or more, particularly an integer of 1 to 5, and t represents 0.

An addition amount of the silicone-based surfactant represented by the general formula (2) may be appropriately determined, and is preferably 0.03 to 3% by weight, more preferably around 0.1 to 2% by weight, further preferably around 0.3 to 1% by weight relative to a total weight of the black ink composition used in the present invention.

The silicone-based surfactant represented by the general formula (2) is commercially available, and it can be utilized. For example, a silicone-based surfactant, BYK-347 or BYK-348 commercially available from Bigchemie Japan can be utilized.

When a content of the surfactant is less than 0.01% by weight, the surface activity effect is not sufficiently obtained and, when the content exceeds 10% by weight, the case where this is a cause for deteriorated discharge due to precipitation of a crystal, formation of a liquid crystal, or reduction in stability of a pigment, is recognized.

A content of the water-soluble organic solvent to be added to each black ink composition is preferably around not less than 0.5% by weight and not more than 40% by weight, more preferably not less than 2% by weight and not more than 30% by weight relative to a total amount of the black ink composition. As the water-soluble organic solvent, a water-soluble organic solvent which is incorporated into a normal aqueous pigment ink composition can be used, and specific examples include polyhydric alcohols such as ethylene glycol, diethylene glycol, triethylene glycol, tetraethylene glycol, polyethylene glycol, polypropylene glycol, propylene glycol, dipropylene glycol, butyrene glycol, 1,2,6-hexanetriol, thioglycol, hexyleneglycol, glycerin, trimethylolethane, and trimethylolpropane; alkyl ethers of polyhydric alcohols such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; and 2-pyrrolidone, N-methyl-2-pyrrolidone, 1,3-dimethyl-2-imidazolidinone and triethanolamine.

In addition, it is preferable that the black ink composition of the present invention further contains an antiseptic, a metal ion capturing agent, and/or a rust preventing agent. Herein, the antiseptic is preferably one or more kinds of compounds selected from the group consisting of alkylisothiazolone, chroloalkylisothiazolone, benzisothiazolone, bromonitroalcohol, oxazolidine-base compound, and chloroxylenol, the metal ion capturing agent is preferably ethylenediaminetetraacetate and, as a rust preventing agent, dicyclohexylammonium nitrate and/or benzotriazole are preferably used.

Besides, examples of a component which improves solubility of an ink component and, further, improves permeability into a recording medium, for example, a paper, or prevents choking of a nozzle include alkyl alcohols of a carbon number of 1 to 4 such as ethanol, methanol, butanol, propanol, and isopropanol, formamide, acetamide, dimethyl sulfoxide, sorbit, sorbitan, acetin, diacetin, triacetin, and sulfolane, and these may be used by appropriate selection.

In addition, examples of a pH adjusting agent include amines such as diethanolamine, triethanolamine, propanolamine and morpholine, and modified entities thereof, inorganic hydroxides such as potassium hydroxide, sodium hydroxide, and lithium hydroxide, ammonium hydroxide, quaternary ammonium salt (tetramethylammonium etc.), carbonates such as potassium carbonate, sodium carbonate, and lithium carbonate, and phosphates. As other additive, ureas such as urea, thiourea, and tetramethylurea, allophanates such as allophanate, and methylallophanate, biurets such as biuret, dimethylbiuret, and tetramethylbiuret, L-ascorbic acid and a salt thereof, a commercially available antioxidant, and an ultraviolet absorbing agent can be used.

In addition, the black ink composition of the present invention has a surface tension of preferably not more than 45 mN/m, further preferably in a range of 25 to 45 mN/m. When a surface tension exceeds 45 mN/m, since drying property of printing is deteriorated, blur easily occurs, and color bleeding occurs, a better recorded image is obtained with difficulty. In addition, when a surface tension is less than 25 mN/m, since a periphery of a nozzle at a printer head becomes easy to be wetted, flight turning of ink droplets occurs, therefore, there easily arises a problem in discharge stability. The surface tension can be measured with a surface tension meter which is normally used. A surface tension of an ink can be within the above range by adjusting a kind and a compositional ratio of respective components constituting an ink. The first black ink composition and the second black ink composition contained in the ink set for ink jet recording of the present invention can be prepared by a conventional method.

Further, it is preferable that the black ink composition of the present invention contains tertiary amine as a pH adjusting agent. Examples of the tertiary amine which can be added to the black ink composition of the present invention include trimethylamine, triethylamine, triethanolamine, dimethylethanolamine, diethylethaonlamine, triisopropenolamine, and butyldiethanolamine. These may be used alone, or may be used jointly. An amount of these tertiary amines to be added to the black ink composition of the present invention is not less than 0.1% by weight and not more than 10% by weight, more preferably not less than 0.5% by weight and not more than 5% by weight.

In addition, the black ink composition of the present invention may contain a permeation promoter, a sugar and/or an alginic acid derivative. Examples of the permeation promoter include an alkyl ether derivative of a carbon number of 3 or more of a polyhydric alcohol, for example, diethylene glycol monobutyl ether, triethylene glycol monobutyl ether, propylene glycol monobutyl ether, and dipropylene glycol monobutyl ether, and one or two or more kinds of them can be used. Examples of the sugar include monosaccharides, disaccharides, oligosaccharides (including trisaccharides and tetrasaccharides) and polysaccharides, and preferable examples include glucose, mannose, fructose, ribose, xylose, arabinose, galactose, aldonic acid, glucitol, (sorbit), maltose, cellobiose, lactose, sucrose, trehalose, and maltotriose. Herein, polysaccharides means a broad sense sugar, and is used in a sense to include substances which are widely present in nature, such as alginic acid, α-cyclodextrin, and cellulose. In addition, examples of a derivative of these saccharides include reducing saccharides of the aforementioned saccharides (e.g. sugar alcohol (represented by the general formula $HOCH_2(CHOH)_nCH_2OH$ (wherein n represents an integer of 2 to 5)), oxidized saccharides (e.g. aldonic acid, uronic acid), amino acids, and thiosaccharides. Particularly, a sugar alcohol is preferable, and specific examples include maltitol and sorbit. Alternatively, as a commercially available product, HS-500 or HS-300 (manufactured by Hayashibara Biochemical Laboratories, Inc.) can be used. An addition amount of these saccharides is preferably around 0.1 to 40% by weight, more preferably around 1 to 30% by weight.

Preferable examples of the alginic acid derivative include alginic acid alkali metal salts (e.g. sodium salt, potassium salt), alginic acid organic salts (e.g. triethanolamine salt), and alginic acid ammonium salt. An amount of this alginic acid derivative to be added to the black ink composition is preferably around 0.01 to 1% by weight, more preferably around 0.05 to 0.5% by weight. The reason why a better image is obtained by addition of the alginic acid derivative is not clear, but the reason is thought as follows: a polyvalent metal salt in a reaction solution is reacted with an alginic acid derivative in the black ink composition, to change the dispersion state of a coloring agent, and fixation of the coloring agent onto a recording medium is promoted. Besides, if necessary, an antiseptic agent, a mildewcide, and/or a phosphate-based antioxidant may be added to the black ink composition of the present invention.

The black ink composition of the present invention can be prepared by a conventional method, for example, by dispersing and mixing the aforementioned respective components by a suitable method. Preferably, first, a pigment, the polymer dispersant, and ion-exchanged water are mixed with a suitable dispersing machine (e.g. ball mill, sand mill, attritor, roll mill, agitator mill, Henschel mixer, colloid mill, ultrasonic homogenizer, jet mill, and ong mill) to prepare a uniform pigment dispersion solution. Then, the fine particle emulsion [particularly, pH-adjusted resin emulsion, polyalkylene-type emulsion], ion-exchanged water, a water-soluble organic solvent, an antiseptic and/or a mildewcide agent are sufficiently stirred at a normal temperature to prepare an ink solvent. In the state where this ink solvent has been stirred with a suitable dispersing machine, the pigment dispersion solution is gradually added dropwise thereto, followed by sufficient stirring. After sufficient stirring, for removing coarse particles and foreign matters which become a cause for choking, filtration can be performed to obtain an objective black ink composition. As the polyalkylene-type emulsion, a commercially available emulsion can be used. For example, AQ593 and AQ513 or PEM-17 which are sold from Bigchemie Japan can be utilized.

(Ink Set)

The aforementioned black ink compositions of various aspects can constitute an ink set containing one or two or more kinds of black ink compositions having different carbon black concentrations from carbon black concentrations of the black ink compositions. In the first black ink composition and/or the second black ink composition, other black ink composition having a further high carbon black concentration can be combined. As other black ink composition, there can be exemplified a black ink composition having a carbon black concentration of not lower than 1.5% by weight. More preferable is a black ink composition having a carbon black concentration of not lower than 2% by weight. This black ink composition has preferably a carbon black concentration of lower than 6% by weight, and carbon black is carbon black which is not self-dispersion type. In addition, other black ink composition is a black ink composition having a carbon black concentration of not lower than 6% by weight, and preferable examples include a black ink composition containing the already explained self-dispersion carbon black. Other black ink composition may contain both of, or any one of a black ink composition having a carbon black concentration of not lower than 1.5% by weight and lower than 6%, and a black ink composition having a carbon black concentration of not lower than 6% by weight.

A preferable aspect of the ink set of the present invention is an ink set containing a black ink composition having a carbon black concentration of not lower than 1.5% by weight (preferably lower than 6% by weight; containing carbon black which is not self-dispersion type) in addition to the first black ink composition and the second black ink composition which are the black ink composition of the present invention. According to this ink set, phase shift and GG are avoided or suppressed and, at the same time, a surface defect on a recorded matter is avoided or suppressed, and a recorded matter having a monochromic image or a gray scale image of high image quality can be obtained. In addition, according to such the aspect, particularly, in a glossy medium, the aforementioned effect and, at the same time, an excellent optical concentration and gray balance can be obtained.

Other preferable aspect of the ink set of the present invention is an ink set containing a black ink composition having a carbon black concentration of not lower than 6% by weight (preferably, self-dispersion carbon black) in addition to the first black ink composition and the second black ink composition which are the black ink composition of the present invention. According to this ink set, particularly, in a non-glossy medium such as a mat paper, a monochromic image and a gray scale image of high image quality, as well as an excellent optical concentration and gray balance can be obtained.

Still other preferable aspect of the ink set of the present invention is an ink set containing a black ink composition having a carbon black concentration of not lower than 1.5% by weight (preferably lower than 6% by weight; containing carbon black which is not self-dispersion type), and a black ink composition having a carbon black concentration of not lower than 6% by weight (preferably, self-dispersion carbon black) in addition to the first black ink composition and the second black ink composition which are the black ink composition of the present invention. According to this ink set, aforementioned both aspects of effect can be obtained by exchangeably-using other black ink composition depending on a kind of medium, and in addition to the aforementioned effect, a recorded image of better optical concentration and gray balance can be obtained regardless of glossiness of a medium.

The ink set of the present invention can be an ink set for monochromic recording or an ink set for color recording. In the case of monochromic recording, an ink set is composed of a plurality of kinds of black ink compositions. Each black ink composition may respectively contain a suitable coloring agent for color complementarity, and an ink set for monochromic recording may contain, for example, a color ink composition which can print a complementary color, for example, a color ink composition of a combination of light magenta and light cyan, or a combination of light magenta, light cyan and yellow.

(Ink Set for Color Recording)

In the case of an ink set for color recording, an ink set is composed of a color ink composition of a chromatic color such as cyan, magenta, and yellow in addition to the black ink composition. Examples of a typical ink set in accordance with the present invention include; a five color ink set in which a yellow ink composition, a cyan ink composition, a magenta ink composition, a first black ink composition, and a black ink composition containing carbon black having a higher concentration are added; a seven color ink set in which a light cyan ink composition and a light magenta ink composition are added to the five color ink set; an eight color ink set in which a dark yellow ink composition is added to the seven color ink set; an eight color ink set in which a red ink composition, a green ink composition and a blue ink composition are added to the five color ink set; an eight color ink set in which an orange ink composition, a green ink composition, and a blue ink composition are added to the five color ink set; as well as an eight color ink set in which an orange ink composition, a green ink composition, and a violet ink composition are added to the five color ink set; as well as an ink set in which the second black ink composition is added to each of the aforementioned ink sets.

Respective ink compositions of "light magenta" and "light cyan" are ink compositions in which coloring material concentrations of a magenta ink composition and a cyan ink composition are reduced, respectively, for the purpose of improving image quality of a recorded image resulting from concentration modification. In addition, the ink composition of "dark yellow" is a yellow ink composition using a coloring material (pigment) having a lower lightness/chroma than that of a yellow ink composition, for the purpose of improving color reproductivity for a dark color at a shadow part. And, respective ink compositions of "red", "orange", "green", "blue" and "violet" are ink compositions which are used as an element constituting intermediate colors of yellow, magenta and cyan, for the purpose of improving a color reproduction range.

(Color Ink Composition)

Also in various color ink compositions used in the ink set of the present invention and color ink compositions which are used independently of the ink set of the present invention, the aforementioned water-soluble polyurethane resin and aged water-soluble polyurethane resin compositions can be used. That is, as far as a color ink composition contains a chromatic color pigment other than black, it is effective to use the water-soluble polyurethane resin and the aged water-soluble polyurethane resin composition. And, like the black ink composition of the present invention, regarding magenta ink compositions having different concentrations (magenta, light magenta) and cyan ink compositions having different concentrations (cyan, light cyan), a concentration of the water-soluble polyurethane resin can be set depending on a concentration of a pigment contained in the composition. In addition, the light magenta ink composition and the light cyan ink composition can be used by combining with normal magenta ink composition and cyan ink composition, respectively.

Examples of the light color ink composition include an aqueous ink composition having a chromatic color pigment concentration of not lower than 0.5 wt % and lower than 1.5 wt %. The light color ink composition having a content of a chromatic color pigment of not lower than 0.5 wt % and lower than 1.5 wt % can be such that, for example, a content of a solid matter of the water-soluble polyurethane resin can be 0.67-fold or more and 2.5-fold or less a content of the chromatic color pigment. In addition, in this light color ink composition, an amount of a solid matter of the water-soluble polyurethane resin can be not less than 0.3 wt % and not more than 4 wt %. In such the light color ink composition, since the water-soluble polyurethane resin is a main resin, it is effective to use an aged water-soluble polyurethane resin.

In a color ink composition which may be used by combining with such the light color ink composition, a content of the chromatic color pigment can be not lower than 1.5 wt % and lower than 7 wt %. In such the color ink composition, for example, a content of a solid matter of the water-soluble polyurethane resin can be 0.04-fold or more and 0.35-fold or less a content of the chromatic color pigment. In addition, in this color ink composition, an amount of a solid matter of the water-soluble polyurethane resin may be not less than 0.05 wt % and not more than 2.5 wt %. Even in such the color ink composition, since the water-soluble polyurethane resin is a main resin, it is effective to use an aged water-soluble polyurethane resin.

By using the water-soluble polyurethane resin and/or the aged water-soluble polyurethane resin composition depending on a pigment concentration, an ink composition having a stable surface glossiness regardless of printing duty, that is, an ink composition in which uneven glossiness is avoided or suppressed, can be obtained. When recorded with an ink having great uneven glossiness, since glossiness is different between a region having a large point number and a region having a small point number on a recorded image, an image looks sunk, or a sence of incompatibility is generated between a periphery. Therefore, by using an ink composition having improved uneven glossiness, a better image not having such the problem can be obtained. Particularly, since uneven glossiness easily appears in a color ink composition having a low pigment concentration, this is effective in a color ink composition having a low pigment concentration.

Such the color ink composition can use the same ink constituent components as those of the black ink composition of the present invention in addition to the water-soluble polyurethane resin and aged water-soluble polyurethane resin composition, and can be produced similarly.

Examples of the pigment used in a yellow ink composition include C. I. Pigment Yellow 1, 2, 3, 12, 13, 14, 16, 17, 73, 74, 75, 83, 93, 95, 97, 98, 109, 110, 114, 128, 129, 138, 150, 151, 154, 155, 180, and 185, and preferable is one kind selected from the group consisting of C. I. Pigment Yellow 74, 109, 110, 128 and 138, or a mixture of two or more kinds of them.

Examples of the pigment used in a magenta ink composition and a light magenta ink composition include C. I. Pigment Red 5, 7, 12, 48 (Ca), 48 (Mn), 57 (Ca), 15:1, 112, 122, 123, 168, 184, 202, 209 and C. I. Pigment Violet 19. Preferable is one kind selected from the group consisting of C. I. Pigment Red 122, 202, 209 and C. I. Pigment Violet 19, or a mixture of two or more kinds of them.

Further, examples of the pigment used in a cyan ink composition and a light cyan ink composition include C. I. Pigment Blue 1, 2, 3, 15:3, 15; 4, 15; 34, 16, 22, 60 and C. I. Vat Blue 4, and 60. Preferable is one kind selected from the group consisting of C. I. Pigment Blue 15:3, 15:4 and 60, or a mixture of two or more kinds of them.

As a specific example of the pigment, examples of the pigment used in a red ink composition include C. I. Pigment Red 177, C. I. Pigment Red 178, C. I. Pigment Red 254, and C. I. Pigment Red 264. More preferable is C. I. Pigment Red 177, and C. I. Pigment Red 264.

The ink set of the present invention can be utilized as an ink for the previously know various recording methods. A preferable ink set is aqueous, particularly, an ink set for ink jet recording. In addition, the recording method of the present invention is a recording method of performing recording by discharging droplets of an ink composition and adhering the droplets to a recording medium, and uses the ink set of the present invention. Herein, the recording method can be suitably performed by equipping the known ink jet recording apparatus with an ink cartridge accommodating the ink set of the present invention (ink cartridges in which respective black ink compositions are individually accommodated), and recording on a recording medium. Herein, as the ink jet recording apparatus, an ink jet recording apparatus equipped with an electrostriction element which can be vibrated based on an electric signal and constructed so as to be able to discharge an ink contained in the ink set relating to the present invention by vibration of the electrostriction element is preferable. In addition, as an ink cartridge accommodating the ink set (accommodating case), the known one can be suitably used. In addition, the recorded matter of the present invention has an image consisting of an adhesion layer of the ink set of the present invention of various aspects. In this image, occurrence of phase shift, and GG are suppressed better and, at the same time, a surface defect such as a fine concave dot is avoided or suppressed.

The black ink composition and the ink set of the present invention can be used in an arbitrary recording method, and can be suitably used, for example, as an aqueous gravure ink, an aqueous flexo ink, or particularly, an aqueous ink for ink jet recording. Alternatively, they can also be used as an aqueous paint.

It is preferable that the black ink composition of the present invention is used in a recording medium in which a coloring agent (particularly pigment) and a resin component of a water-soluble polyurethane resin and a fine particle emulsion [polyalkylene-type emulsion] contained in the black ink composition are substantially made to remain on a surface thereof, and substantially absorbs a liquid component of the black ink composition, as a recording medium. Such the recording medium is, for example, such that an average pore diameter on a surface is smaller than an average particle diameter of the pigment. A preferable recording medium is a recording medium containing an ink receiving layer having a smaller average pore diameter than an average particle diameter of the pigment.

As a recording medium which is preferable in the black ink composition and the ink set of the present invention, a recording medium in which an ink receiving layer containing a porous pigment is provided on a substrate can be used. The ink receiving layer is an uppermost layer of the recording medium, or for example, may be an intermediate layer having a gloss layer thereon. As such the recording medium, a so-called absorption type (also referred to as bubble-type) recording medium containing a porous pigment and a binder resin in its ink receiving layer, and a so-called swelling-type recording medium further containing casein, modified polyvinyl alcohol (PVA), gelatin, or a resin such as modified urethane are known, and the black ink composition of the present invention can be used in any recording medium. Examples of the porous pigment contained in an ink receiving layer of the absorption-type recording medium include precipitation method, gel type or vapor method silica, alumina hydrate such as pseudoboehmite, silica/alumina hybrid sol, smectite clay, calcium carbonate, calcium sulfate, barium sulfate, titanium dioxide, kaolin, white clay, talc, magnesium silicate, and calcium silicate, and one or two or more kinds of them can be used.

In addition, the binder resin contained in an ink receiving layer of the absorption-type recording medium is not particularly limited as far as it is a compound which has the binding ability, and can enhance a strength of an ink receiving layer, and examples include polyvinyl alcohol, silanol-modified polyvinyl alcohol, vinyl acetate, starch, cellulose derivative such as carboxymethylcellulose, casein, gelatin, conjugated diene-based copolymer latex such as styrene-butadiene copolymer, vinyl-based copolymer latex such as ethylene-vinyl acetate copolymer, acryl-based copolymer latex such as acrylic acid and methacrylic acid polymers.

The ink receiving layer, in the case of an ink receiving layer of the absorption-type recording medium, or in the case of an ink receiving layer of the swelling-type recording medium, if necessary, may contain various additives such as a fixing agent, a fluorescent brightening agent, an antihydration agent, a mildewcide, an antiseptic, a dispersant, a surfactant, a viscosity increasing agent, a pH adjusting agent, an antifoaming agent, and/or a water retaining agent. Examples of the substrate on which the aforementioned each ink receiving layer is provided include a paper (including a size-treated paper); a resin-coated paper in which polyethylene, polypropylene or polyester is coated on a paper; a baryta paper; a thermoplastic resin film such as polyethylene terephthalate, polyethylene and polypropylene; a synthetic paper; a sheet-like material formed of a synthetic fiber.

A recording medium of a particularly preferably aspect is a recording medium having the substrate and the ink receiving layer as an uppermost layer, provided thereon, and those substrate and ink receiving layer are preferably, for example, those having the following physical properties. As the substrate, a paper (containing a wood pulp) is preferable, and its basis weight is preferably not less than 100 g/m$^2$ and not more than 350 g/m$^2$, further preferably 180 to 260 g/m$^2$. In addition, a thickness is preferably not less than 100 μm and not more than 400 μm, further preferably not less than 180 μm and not more than 260 μm. It is preferable in ink absorbability and printing fastness that the ink receiving layer contains a wet process silica gel as the porous pigment at an amount of not less than 50% by weight not more than 60% by weight in terms of a solid matter based on a weight of a total ink receiving layer, and contains polyvinyl alcohol as the binder resin at an amount of not less than 30% by weight and not more than 40% by weight. In addition, it is preferable in ink absorbability that an amount of the ink receiving layer to be coated is not less than 5 g/m$^2$ and not more than 50 g/m$^2$ in terms of a solid matter. A thickness of the ink receiving layer itself is preferably not less than 10 μm and not more than 40 μm, further preferably not less than 20 μm and not more than 30 μm. A recording medium on which the black ink composition of the present invention is recorded has an average pore diameter on a surface (particularly, ink receiving layer) of the recording medium of preferably not more than 50 nm, more preferably not more than 30 nm. When an average pore diameter exceeds 300 nm, a pigment is permeated into the interior of an ink receiving layer, and color developability is deteriorated in some cases.

(Aged Polyurethane Resin Composition)

An aged polyurethane resin composition can be used together with the water-soluble polyurethane resin or as the water-soluble polyurethane resin. The aged polyurethane resin composition is a composition containing the water-soluble polyurethane resin, a water-soluble organic solvent and water, and not having a substantial change in a viscosity.

By using the aged polyurethane resin composition, a change in a viscosity of an aqueous ink composition containing the water-soluble polyurethane resin can be suppressed. Particularly, in the black ink composition or the light color ink composition of the present invention, since a water-soluble polyurethane resin solid matter is contained relatively at a large amount, it is thought that influence of a change in a viscosity of an ink composition with time is great, but by inclusion of the aged polyurethane resin at least as a part of the water-soluble polyurethane resin, preferably, the water-soluble polyurethane resin as an aged polyurethane resin composition, a viscosity of the ink composition can be stabilized without particularly adding treatment for suppressing a change in a viscosity to an ink composition, or adding an additive therefor to the ink composition. Moreover, even when the aged polyurethane resin composition is used, viscosity stability can be maintained without hampering the original object of the water-soluble polyurethane resin contained in the black ink composition of the present invention.

The aged polyurethane resin composition contains a water-soluble polyurethane resin, a water-soluble organic solvent and water. On the other hand, the aged polyurethane resin component does not contain a pigment. Herein, water-soluble means dispersible, preferably dissoluble in water or an aqueous medium containing water. A polyurethane resin used in the present composition is not particularly limited, but the already explained polyurethane resin can be used.

It is preferable that the polyurethane resin in the aged polyurethane resin composition is not less than 80 wt % of the polyurethane resin contained in an aqueous ink composition to be finally prepared. When the resin is less than 80 wt %, the effect of aging is not sufficiently obtained. More preferable is not less than 90 wt %, and most preferable is a total amount.

In addition, a concentration of the polyurethane resin in the aged polyurethane resin composition is preferably not less than 5 wt % and not more than 50 wt %. When the concentration is less than 5 wt %, the effect of aging is hardly obtained and, when the concentration exceeds 50 wt %, it becomes difficult to prepare a stable composition. More preferably, the concentration is not less than 10 wt % and not more than 40 wt %.

(Water-Soluble Organic Solvent)

The aged polyurethane resin composition can contain one or two or more kinds of water-soluble organic solvents. As the water-soluble organic solvent, an organic solvent which is miscible with water can be used without any limitation, but it is preferable to use a water-soluble organic solvent which constitutes an aqueous medium of the aqueous ink composition, and in which, when a water-soluble organic solvent is mixed with the polyurethane resin, a viscosity of a mixture is increased or changed. Examples of such the water-soluble organic solvent include lower alkyl ethers of polyhydric alcohols, pyrrolidones, and diols. Inter alia, diols are preferable. Diols are preferably straight alkyldiols of a carbon number of 5 to 7, more preferably 1,2-hexanediol. 1,2-Hexanediol is a preferable water-soluble organic solvent in the aqueous ink composition and, at the same time, when mixed with the polyurethane resin, a viscosity is increased. Therefore, by mixing the polyurethane resin and 1,2-hexanediol in advance to stabilize a viscosity, an aged resin excellent in stability of a viscosity can be obtained. It is not necessary that a total amount of a water-soluble organic solvent used in the aqueous ink composition is supplied from the polyurethane resin composition, and it is enough that a water-soluble organic solvent is contained in the polyurethane resin composition at an effective amount to age the polyurethane resin.

As the water-soluble organic solvent, triols are also preferable. Triols have better compatibility with water or diols, and triols can suppress freezing of the polyurethane resin composition and increase in a viscosity due to freezing when the resin composition is stored under a low temperature. Such the triols are preferably straight alkyltriols of a carbon number of 3 to 5, more preferably glycerin (1,2,3-propanetriol). Since glycerin is also a humectant component of the aqueous ink composition, it can be used without considerably changing a composition and physical properties of the aqueous ink composition using the present polyurethane resin composition.

A concentration of the water-soluble organic solvent in the aged polyurethane resin composition is preferably not less than 0.5 wt % and not more than 20 wt %. When the concentration is less than 0.5 wt %, the effect of aging is hardly obtained and, when the concentration exceeds 20 wt %, a stable composition can not be prepared. More preferably, the concentration is not less than 1 wt % and not more than 15 wt %.

A weight ratio of the polyurethane resin and the water-soluble organic solvent in the aged polyurethane resin composition is not particularly limited. Depending on a resin amount in the aqueous ink composition which one finally intends to obtain, the water-soluble organic solvent in the present mixture can be not less than 10 wt % and not more than 100 wt % relative to a solid matter of the polyurethane resin, because effective aging can be performed in this range.

The water-soluble organic solvent such as diol can be not less than 50 wt % and not more than 100 wt % relative to a solid matter of the polyurethane resin. Within this range, the effect of effectively stabilizing a viscosity can be obtained in the aqueous ink composition having a concentration of a pigment such as carbon black of not less than 1.5 wt %. The organic solvent is more preferably not more than 80 wt %, further preferably not more than 73 wt %. In addition, a lower limit is more preferably not less than 60 wt %.

In addition, the water-soluble organic solvent such as diols is preferably not less than 10 wt % and less than 50 wt % relative to a solid matter of the polyurethane resin. Within this range, the effect of effectively stabilizing a viscosity can be obtained in an aqueous ink composition having a content of a pigment such as carbon black of less than 1.5 wt % (particularly, less than 0.4 wt %). When a relatively large amount of the water-soluble polyurethane resin is contained in such the aqueous ink composition having a low pigment content, change in a viscosity due to the water-soluble polyurethane resin can be effectively suppressed by inclusion of the water-soluble organic solvent at the aforementioned ratio. The organic solvent is more preferably not less than 15 wt %, further preferably not less than 20 wt %. An upper limit is more preferably not more than 40 wt %. An aqueous ink composition having a pigment concentration of less than 1.5 wt % will be described later.

The water-soluble organic solvent such as triols is preferably not less than 10 wt % and not more than 100 wt % relative to a solid matter of the polyurethane resin. The organic solvent is more preferably not less than 15 wt %, further preferably not less than 30 wt %, particularly preferably not less than 50 wt %.

(Other Component)

The aged polyurethane resin composition contains at least a water-soluble polyurethane resin and a water-soluble organic solvent, and may be constructed only of them. However, since both of them can be dispersed or dissolved in water, a mixture preferably contains water. For example, the present composition may be constructed only of a polyurethane resin, a water-soluble organic solvent and water. Water is a main medium component in the aqueous ink composition and the ink composition and, by aging in the state where water is contained, aging can be performed effectively. As water, water of a grade of filtered ion-exchanged water or higher is preferably used. It is preferable that the present composition does not contain a pigment.

The aged polyurethane resin composition may contain a basic compound such as an alkali and amines in order to allow the polyurethane resin to be dispersed or dissolved in water. In addition, the composition may contain other components of the aqueous ink composition other than a pigment in such a range that an aging step is not adversely influenced. For example, a component such as a surfactant and a pH adjusting agent which are used upon preparation of the aqueous ink composition may be added. The surfactant, the pH adjusting agent and the like will be described later.

A method of preparing the mixture is not particularly limited. After prescribed amounts of the polyurethane resin and the water-soluble organic solvent are mixed, water can be added as necessary. Alternatively, the polyurethane resin, the water-soluble organic solvent and water can be mixed approximately at the same time. Alternatively, after a mixture of any of the polyurethane resin and the water-soluble organic solvent, and water is prepared, remaining components may be added, followed by mixing. From a viewpoint of maintenance of stability of the polyurethane resin, it is preferable to use an aqueous solution of the polyurethane resin in the mixture.

The aged polyurethane resin composition has no substantial viscosity change. Herein, having no substantial viscosity change means that a viscosity is not greatly changed with time, and is approximately constant. Such the property may be specifically determined based on a viscosity change rate ($\Delta V$) obtained based on the following equation (1) from viscosities, obtained by sealing a prescribed amount of the polyurethane resin composition in a sealable container (a container which is sealable to such an extent that influence of evaporation on a viscosity can be eliminated), allowing this to stand still under a constant temperature of a prescribed temperature (e.g. 70° C.±3° C.) for a prescribed time, and measuring viscosities at initiation of the allowing to stand still and the after completion of the allowing to stand still.

$$\Delta V(\%) = |V - V_0|/V_0 \times 100 \tag{1}$$

In the equation, $V_0$ is a viscosity at initiation of an allowing to stand time, and V is a viscosity after completion of an allowing to stand time. It is preferable that a temperature for measuring a viscosity is 20° C.

For the aged polyurethane resin composition, when an allowing to stand time is one day, the viscosity change rate is preferably not more than 3.0%, more preferably not more than 2.5%, further preferably not more than 2.0%. When the rate is not more than 3.0%, change in a viscosity of an aqueous ink composition which one finally intends to obtain can be avoided or suppressed.

A viscosity in the aged polyurethane resin composition is measured as a dynamic viscosity (unit Pa·s), and is preferably measured by a measuring method using a counterflow viscosity tube, or a measuring method by which equivalent precision and correctness are obtained. Specifically, the viscosity can be measured by a movement time of a liquid (ink) in a tube at 20° C. using a counterflow viscosity tube of a Cannon-Fenske type (typically, Model VMC-252 manufactured by Rigo Co., Ltd.).

In addition, the aged polyurethane resin composition containing triols such as glycerin has no substantial viscosity change at a low temperature. Herein, the low temperature means not higher than 5° C., preferably not higher than 0° C., more preferably not higher than −5° C., further preferably not higher than −10° C. In addition, having no substantial viscosity change has the same meaning as that already described above. Such the property at a low temperature may be specifically determined based on a viscosity change rate ($\Delta V$) obtained based on the above equation (1) from viscosities, obtained by sealing a prescribed amount of a polyurethane resin composition in a sealable container (a container which is sealable to such an extent that influence of evaporation on a viscosity can be eliminated), allowing to stand this at a constant temperature of a prescribed low temperature (e.g. $-20°$ C.$\pm 3°$ C.) for a prescribed time, and measuring viscosities at initiation of the allowing to stand time and after completion of the allowing to stand time. It is preferable that a temperature for measuring a viscosity is 20° C.

Regarding the aged polyurethane resin composition containing triols, when an allowing to stand time at $-20°$ C.$\pm 3°$ C. is 4 days, the viscosity change rate is preferably less than 10.0%, more preferably less than 6.0%. When the rate is less than 10.0%, change in a viscosity of an aqueous ink composition which one finally intends to obtain can be avoided or suppressed.

(Process for Producing Aged Polyurethane Resin Composition)

In order to impart such the properties to the polyurethane resin composition, an aging step of reducing a viscosity of a mixture of the water-soluble polyurethane and the water-soluble organic solvent (hereinafter, a polyurethane resin composition before reaching the state where there is no substantial viscosity change is referred to as mixture) can be performed. In the present invention, aging refers to phenomenon in which a substance causes a chemical change or other phenomenon with time, or operation for causing such the phenomenon. Therefore, it is enough that the aging step in the present invention is a step of allowing a time to elapse regarding the mixture, to such an extent that physical property of a liquid such as a viscosity can be improved or stabilized at preparation of and/or after preparation of an aqueous ink composition as compared with the case where aging is not performed, and it is not necessarily required that any action (temperature etc.) is imparted artificially from the outside. Therefore, the aging step may be waiting between steps or passage of a constant time in the atmosphere at storage, and may be accompanying with other step, not an independent step.

The aging step can be performed, for example, until a viscosity of the mixture itself is stabilized, or until change in a viscosity of an ink composition which one finally intends to obtain for a constant term after preparation of the composition is stabilized to such an extent that the change can be suppressed to a certain change or below. A method of measuring a viscosity of the mixture may be a viscosity measuring method which is used, for example, in the field of an ink and, for example, a method using a Cannon-Fenske-type counter-flow viscosity tube may be used.

A temperature of the aging step is preferably not lower than 40° C. When the temperature is not lower than 40° C., an aging step can be completed in an appropriate term. The temperature is more preferably not lower than 50° C., further preferably not lower than 60° C. In addition, the temperature is preferably not higher than 80° C. When the temperature is not higher than 80° C., physical property of the polyurethane resin composition for an ink is maintained. Therefore, in the aging step, the temperature is preferably not lower than 40° C. and not higher than 80° C., more preferably not lower than 60° C. and not higher than 80° C., most preferably about 70° C. In order to maintain such the aging temperature, it is preferable to perform the aging step with heating.

A time of the aging step is preferably not shorter than 24 hours. When the time is not shorter than 24 hours, the effect of aging is obtained. The time is more preferably not shorter than 48 hours, further preferably not shorter than 72 hours. The time is preferably not shorter than 120 hours in some cases. In addition, the aging step can be not longer than 216 hours. When the aging step is within 216 hours, the effect depending on a time is easily obtained. From a viewpoint of productivity, the time is preferably not longer than 168 hours, more preferably not longer than 144 hours. Therefore, examples of a range of a preferable required time of the aging step include not shorter than 24 hours and not longer than 168 hours, not shorter than 48 hours and not longer than 144 hours, not shorter than 72 hours and not longer than 216 hours, not shorter than 120 hours and not longer than 216 hours and the like.

A required time of the aging step is different also depending on an amount of a water-soluble organic solvent in the mixture. For example, there is a tendency that as an amount of the water-soluble organic solvent is greater relative to an amount of the water-soluble polyurethane resin (solid matter), an aging-required time is relatively shortened. And, there is a tendency that as an amount of the water-soluble organic solvent is smaller, an aging-required time becomes relatively longer. Therefore, in the case of a mixture in which the water-soluble organic solvent is not less than 10 wt % and less than 50 wt % relative to a solid matter of the water-soluble polyurethane resin, the required time is preferably not shorter than 120 hours and not longer than 216 hours, more preferably not shorter than 168 hours and not longer than 216 hours. In addition, in the case of a mixture in which the water-soluble organic solvent is not less than 50 wt % and not more than 100 wt %, the required time is preferably not shorter than 24 hours and not longer than 168 hours, more preferably not shorter than 72 hours and not longer than 120 hours.

From the foregoing, a preferable aging step is at about 70° C. for not shorter than 48 hours and not longer than 144 hours, further preferably at about 70° C. for not shorter than 72 and not longer than 120 hours. In addition, as far as the same effect as the aging effect imparted to the mixture by these aging conditions can be imparted, other aging condition may be used (hereinafter, such the other aging condition is referred to as aging condition equivalent to the condition). Aging condition equivalent to one aging condition can be obtained by assessing the effect obtained by performing an aging step under the condition by which a time and/or a temperature are changed.

In addition, other preferable aging step is at about 70° C. for not shorter than 120 hours and not longer than 216 hours, further preferably at about 70° C. for not shorter than 168 hours and not longer than 216 hours. A further example includes aging condition by which the aging effect equivalent to these conditions is obtained.

The aged polyurethane resin composition thus obtained via the aging step is stabilized by reducing a change in a viscosity with time by aging, and becomes different in physical and chemical characteristics including physical property such as a viscosity, from a polyurethane resin composition obtained by simply mixing them. Therefore, the polyurethane resin composition after the aging step becomes a suitable polyurethane resin composition for preparing an aqueous ink composition.

In addition, the polyurethane resin composition obtained by aging a mixture containing triols can suppress freezing and degeneration (e.g. viscosity increase etc.) of a polyurethane resin composition due to freezing, to maintain suitable physical property for preparing an aqueous ink composition, even when stored at a low temperature, in addition to the aforementioned characteristic.

(Aqueous Ink Composition and Process for Producing the Same)

A process for producing an aqueous ink composition using the aged polyurethane resin composition will be described. An aqueous ink composition contains at least a water-soluble polyurethane resin, a water-soluble organic solvent, water and a pigment, and the aqueous ink composition can be produced using a pigment dispersion solution, an aged polyurethane resin composition and other remaining ink components.

In order to prepare an aqueous ink composition using the aged polyurethane resin composition, the previously known various methods can be adopted without any limitation. Typically, a pigment and a dispersant for a pigment are mixed to prepare a pigment dispersion solution, and the pigment dispersion solution, an aged polyurethane resin composition, and remaining components such as water, a permeation promoter, a water-soluble organic solvent, a pH adjusting agent, an antiseptic, a mildewcide are mixed, and sufficiently stirred to dissolve them. After sufficient stirring, filtration is performed to remove a coarse particle and a foreign matter which are to be a cause for choking, thereby, an aqueous ink composition can be obtained. Upon preparation of such the aqueous ink composition, remaining components may be added to a polyurethane resin composition and mixed. Particularly, it is preferable to prepare a pigment dispersion solution using a styrene-acrylic acid resin.

Although, in the aforementioned typical example, a pigment dispersion solution was prepared independently of an aged polyurethane resin composition, an aqueous ink composition may be prepared by preparing a pigment dispersion solution using an aged polyurethane resin composition and a pigment, and mixing this with a vehicle containing remaining components which have been prepared separately. Alternatively, an aged polyurethane resin composition, and other all components constituting an aqueous ink composition may be appropriately mixed in an arbitrary incorporation order to prepare an aqueous ink composition.

Upon preparation of an aqueous ink composition, an appropriate dispersing machine (e.g. ball mill, sand mill, attritor, roll mill, agitator mill, Henschel mixer, colloid mill, ultorasonic homogenizer, jet mill, ong mill etc.).

An aqueous ink composition using the aged polyurethane resin composition, as already explained in the black ink composition, contains, if necessary, a dispersant, a water-soluble organic solvent, an agent for preventing choking of a nozzle, an antioxidant, an oxygen absorbing agent, an electrical conductivity adjusting agent, a surface tension adjusting agent, a permeation promoter, a moisturizing agent, a pH adjusting agent, a surfactant, a viscosity adjusting agent, an antifoaming agent, a mildewcide, a solubilizer and the like, in addition to a pigment.

As the pigment, various pigments explained in the first embodiment can be appropriately used. According to a preferable aspect of the present invention, an average particle diameter of the pigment is preferably not more than 150 nm, more preferably around not less than 50 nm and not more than 100 nm. An addition amount of the pigment may be appropriately determined in such a range that a sufficient image concentration can be realized and, in an aqueous ink composition which is a final product, the amount is preferably not less than 0.1 wt % and not more than 20 wt %, more preferably not less than 0.2 wt % and not more than 10 wt %.

A blending amount of the pigment can be appropriately changed depending on a kind of an ink composition such as a concentrated and light shade ink composition. Examples of an aqueous ink composition having a pigment concentration of less than 1.5 wt % include a light black ink composition. The light black ink composition is used for ink jet recording by combining with a black ink composition containing not less than 1.5 wt % of carbon black. Examples of such the light black ink composition include a light black ink composition having a carbon black content of not less than 0.4 wt % and less than 1.5 wt %, and a light black ink composition having a carbon black content of not less than 0.01 wt % and less than 0.4 wt % described in JP-A-2004-225036 and JP-A-2004-225037.

It is preferable that an aqueous ink composition using the aged polyurethane resin composition is used in a light black ink composition having a carbon black content of not less than 0.4 wt % and less than 1.5 wt %. Examples include a composition in which a content of a solid matter of a water-soluble polyurethane resin is not less than 0.67-fold and not more than 2.5-fold the carbon black content. In this light black ink composition, an amount of a water-soluble polyurethane resin solid matter may be not less than 0.2 wt % and not more than 4 wt %, preferably not less than 0.5 wt % and not more than 2 wt %. In such the light black ink composition, since a water-soluble polyurethane resin is a main resin, it is effective to use an aged water-soluble polyurethane resin. A content of the pigment in such the light black ink composition is preferably not less than 0.1 wt % and not more than 1.3 wt %, further preferably not less than 0.4 wt % and not more than 1.0 wt %.

In addition, examples of the light black ink composition having a carbon black content of less than 0.4 wt % include a composition in which a content of a solid matter of a water-soluble polyurethane resin is not less than 7.5-fold the carbon black content. In this light black ink composition, an amount of a water-soluble polyurethane resin solid matter may be not less than 1 wt % and not more than 10 wt %, preferably not less than 2 wt % and not more than 6 wt %. In such the light black ink composition, since a polyurethane resin is a main resin, and a large amount of a water-soluble polyurethane resin is contained as compared with the pigment, it is further effective to use an aged water-soluble polyurethane resin.

In addition, as the aqueous ink using an aged polyurethane resin composition, examples of the aqueous ink composition having a concentration of less than 1.5 wt % include a light color ink composition containing a pigment which has a color other than black. Examples include a light magenta composition and a light cyan ink composition. These light color ink compositions are usually used for ink jet recording by combining with a color ink composition containing not less than 1.5 wt % of a colored pigment.

Examples of the light color ink composition having a content of a colored pigment of not less than 0.5 wt % and less than 1.5 wt % include a composition in which a content of a solid matter of a water-soluble polyurethane resin is not less than 0.67-fold and not more than 2.5-fold a content of the colored pigment. In this light color ink composition, an amount of a water-soluble polyurethane resin solid matter may be not less than 0.3 wt % and not more than 4 wt %. In such the light color ink composition, since a water-soluble polyurethane resin is a main resin, it is effective to use an aged water-soluble polyurethane resin.

In addition, examples of variously colored color ink compositions of a normal concentration in which a content of a colored pigment is not less than 1.5 wt % and less than 7 wt % include a composition in which a content of a solid matter of a water-soluble polyurethane resin is not less than 0.04-fold and not more than 0.35-fold a content of the colored pigment. In this color ink composition, an amount of a water-soluble polyurethane resin solid matter may be not less than 0.05 wt % and not more than 2.5 wt %. In such the color ink composition, since a water-soluble polyurethane resin is a main resin, it is effective to use an aged water-soluble polyurethane resin.

(Dispersant)

Examples of a preferable polymer material as a dispersant for a pigment used in a pigment dispersant include dispersing materials exemplified in the first embodiment. Inter alia, particularly, it is preferable to use a polymer compound having a carboxyl group (a form of a salt is preferable) (e.g. the aforementioned styrene-acrylic acid resin, styrene-maleic acid resin, styrene-maleic acid anhydride resin, vinylnaphthalene-acrylic acid copolymer, vinylnaphthalene maleic acid copolymer, vinyl acetate-acrylic acid copolymer), a copolymer of a monomer having a hydrophobic group and a monomer having a hydrophilic group, and a polymer consisting of a monomer having both of a hydrophobic group and a hydrophilic group in a molecular structure. More preferable is a styrene-acrylic acid resin. Examples of the salt include salts of diethylamine, ammonia, ethylamine, triethylamine, propylamine, isopropylamine, dipropylamine, butylamine, isobutylamine, triethanolamine, diethanolamine, aminomethylpropanol, and morpholine. These (co)polymers have a weight average molecular weight of preferably 3,000 to 30,000, more preferably 5,000 to 15,000.

Examples of a further other preferable polymer material include a natural polymer, and specific examples include glue, gelatin, proteins such as casein and albumin, natural gums such as gum arabic, and gum tragacanth, glycosides such as saponin, alginic acid, alginic acid derivatives such as alginic acid propylene glycol ester, alginic acid triethanolamine, and alginic acid ammonium, and cellulose derivatives such as methylcellulose, carboxymethylcellulose, hydroxyethylcellulose, and ethylhydroxyethylcellulose.

Examples of the dispersant also include anionic surfactants such as fatty acid salts, higher alkyldicarboxylic acid salts, higher alcohol sulfate ester salts, higher alkylsulfonate salts, condensates of higher fatty acid and amino acid, sulfosuccinic acid ester salts, naphthenic acid salts, liquid fatty oil sulfate ester salts, and alkylallylsulfonate salts; cationic surfactants such as fatty acid amine salt, quaternary ammonium salt, sulfonium salt, and phosphonium; nonionic surfactants such as polyoxyethylene alkyl ethers, polyoxyethylene alkyl esters, sorbitan alkyl esters, and polyoxyethylene sorbitan alkyl esters. The surfactants also exert the function as a surfactant by addition to an ink composition. In addition, the already described polyurethane resin can be also used as a dispersant, and the aged polyurethane resin can be also used as a dispersant.

In addition, in the ink composition used in the present invention, in place of the aforementioned pigment, a so-called surface-treated pigment in which a dispersibility imparting group is directly introduced chemically on a pigment particle surface (self-dispersion pigment) may be used.

(Water-Soluble Solvent)

As the water-soluble organic solvent, a water-soluble organic solvent contained in the aged polyurethane resin composition may be used, a water-soluble organic solvent other than the water-soluble organic solvent may be used, or a combination thereof may be used. Examples of such the water-soluble organic solvents include polyhydric alcohols such as glycerin, ethylene glycol, diethylene glycol, triethylene glycol, tetraethylene glycol, propylene glycol, dipropylene glycol, tripropylene glycol, polyethylene glycol having Mw of not more than 2000, 1,3-propylene glycol, isopropylene glycol, isobutylene glycol, mesoerythritol, and pentaerythritol, and pyrrolidones. As polyhydric alcohols, glycerin is preferable. These water-soluble organic solvents are preferable in that they can improve dissolving property of other components in an aqueous ink composition into an ink composition, can improve permeability into a recording medium, for example, a paper, and can effectively prevent choking a nozzle. An addition amount of such the water-soluble organic solvents may be appropriately determined, and is preferably not less than about 1 wt % and not more than about 30 wt %, more preferably not less than about 5 wt % and not more than about 20 wt % in an aqueous ink composition.

In addition, examples of other preferable water-soluble organic solvent include lower alcohols such as methanol, ethanol, and isopropyl alcohol; lower alkyl ethers of polyhydric alcohols such as ethylene glycol monomethyl ether, diethylene glycol monoethyl ether, diethylene glycol monobutyl ether, triethylene glycol monobutyl ether, propylene glycol monobutyl ether, and propylene glycol monobutyl ether, and diols. One or two or more kinds of them may be used. The lower alkyl and the lower alcohol refer to straight and branched alkyl groups of a carbon number of around 1 to 5 or alcohols thereof. These water-soluble organic solvents can enhance wettability of a paper to improve permeability into a recording medium. As diols, as already explained, for example, straight alkyldiols of a carbon number of 5 to 7 are preferable, and 1,2-hexanediol is more preferable. These water-soluble organic solvents are preferably not less than about 1 wt % and not more than about 15 wt %, more preferably not less than about 2% and not more than about 10 wt % in an aqueous ink composition.

As the permeation promoter, various surfactants such as cationic surfactants, anionic surfactants, and nonionic surfactants can be used. As the permeation promoter, the acetylene glycol-based compound represented by the general formula (1), and the polysiloxane-based compound represented by the general formula (2) which were explained in the first embodiment may be used. As the acetylene glycol-based compound, a commercially available compound may be used, examples include Surfinol 82, 440, 465, STG (trade name, manufactured by Air Products and Chemicals, Inc.), and Olfine Y, and Olfine E1010 (trade name, manufactured by Nisshin Chemical Industry Co., Ltd.), and one or two or more kinds of them are used. In addition, as the polysiloxane-based compound, for example, a silicone-based surfactant BYK-345, BYK-346, BYK-347, or BYK-348 which is commercially available from Bigchemie Japan can be utilized. The acetylene glycol-based compound and/or the polysiloxane-based compound is contained in the ink at preferably 0.1 to 5 wt %, further preferably 0.5 to 2 wt %.

In addition, examples of the antiseptic agent/the mildewcide include sodium benzoate, sodium pentachlorophenol, sodium 2-pyridinethiol-1-oxide, sodium sorbate, sodium dehydroacetate, and 1,2-dibenzinethiazoline-3-one (Proxel CRL, Proxel BND, Proxel GXL, Proxel XL-2, Proxel TN of Avecia).

Further, examples of the pH adjusting agent or the solubilizer include amines such as diethanolamine, triethanolamine, propanolamine, and morpholine, and modified products of them, inorganic salts such as potassium hydroxide, sodium hydroxide, and lithium hydroxide, ammonium hydroxide, quaternary ammonium hydroxide (tetramethylammonium etc.), carbonates such as potassium carbonate, sodium carbonate and lithium carbonate, phosphate, N-methyl-2-pyrrodilone, ureas such as urea, thiourea and tetramethylurea, allophanates such as allophanate, and methylallophanate, biurets such as biuret, dimethylbiuret and tetramethylbeuret, and L-ascorbic acid and a salt thereof.

Examples of the antioxidant and the ultraviolet absorbing agent include Tinuvin 328, 900, 1130, 384, 292, 123, 144, 622, and 770, Irgacor 252 and 153, Irganox 1010, 1076 and 1035, and MD1024 of Ciba-Geigy, and oxide of lanthanide.

According to the aged polyurethane resin composition, change in physical properties such as a viscosity of an aqueous ink composition at preparation of, and after preparation of an aqueous ink composition containing a water soluble polyurethane resin can be stabilized. Therefore, particularly, it becomes possible to provide an ink composition which can avoid or suppress change in a viscosity of an aqueous ink composition having a large content of a water-soluble polyurethane resin to exert the stable discharge ability and, at the same time, is excellent in the image forming ability.

In addition, according to the aged polyurethane resin composition, by aging a polyurethane resin composition containing a polyurethane resin and a water-soluble organic solvent in the state where no pigment is contained, the aging effect is obtained at a small scale and/or in a short time. For this reason, effective production becomes possible and, on the other hand, production adjustment becomes easy.

In the thus obtained aqueous ink composition, physical properties such as a viscosity and the like are stabilized immediately after preparation thereof or thereafter as compared with the case where a polyurethane resin composition is not used. Therefore, for example, the aqueous ink composition has better discharge stability as an aqueous ink composition for an ink jet printer. In addition, the aqueous ink composition of the present invention is in a preferable form that a viscosity change rate ($\Delta V$) calculated from the following equation (1) from viscosities, obtained by sealing a prescribed amount of the composition into a sealable container, allowing this to stand still under a constant temperature of a prescribed temperature (preferably, goal temperature ±3° C.) continuously for a term until a prescribed term has passed, and measuring viscosities at initiation of the allowing to stand time and after completion of the allowing to stand still.

$$\Delta V(\%) = |V - V_0|/V_0 \times 100 \quad (1)$$

In the equation, $V_0$ is a viscosity at initiation of an allowing to stand still, and $V$ is a viscosity after completion of an allowing to stand still.

In this respect, the allowing to stand still can be initiated from initiation of allowing to stand at a prescribed temperature. For example, it can be also initiated from at time point of production of an aqueous ink composition. The time point of production of an aqueous ink composition can be a time point of preparation of an aqueous ink composition in a tank (first time), a time point of filling into a container for storage from a tank (second time), or a time point of filling of an aqueous ink composition into a package container or a similar container (third time).

In addition, as an assessment standard of the aqueous ink composition using the aged polyurethane resin composition, the goal temperature can be one temperature in a range of 50° C. to 70° C. Specifically, the temperature is 50° C., 60° C., 70° C. or the like. In addition, the allowing to stand still is appropriately set, and can be 3 days or longer. Further, the viscosity change rate is different depending on properties required based on utility of the aqueous ink composition and a nozzle structure, and for example, when stored at 70° C.±3° C., the rate can be less than 10%, preferably less than 7%, more preferably less than 4% for 6 days.

In addition, a viscosity in the aqueous ink composition is measured as a dynamic viscosity (unit Pa·s), and it is preferable that measurement of the viscosity is according to a measuring method using a counterflow viscosity tube, or a measuring method by which equivalent precision and correctness are obtained. Specifically, the viscosity can be measured by a movement time of a liquid (ink) in a tube at 20° C. using a Cannon-Fenske-type counterflow viscosity tube (typically, Model VMC-252 manufactured by Rigo Co., Ltd.).

In addition, in the aqueous ink composition, it is preferable that a solid matter of the water-soluble polyurethane resin is not less than 0.5 wt % and not more than 10 wt %. When the water-soluble polyurethane resin is less than 0.5 wt %, the composition can not function as an ink jet composition and, when the solid matter exceeds 10 wt %, a viscosity of a composition is increased, and the composition also can not function as an ink. More preferably, a solid matter of the water-soluble polyurethane resin is not less than 1 wt % and not more than 8 wt %.

Particularly, it is preferable that the aqueous ink composition of the present invention is the aforementioned light black ink composition. As a content of the water-soluble polyurethane resin is higher, the aqueous ink composition of the present invention is more effective. By the fact that the light black ink composition containing the water-soluble polyurethane resin as a main resin has better viscosity stability, a monochromic image or a gray scale having a high precision can be obtained with better reproductivity.

It is preferable that the aqueous ink composition of the present invention contains the water-soluble organic solvent at not less than 0.5 wt % and not more than 20 wt %. Within this range, increase in a viscosity of the composition is suppressed and, at the same time, the aging effect is sufficiently exerted. More preferably, the water-soluble organic solvent is not less than 1 wt % and not more than 10 wt %. Particularly, it is preferable that the aqueous ink composition of the present invention contains 1,2-diol such as 1,2-hexanediol at not less than 1 wt % and not more than 10 wt %. In addition, it is preferable that the composition contains a moisturizing component such as glycerin at not less than 5 wt % and not more than 25 wt %.

Further, it is preferable that the aqueous ink composition contains a water-dispersible styrene acrylic acid resin as a dispersant. It is preferable that the composition contains a water-dispersible styrene-acrylic acid resin at not less than 0.5 wt % and not more than 10 wt %. When the resin is less than 0.5 wt %, dispersion becomes unstable and, when the resin exceeds 10 wt %, dispersion also becomes unstable. More preferably, the resin is not less than 1 wt % and not more than 10 wt %.

In addition, according to the present invention, a recording method for printing on a recording medium by adhering an ink composition, comprising using the aforementioned ink composition is provided. Examples include an ink jet recording format, a recording format with a writing tool such as a pen, and other various printing formats. Particularly, according to the present invention, an ink jet recording method for performing printing by discharging droplets of an ink composition, and adhering the droplets to a recording medium, comprising using the aforementioned ink composition as an ink composition is provided. Furthermore, according to the present invention, a recorded matter obtained by printing by the aforementioned recording method is provided.

EXAMPLES

The present invention will be explained further specifically below by way of Examples, but these Examples do not limit the scope of the present invention. Unless otherwise indicated, "%" and "part" in Examples are based on a weight.

Example I (1) Preparation of Black Ink Composition

Regarding nine kinds of black ink compositions described in the following Table 1, a pigment dispersion solution was prepared as follows. Thereafter, a water-soluble polyurethane resin and the like were added, and this was mixed to obtain a black ink composition.

Specifically, a pigment shown in Table 1 (carbon black, Pigment Blue 15:3) and a water-soluble resin (dispersant) were mixed to prepare a pigment dispersion solution, a water-soluble polyurethane resin (polyester-based polyurethane resin, acid value 50, triethylamine neutralized) and the like were further added, and these were dispersed together with glass beads [diameter=1.7 mm; 1.5-fold amount (weight) of mixture] in a sand mill (manufactured by Yasukawa Seisakusho) for 2 hours, to obtain each of nine kinds of black ink compositions. That is, regarding one kind of carbon black, a high concentrated black ink composition K1 was obtained, regarding four kinds of immediate concentrated black ink compositions for intermediate gradation, K2, K4 (Example), K6, and K8 (Comparative Example) were obtained and, further as four kinds of low concentrated black ink compositions, K3, K5 (Example), K7, and K9 (Comparative Example) were obtained. As a water-soluble resin (dispersant) described in Table 9, a styrene-acrylic acid copolymer (molecular weight=15000; acid value=100) was used. AQ593 is a polypropylene-type emulsion (manufactured by Bigchemie Japan), and BYK348 is a silicone-based surfactant. In Table 1, unit is % by weight except from three lines from a lowest column, and each ink further contains pure water to a total of 100%.

(2) Ink Set

Each black ink composition shown in Table 1, a light cyan ink composition, a light magenta composition, and a yellow ink composition were combined as shown in Table 2, to obtain ink sets of Examples 1 and 2, and ink sets of Comparative Examples 1 and 2. As a pigment of the light cyan ink composition (1%), the light magenta composition (1%) and the yellow ink composition (5.0%), PB-15:3, PV-19, and PY-74 were used, respectively.

TABLE 2

| Ink set | High concentration | Intermediate concentration | Low concentration | Lm | Lc | Y |
|---|---|---|---|---|---|---|
| Example 1 | K1 | K2 | K3 | Common | Common | Common |
| Example 2 | K1 | K4 | K5 | | | |
| Comparative Example 1 | K1 | K6 | K7 | | | |
| Comparative Example 2 | K1 | K8 | K9 | | | |

(3) Assessment Method 1 (Phase Shift and Golden Gloss)

[1] Recording Method

Respective ink sets of Examples 1 to 2 and Comparative Examples 1 to 2 were filled into a black ink chamber (high concentrated black ink composition of K1), a gray ink chamber (black ink compositions for intermediate gradation of K2, K4, K6 and K8) and a cyan ink chamber (low concentrated black ink compositions of K3, K5, K7 and K9), respectively, of an exclusive use cartridge of an ink jet printer (PM-4000PX; manufactured by Seiko Epson Corporation). Similarly, the light cyan ink composition, the light magenta ink composition, and the yellow ink composition were filled into ink chambers, respectively, shown in the following Table 3.

TABLE 1

| | | Kind of black ink composition | | | | | | | | |
|---|---|---|---|---|---|---|---|---|---|---|
| | | K1 | K2 | K3 | K4 | K5 | K6 | K7 | K8 | K9 |
| Carbon black (c) | | 1.50 | 0.73 | 0.21 | 0.72 | 0.20 | 0.73 | 0.21 | 0.72 | 0.20 |
| Pigment Blue 15:3 | | 0.19 | 0.09 | 0.03 | — | — | 0.09 | 0.03 | — | — |
| Water-soluble resin (dispersant) | | 1.69 | 0.81 | 0.24 | 0.72 | 0.20 | 0.81 | 0.24 | 0.72 | 0.20 |
| Water-soluble polyurethane resin (solid matter 15%) | | — | 6.67 | 20 | 6.67 | 20 | — | — | — | — |
| AQ593 (solid matter 30%) | | 0.33 | 3.33 | 5 | 3.33 | 5 | 3.33 | 5 | 3.33 | 5 |
| Glycerin | | 18 | 21 | 18 | 22 | 17 | 25 | 25 | 26 | 24 |
| 1,2-Hexanediol | | 8 | 5 | 5 | 5 | 5 | 5 | 5 | 5 | 5 |
| Triethanolamine | | 0.9 | 0.9 | 0.9 | 0.9 | 0.9 | 0.9 | 0.9 | 0.9 | 0.9 |
| BYK348 | | 0.3 | 0.5 | 0.5 | 0.5 | 0.5 | 0.5 | 0.5 | 0.5 | 0.5 |
| EDTA | | 0.02 | 0.02 | 0.02 | 0.02 | 0.02 | 0.02 | 0.02 | 0.02 | 0.02 |
| Pure water | | Residual quantity | Residual quantity | Residual quantity | Residual quantity | Residual quantity | Residual quantity | Residual quantity | Residual quantity | Residual quantity |
| Total (Weight %) | | 100 | 100 | 100 | 100 | 100 | 100 | 100 | 100 | 100 |
| Resin solid matter (Weight %) | Water-soluble polyurethane resin (a) | — | 1 | 3 | 1 | 3 | — | — | — | — |
| | AQ593 (b) | 0.1 | 1 | 1.5 | 1 | 1.5 | 1 | 1.5 | 1 | 1.5 |
| | Total amount (a + b) | 0.1 | 2 | 4.5 | 2 | 4.5 | 1 | 1.5 | 1 | 1.5 |
| a/c | | — | 1.34 | 14.3 | 1.39 | 15 | — | — | — | — |
| (a + b)/c | | — | 2.73 | 21.4 | 2.78 | 22.5 | 1.37 | 7.14 | 1.37 | 7.5 |
| a/(a + b) | | — | 50% | 66.70% | 50% | 66.70% | — | — | — | — | a/c: Ratio of content of solid matter of water-soluble polyurethane resin relative to carbon black
(a + b)/c: Ratio of total amount of resin solid matter relative to carbon black
a/(a + b): Ratio (%) of amount of solid matter of water-soluble polyurethane resin relative to amount of total resin solid matter

TABLE 3

| Ink composition used | Ink chamber used |
| --- | --- |
| High concentrated black ink composition K1 | Black ink chamber |
| Intermediate concentrated black ink composition K2, K4, K6, K8 | Gray ink chamber |
| Low concentrated black ink composition K3, K5, K7, K9 | Cyan ink chamber |
| Light cyan ink composition | Light cyan ink chamber |
| Light magenta ink composition | Magenta ink chamber |
| Yellow ink composition | Light magenta ink chamber |

Regarding each ink set, outputting was performed on an exclusive use recording paper for ink jet (PM photographic paper: manufactured by Seiko Epson Corporation) at resolution of 1440×720 dpi, and gray gradation patterning (gray scale) from white to black was performed at a non-stage without sectioning gradation, respectively. Outputting was performed by distributing a discharge amount of each ink.

[2] Assessment of Confirmation of Phase Shift

Phase shift was assessed by five observers. An outputted recorded matter was placed on a desk 1.5 m immediately beneath a fluorescent lamp which is indoor light, and observers were made to stand beside the desk. Observers observed the printed matter from a right end to a left end by moving their line of sight with various visual angles from the upright state without interrupting light. Results of the observance are shown in the following Table 4. In a recorded matter in which phase shift occurred, when it is observed with a line of sight at a certain constant angle, light of a fluorescent lamp is whitely and strongly reflected, and the recorded matter looks as being inverted, in a black output color in a range of a gray level of 40 to 60. In Table 4, a denominator indicates the number of total observers (5), and a numerator indicates the number of persons which confirmed phase shift.

TABLE 4

| | Example | | Comparative Example | |
| --- | --- | --- | --- | --- |
| | 1 | 2 | 1 | 2 |
| Assessment of confirmation of phase shift | 0/5 | 0/5 | 4/5 | 5/5 |

[3] Assessment of Confirmation of Golden Gloss

Golden gloss was assessed by five observers. An outputted recorded matter was placed on a desk 1.5m immediately beneath a fluorescent lamp which is indoor light, and observers were made to stand beside the desk. Observers observed the printed matter from a right end to a left end by moving their line of sight with various visual angles from the upright state without interrupting light. Results of the observance are shown in the following Table 5. In a recorded matter in which golden gloss occurred, when it is observed with a line of sight at a certain constant angle, light of a fluorescent lamp looks as being strongly reflected at a goldenish color, in a black output color in a range of a gray level of around 140. In Table 5, a denominator indicates the number of total observers (5), and a numerator indicates the number of persons which confirmed golden gloss.

TABLE 5

| | Example | | Comparative Example | |
| --- | --- | --- | --- | --- |
| | 1 | 2 | 1 | 2 |
| Assessment of confirmation of golden gloss | 0/5 | 0/5 | 5/5 | 5/5 |

As shown in Tables 4 and 5, according to the ink sets of Examples, it was seen that phase shift and golden gloss were avoided in all cases. Therefore, according to ink sets of Examples, it was seen that a recorded matter in which phase shift and GG are effectively avoided or suppressed can be obtained.

(4) Assessment Method 2 (Surface Defect)

[1] Recording Method

Respective ink sets of Examples 1 to 2 and Comparative Examples 1 to 2 were filled into a black ink chamber (high concentrated black ink composition K1), a mat black ink chamber (black ink compositions for intermediate gradation of K2, K4, K6 and K8) and a yellow ink chamber (low concentrated black ink compositions of K3, K5, K7 and K9), respectively, of an exclusive use cartridge of an ink jet printer (PX-G900; manufactured by Seiko Epson Corporation). Similarly, the light cyan ink composition, the light magenta ink composition and the yellow ink composition were filled into ink chambers, respectively, shown in the following Table 6.

TABLE 6

| Ink composition used | Ink chamber used |
| --- | --- |
| High concentrated black ink composition K1 | Black ink chamber |
| Intermediate concentrated black ink composition K2, K4, K6, K8 | Mat black ink chamber |
| Low concentrated black ink composition K3, K5, K7, K9 | Yellow ink chamber |
| Light cyan ink composition | Cyan ink chamber |
| Light magenta ink composition | Magenta ink chamber |
| Yellow ink composition | Gloss optimizer ink chamber |

Figure 2:
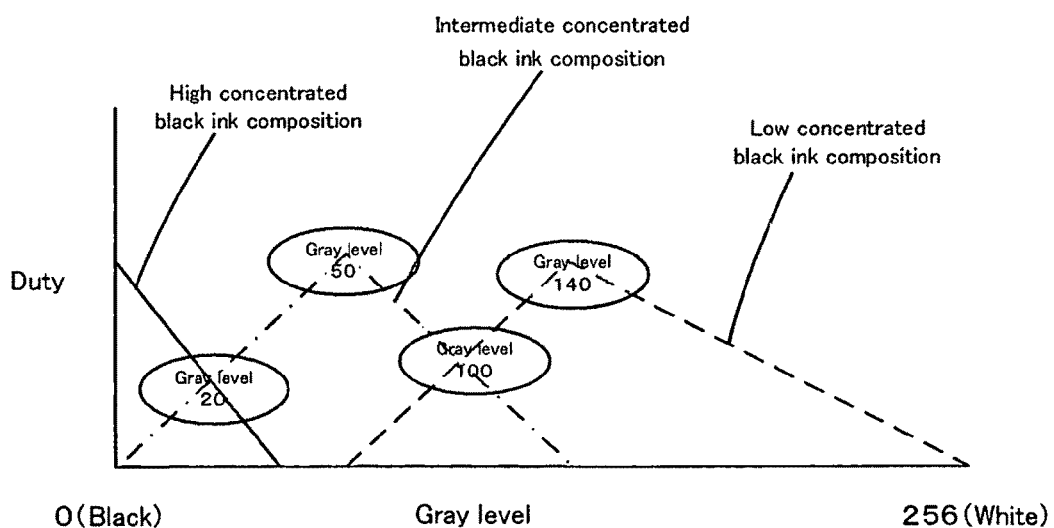
FIG. 2 is a graph showing a relationship between a gray level and printing duty of black ink compositions having a gray level of 140, 100, 50 and 20.

As outputting, divided gray plain patterns of four concentrations of a gray level of 140, 100, 50 and 20 shown in FIG. 2 were continuously printed by 100 pages on an ink jet exclusive use recording paper (PM photographic paper: manufactured by Seiko Epson Corporation) at resolution of 2880×1440 dpi.

[2] Assessment of Confirmation of Surface Defect

Regarding recorded matters after continuous printing, five observers observed a surface defect consisting of a contact trace at a recording paper holding member of an outputted matter. This contact trace is formed by a protrusion of a roller which is a gear-like thin plate being a recording paper holding, or the protrusion to which a resin component has been adhered and solidified, which leaves a fine concave dot track (roller trace) by contact with an image surface of a recorded matter. Results of observation are shown in Table 7. In Table 7, a denominator indicates the number of total observers (5), and a numerator indicates the number of persons which confirmed a surface defect.

TABLE 7

|  | Example | | Comparative Example | |
|---|---|---|---|---|
|  | 1 | 2 | 1 | 2 |
| Assessment of confirmation of surface defect | 0/5 | 0/5 | 5/5 | 5/5 |

As shown in FIG. 2 and Table 7, according to ink sets of Examples, it was seen that a surface defect such as a roller trace was avoided over a wide gray level. Therefore, it was seen that, according to ink sets of Examples, a recorded matter in which phase shift and GG were effectively avoided or suppressed and, at the same time, which has a high quality surface without a surface defect can be provided.

Example II

Then, ink exchange between K1 (photo-black ink composition-carbon black which is not self-dispersion) and K10 (mat black ink composition-self dispersion carbon black) was performed, and an image was printed on a non-glossy medium (mat-based media) by further combining with intermediate concentrated and low concentrated black inks, and the resulting recorded-matter will be explained as Example.

(1) Preparation of Black Ink Composition

Regarding a black ink composition of K10 described in the following Table 8, an aqueous medium was added and mixed as follows, to obtain a black ink composition.

Specifically, based on Table 8, a pigment (self-dispersion carbon black) was mixed with an aqueous medium, and the mixture was dispersed together with glass beads [diameter=1.7 mm; 1.5-fold amount (weight) of mixture] in a sand mill (manufactured by Yasukawa Seisakusho) for 2 hours, to obtain a black ink composition containing self-dispersion carbon black of K10.

TABLE 8

| Ink No. | K10 |
|---|---|
| Carbon black (self-dispersion type) | 6 |
| Pigment blue 15:3 | — |
| Water-soluble resin (dispersant) | — |
| Water-soluble polyurethane resin (solid matter 15%) | — |
| AQ593 (solid matter 30%) | — |
| Glycerin | 15 |
| 1,2-Hexanediol | 3 |
| Triethylene glycol monobutyl ether | 1 |
| 2-Pryrrolidone | 2.4 |
| Triethylene glycol | 2 |
| Triethanolamine | 0.9 |
| BYK348 | — |
| Olefine E1010 | 1 |
| EDTA | 0.02 |
| Pure water | Residual quantity |
| Total (%) | 100 |

(Weight %)

(2) Ink Set

Each black ink composition of K2 and K3 shown in Table 1, and a cyan ink composition, a light cyan ink composition, a magenta ink composition, a light magenta ink composition and a yellow ink composition in addition to the above-prepared K10 black ink composition were combined as shown in Table 9, to constitute an ink set of Example 3. Each ink composition of these ink sets was filled into each ink chamber of an exclusive use cartridge of an ink jet printer A (PX-G900; manufactured by Seiko Epson Corporation) as shown in Table 9. Hereinafter, this printer is referred to as printer A (Example 3).

As a pigment for the cyan ink composition (4.0%), the light cyan ink composition (1%), the magenta ink composition (5.5%), the light magenta ink composition (1%) and the yellow ink composition (5.0%), PB-15:3, PV-19, and PY-74 were used, respectively. As Comparative Example, a commercially available PX-G900 ink cartridge (cartridge in which an ink set of photo-black ink composition (carbon black concentration 1.5%), mat black ink composition (carbon black concentration 6%), cyan ink composition, magenta ink composition, blue ink composition, red ink composition and gloss optimizer ink composition is filled into each ink chamber) was installed into an ink jet printer A (PX-G900; manufactured by Seiko Epson Corporation). Hereinafter, this printer is referred to as printer B (Comparative Example 3).

TABLE 9

| Ink composition used | Ink chamber used |
|---|---|
| Mat black ink composition(K10) | Black ink chamber |
| Intermediate concentrated black ink composition(K2) | Mat black ink chamber |
| Low concentrated black ink composition(K3) | Yellow ink chamber |
| Cyan ink composition | Red ink chamber |
| Light cyan ink composition | Cyan ink chamber |
| Magenta ink composition | Blue ink chamber |
| Light magenta ink composition | Magenta ink chamber |
| Yellow ink composition | Gloss optimizer ink chamber |

(3) Assessment Method (Assessment of Hue Change Due to Occurrence of Ink Weight Unevenness)

Using printers A and B, printing was performed on an exclusive use recording paper (photomat paper manufactured by Seiko Epson Corporation) at resolution of 1440×720, and a gray scale having a patch of 18 gradation was outputted. Both used output data so that outputted colors become approximately the same. Further, thereupon, only a discharge ink weight of one ink composition contained in each ink set was decreased by 10%, sequentially, a kind of an ink composition reducing a discharge ink weight by 10% was changed, and the same data was outputted regarding a combination of respective ink weights. A driving voltage for obtaining a specified ink weight was determined by discharging an ink by changing a voltage driving a head, and actually measuring an ink weight.

Regarding output data obtained with a normal ink weight and output data obtained by decreasing an ink weight, color measurement was performed, respectively, using Gretagmacbeth SPM50 manufactured by Gretag, to obtain an a*b* value of CIE specification of each patch. Color measuring condition was such that a light source was D50, a white standard was absolute white without a light source filter, and a field angle was 2 degree. A change degree Δa*b* between output data obtained with a normal ink weight and output data obtained by degreasing an ink weight was calculated, and was assessed based on the following standard. Results are shown in Table 10.

A: Δa*b* is not more than 2 in all patches

B: Δa*b* exceeds 2 in not more than 3 patches, but is not more than 2 in other patches.

C: Δa*b* exceeds 2 in not more than 6 patches, but is not more than 2 in other patches.

D: Δa*b* exceeds 2 in not less than 7 patches.

TABLE 10

|  | Printer A (Example 3) | Printer B (Comparative Example 3) |
|---|---|---|
| Assessment of change in hue due to occurrence of ink weight unevenness | A | C |

Figure 3:
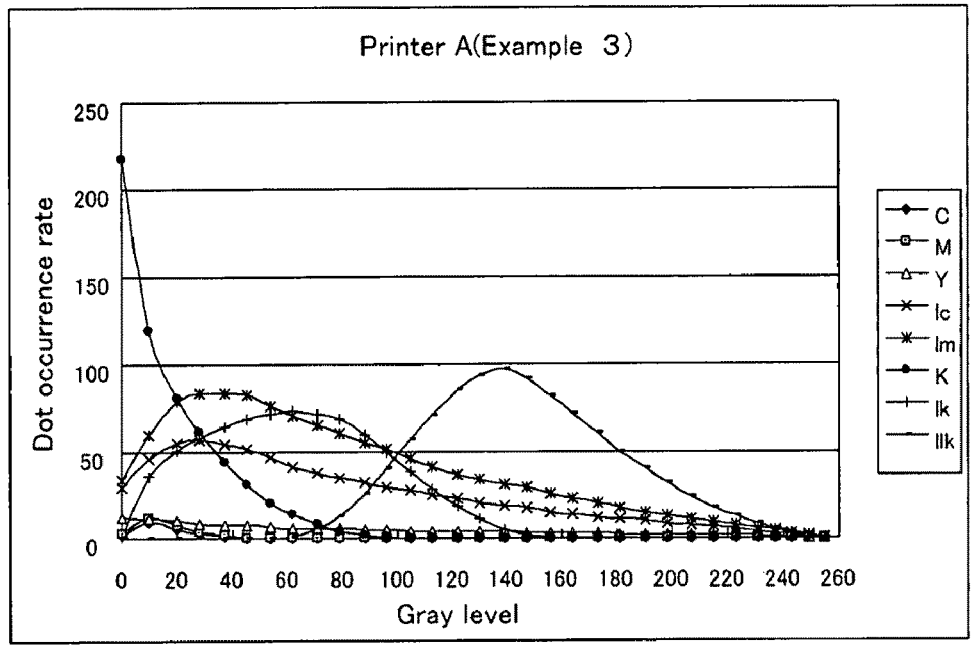
FIG. 3 is a view showing a relationship between a use amount of an ink and a gray level of each ink composition at preparation of a better gray scale patch in a printer A.
Figure 4:
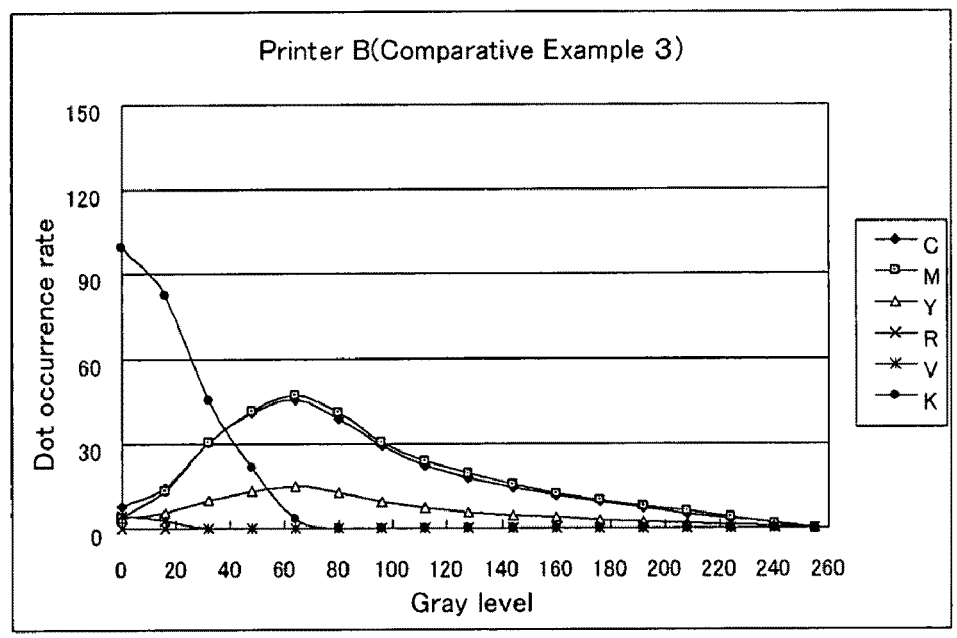
FIG. 4 is a view showing a relationship between a use amount of an ink and a gray level of each ink composition at preparation of a better gray scale patch in a printer B.

As shown in Table 10, in the printer A, result was A as being Δa*b* of not more than 2 in all patches, while result was C in the case of use of the printer B. From the foregoing, it was seen that, according to the ink set using the printer A, a preferable gray scale is stably obtained in a non-glossy medium such as a photomat paper. A relationship between an ink use amount of each ink composition and a gray level at preparation of a gray scale patch which is better in printers A and B is exemplified in FIG. 3 and FIG. 4.

Regarding each ink composition of black ink compositions K1, K2, K3 and K10, using an ink jet printer A (PK-G900; manufactured by Seiko Epson Corporation), a printing duty was printed on two kinds of exclusive use recording papers (photomat paper, and PM photographic paper (glossy paper), both manufactured by Seiko Epson Corporation) in a range of 10 to 100% at resolution of 1440×720, and color measurement was performed using Gretagmacbeth SPM50 manufactured by Gretag to measure an optical concentration. Color measuring condition was such that a light source was D50, a white standard was absolute white without a light source filter, and a field angle was 2 degree. Results are shown in Table 11 as well as FIG. 5 and FIG. 6.

TABLE 11

|  | K1 | K2 | K3 | K10 |
|---|---|---|---|---|
| MaxOD value (PM photographic paper) | 2.30 | 1.40 | 0.53 | 2.04 |
| MaxOD value (Photomat paper) | 1.40 | 1.23 | 0.75 | 1.80 |

Figure 5:
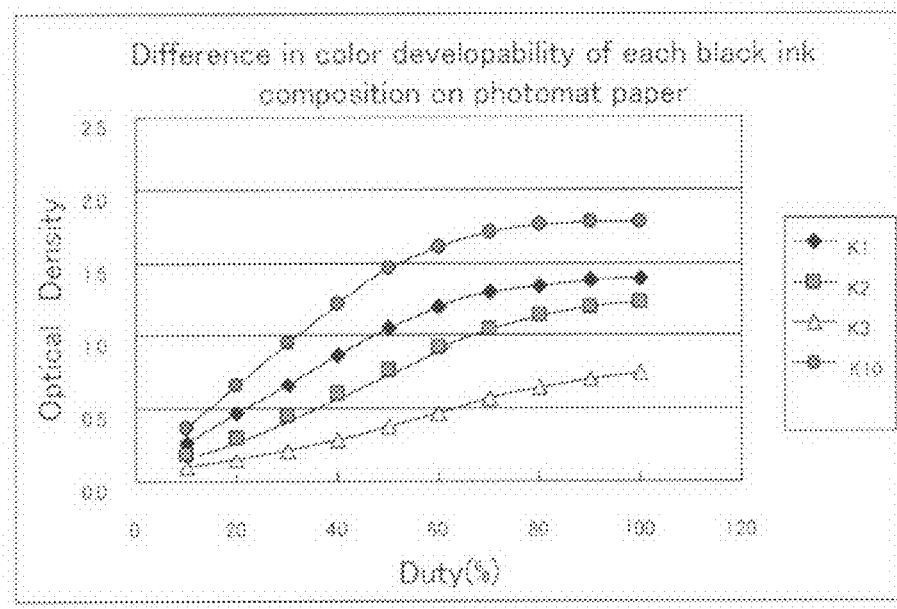
FIG. 5 is a view showing a relationship between printing duty and an optical concentration of various black ink compositions.
Figure 6:
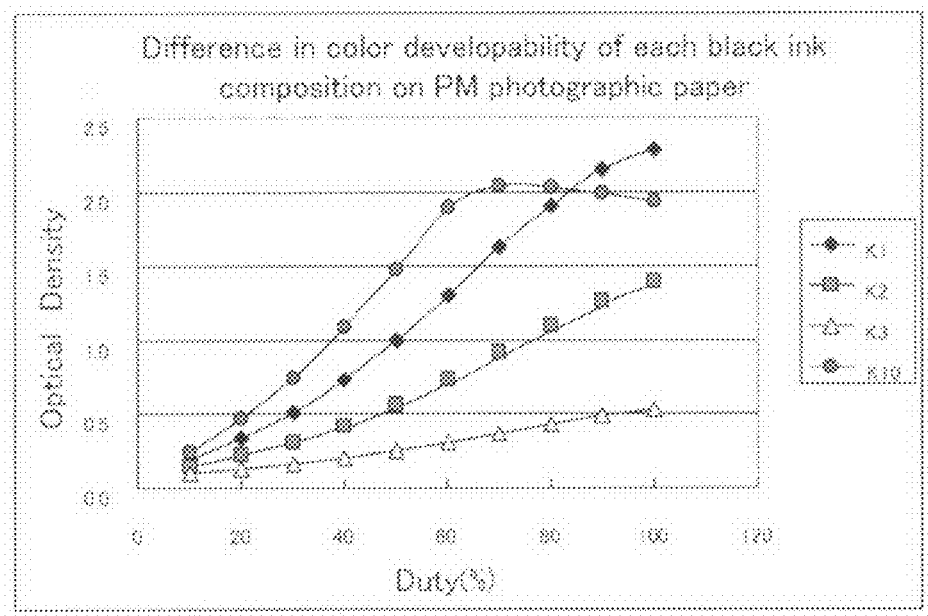
FIG. 6 is a view showing a relationship between printing duty and an optical concentration of various black ink compositions.
Figure 7:
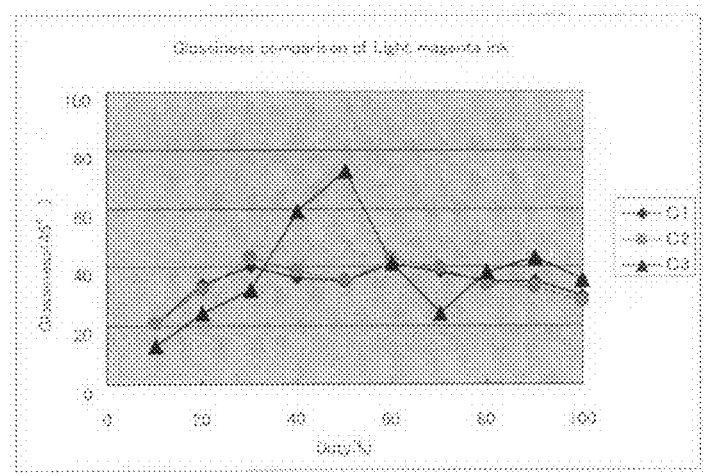
FIG. 7 is a view showing a relationship between printing duty and glossiness of a light magenta ink composition.
Figure 8:
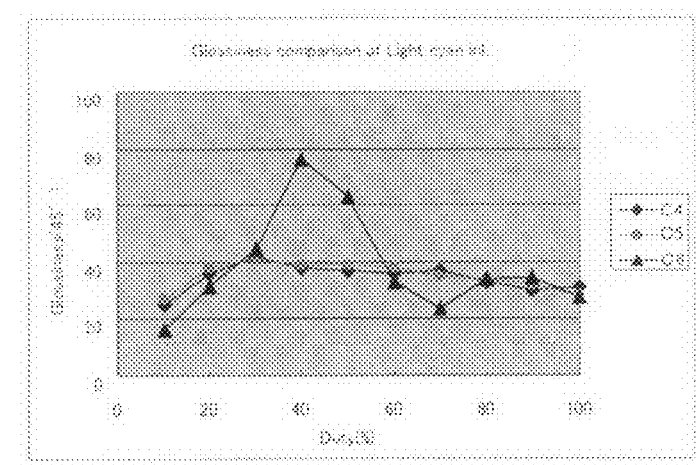
FIG. 8 is a view showing a relationship between printing duty and glossiness of a light cyan ink composition.
Figure 9:
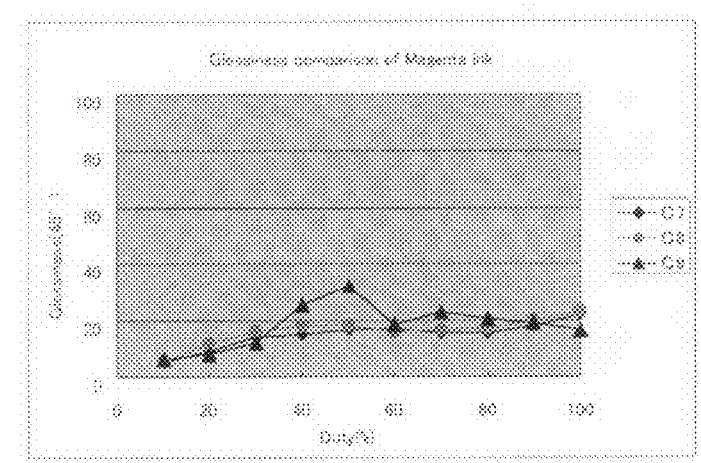
FIG. 9 is a view showing a relationship between printing duty and glossiness of a magenta ink composition.
Figure 10:
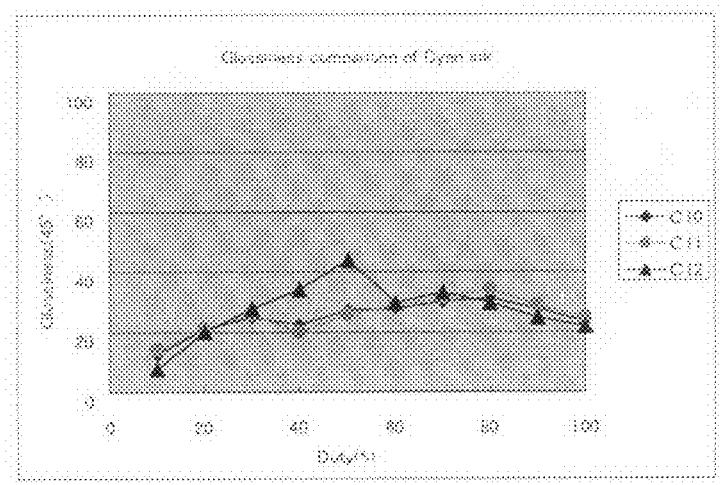
FIG. 10 is a view showing a relationship between printing duty and glossiness of a cyan ink composition.
Figure 11:
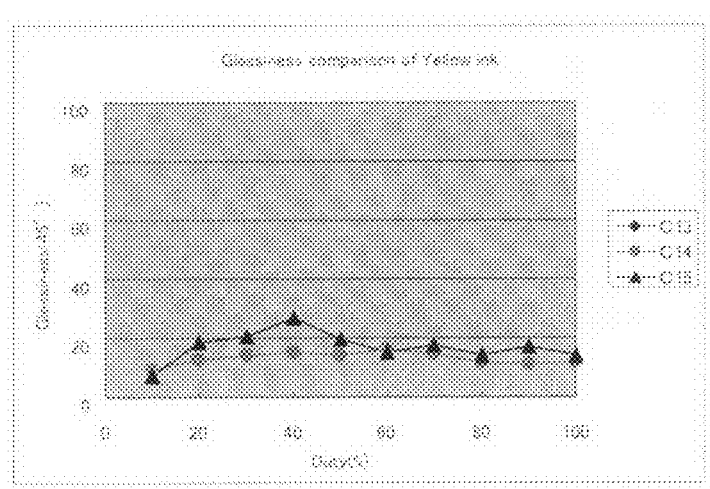
FIG. 11 is a view showing a relationship between printing duty and glossiness of a yellow ink composition.

As shown in Table 11 as well as FIG. 5 and FIG. 6, the black ink composition K1 showed an optical concentration excellent in the PM photographic paper, and the black ink composition K10 showed an optical concentration excellent in the photomat paper. Therefore, it was seen that, by using the black ink composition K1 and the black ink composition K10 on a glossy medium and a non-glossy medium, respectively, a better gray scale recorded image having no surface defect is obtained regardless of glossiness of a medium, and, at the same time, a recorded image of a better optical concentration is obtained.

Example III (1) Preparation of Aged Water-Soluble Polyurethane Resin Solution

A polyurethane resin composition (resin solution) having a resin solid matter of 15% of a water-dispersible polyester-based polyurethane resin (acid value 50, triethylamine neutralized) was prepared to a composition shown in Table 12. This resin solution was filled into a sealed container, and an aging step was performed by allowing to stand this under condition also shown in Table 12 to obtain a polyurethane resin aqueous solution. This resin aqueous solution contained 1,2-hexanediol at 33.3% relative to a water-soluble polyurethane resin solid matter. The water-soluble polyurethane resin aqueous solution exhibited a high viscosity before initiation of an aging step, but a viscosity was remarkably reduced after passage of 5 days after initiation of aging, thereafter, the viscosity was stabilized, and the solution became a liquid having substantially no viscosity change at completion of the aging step.

TABLE 12

Preparation of aged polyurethane resin aqueous solution

| | Adjusted resin aqueous solution | | | | |
|---|---|---|---|---|---|
| | PU | 1,2-HG | Glycerin | Water | Aging condition |
| Aged PU resin aqueous solution | 15 | 5 | 10 | 70 | 70° C. × 7 Days |

(Weight %)

(2) Preparation of pH-Adjusted Resin Emulsion

60 Parts of ethyl methacrylate, 36 parts of methyl methacrylate, 4 parts of methacrylic acid, 3 parts of octyl thioglycolate as a molecular weight adjusting agent, 1 part of polyvinyl alcohol and 280 parts of ion-exchanged water were mixed and stirred to prepare a dispersion of a monomer mixture. Another reactor equipped with a stirrer was charged with 130 parts of ion-exchanged water and 2 parts of potassium persulfate, a temperature was elevated to 80° C., and the dispersion of a monomer mixture was continuously added over 4 hours to polymerize it. After completion of continuous addition, a post-reaction was performed at 80° C. for 30 minutes. A polymerization conversion rate was not less than 99%. Then, an aqueous 10% sodium hydroxide solution at an amount corresponding to sodium hydroxide at an equivalent molar amount to placed methacrylic acid was added to a reactor, this was further heat-treated at 80° C. for 1 hour, and a suitable amount of ion-exchanged water was added to obtain a pH-adjusted resin emulsion A having a solid matter concentration of 15%. An acid value of this pH-adjusted resin emulsion A was 30.

(3) Preparation of Black Ink Composition

Then, according to a composition described in the following Table 13, four kinds of black ink compositions (K11 to K14) and two kinds of black ink compositions (K15, K16) were prepared. Specifically, a pigment (carbon black, Pigment Blue 15:3) and a water-soluble resin (dispersant) shown in Table 13 were mixed to prepare a pigment dispersion, the aged polyurethane resin aqueous solution prepared in (1) or the pH-adjusted resin emulsion A was further added, and this was dispersed together with glass beads [diameter=1.7 mm; 1.5-fold amount (weight) of mixture] in a sand mill (manufactured by Yasukawa Seisakusho) for 2 hours to obtain six kinds of black ink compositions. That is, K11, K13 (Example) and K15 (Comparative Example) as three kinds of intermediate concentrated black ink compositions for intermediate graduation, and further, K12, K14 (Example) and K16 (Comparative Example) as three kinds of low concentrated black ink compositions were obtained. As the water-soluble resin (dispersant) described in Table 13, a styrene-acrylic acid copolymer (molecular weight=15000; acid value=100) was used. HS-500 is a solvent containing a sugar as a main component.

TABLE 13

Water-soluble polyurethane resin aqueous solution after aging

| | Ink No. | | | | | |
|---|---|---|---|---|---|---|
| | K11 | K12 | K13 | K14 | K15 | K16 |
| Carbon black | 0.73 | 0.21 | 0.72 | 0.20 | 0.8 | 0.20 |
| Pigment blue 15:3 | 0.09 | 0.03 | — | — | — | — |
| Carbon black (self-dispersion type) | — | — | — | — | — | — |
| Water-soluble resin (dispersant) | 0.81 | 0.24 | 0.72 | 0.20 | 0.4 | 0.1 |
| Water-soluble polyurethane resin aqueous solution (solid matter 15%) | — | — | — | — | — | — |
| Water-soluble polyurethane resin aqueous solution* after aging | 6.67 | 20 | 6.67 | 20 | — | — |
| pH-adjusted resin emulsion A (solid matter15%) | — | — | — | — | 2 | 13.3 |
| AQ593 (solid matter30%) | 3.33 | 5 | 3.33 | 5 | 6.7 | 9.9 |
| HS-500 (Hayashibara Biochemical Labs., Inc.) | — | — | — | — | 5 | 5 |
| Glycerin | 20 | 16 | 21 | 15 | 19 | 17 |
| 1,2-Hexanediol | 4.67 | 4 | 4.67 | 4 | 5 | 5 |
| Triethylene glycol monobutyl ether | — | — | — | — | — | — |
| 2-pryrrolidone | — | — | — | — | — | — |
| Triethylene glycol | — | — | — | — | — | — |
| Triethanolamine | 0.9 | 0.9 | 0.9 | 0.9 | 0.9 | 0.9 |
| BYK348 | 0.5 | 0.5 | 0.5 | 0.5 | 0.5 | 0.5 |
| Olefine E1010 | — | — | — | — | — | — |
| EDTA | 0.02 | 0.02 | 0.02 | 0.02 | 0.02 | 0.02 |
| Pure water | Residual quantity | Residual quantity | Residual quantity | Residual quantity | Residual quantity | Residual quantity |
| Total (Weight %) | 100 | 100 | 100 | 100 | 100 | 100 |
| Additional amount of polyurethane resin in ink(%) | 1 | 3 | 1 | 3 | 0 | 0 |

*Resin solid matter15%

(4) Construction of Ink Set

The prepared black ink composition, and a light cyan ink composition, a light magenta ink composition and a yellow ink composition were combined as shown in Table 14 to construct ink sets of Examples 4 to 7 and Comparative Examples 4 to 6. Regarding black ink compositions K1 to K9, the same compositions as those already prepared in Examples 1 and 2 were used.

TABLE 14

| Ink set | High concentrated Bk | Intermediate concentrated Bk | Low concentrated Bk | Lc | Lm | Y |
|---|---|---|---|---|---|---|
| Example 4 | K1 | K2 | K3 | Common | Common | Common |
| Example 5 | K1 | K4 | K5 | | | |
| Example 6 | K1 | K11 | K12 | | | |
| Example 7 | K1 | K13 | K14 | | | |
| Comparative Example 4 | K1 | K6 | K7 | | | |
| Comparative Example 5 | K1 | K8 | K9 | | | |
| Comparative Example 6 | K1 | K15 | K16 | | | |

(5) Assessment Method 1 (Phase Shift and Golden Gloss)

[1] Recording Method

Respective ink sets of Examples 4 to 7 and Comparative Examples 4 to 6 were assigned to various ink chambers of an exclusive use cartridge of an ink jet printer (PM-4000PX; manufactured by Seiko Epson Corporation), and filled therein as shown in Table 15. Outputting was performed as in Examples 1 and 2 regarding each ink set.

TABLE 15

Assessment of phase shift . golden gloss PX4000PX

| Ink composition used | Ink chamber used |
|---|---|
| High concentrated black ink composition(K1) | Black ink chamber |
| Intermediate concentrated black ink composition(K2, K4, K6, K8, K11, K13, K15) | Gray ink chamber |

TABLE 15-continued

Assessment of phase shift . golden gloss PX4000PX

| Ink composition used | Ink chamber used |
|---|---|
| Low concentrated black ink composition(K3, K5, K7, K9, K12, K14, K16) | Cyan ink chamber |
| Light cyan ink composition | Light cyan ink chamber |
| Light magenta ink composition | Magenta ink chamber |
| Yellow ink composition | Light magenta ink chamber |

[2] Assessment of Confirmation of Phase Shift and Golden Gloss

Assessment of phase shift and assessment of golden gloss was performed as in Examples 1 and 2, respectively, by five observers. Results are shown in Table 16.

TABLE 16

| Assessment item | Example | | | | Comparative Example | | |
|---|---|---|---|---|---|---|---|
| | 4 | 5 | 6 | 7 | 4 | 5 | 6 |
| Confirmation of phase shift | 0/5 | 0/5 | 0/5 | 0/5 | 4/5 | 5/5 | 0/5 |
| Confirmation of golden gloss | 0/5 | 0/5 | 0/5 | 0/5 | 5/5 | 5/5 | 0/5 |

As shown in Table 16, it was seen that, according to ink sets of Examples, phase shift and golden gloss were avoided in all cases. That is, it was seen that, even when a water-soluble polyurethane resin solution or an aged water-soluble polyurethane resin solution is used in place of the pH-adjusted resin emulsion A, phase shift and golden gloss are improved.

(6) Assessment Method 2 (Surface Defect)

[1] Recording Method

Respective ink sets of Examples 4 to 7 and Comparative Examples 4 to 6 were filled into various ink chambers of an exclusive use cartridge of an ink jet printer (PX-G900; manufactured by Seiko Epson Corporation) at an assignment shown in Table 17. Outputting was performed as in Examples 1 and 2.

TABLE 17

| Assessment of surface defect G900 | |
|---|---|
| Ink composition used | Ink chamber used |
| High concentrated black ink composition(K1) | Black ink chamber |
| Intermediate concentrated black ink composition(K2, K4, K6, K8, K11, K13, K15) | Mat black ink chamber |
| Low concentrated black ink composition(K3, K5, K7, K9, K12, K14, K16) | Yellow ink chamber |
| Cyan ink composition | Red ink chamber |
| Light cyan ink composition | Cyan ink chamber |
| Magenta ink composition | Blue ink chamber |
| Light magenta ink composition | Magenta ink chamber |
| Yellow ink composition | Gloss optimizer ink chamber |

[2] Assessment of Confirmation of Surface Defect

Regarding recorded matters after continuous printing, a surface defect consisting of a contact trace of a recording paper holding member of outputted matters was observed by five observers. Results are shown in Table 18.

TABLE 18

| Assessment item | Example | | | | Comparative Example | | |
|---|---|---|---|---|---|---|---|
| | 4 | 5 | 6 | 7 | 4 | 5 | 6 |
| Confirmation of surface defect | 0/5 | 0/5 | 0/5 | 0/5 | 5/5 | 5/5 | 5/5 |

As shown in Table 18, it was seen that, according to ink sets of Examples, a surface defect such as a roller trace was avoided over a wide gray level. That is, it was seen that, by using a water-soluble polyurethane resin solution or an aged water-soluble polyurethane resin composition in place of the pH-adjusted resin emulsion A, phase shifting and golden gloss are improved and, at the same time, a recorded matter having a high quality surface without a surface defect can be provided.

(7) Assessment Method 3 (Ink Storage Stability)

Then, regarding various black ink compositions (K2 to K9, K11 to K16) used in ink sets of Examples (Examples 4 to 7) and ink sets of Comparative Examples (Comparative Examples 4 to 6), ink storage stability was assessed. In the assessment method, immediately after preparation, 50 cc of an aqueous ink composition was sealed into an ink pack, and this was left to stand for 6 days (144 hours) under environment of 70° C. Viscosities of the ink composition before and after leaving to stand were measured (measuring temperature 20° C.) using a viscoelasticity testing machine manufactured by Physica and a viscosity change rate ($\Delta V$) was obtained by the following equation. The viscosity change rate was assessed based on the following standard. Results are shown in Table 19.

$$\Delta V(\%) = |V - V_0|/V_0 \times 100$$

Wherein $V_0$ is a viscosity at leaving to stand, and V is a viscosity at passage of 6 days.

Assessment A: Change in a viscosity of an ink was less than 4%.

Assessment B: Change in a viscosity of an ink was not less than 4% and less than 7%.

Assessment C: Change in a viscosity of an ink was not less than 7%.

TABLE 19

| Result of storage stability of black ink composition | | |
|---|---|---|
| Ink composition | Kind of ink | Storage stability (Ink) |
| K2 | Intermediate concentrated Bk | B |
| K3 | Low concentrated Bk | C |
| K4 | Intermediate concentrated Bk | B |
| K5 | Low concentrated Bk | C |
| K11 | Intermediate concentrated Bk | A |
| K12 | Low concentrated Bk | A |
| K13 | Intermediate concentrated Bk | A |
| K14 | Low concentrated Bk | A |
| K6 | Intermediate concentrated Bk | A |
| K7 | Low concentrated Bk | A |
| K8 | Intermediate concentrated Bk | A |
| K9 | Low concentrated Bk | A |
| K15 | Intermediate concentrated Bk | A |
| K16 | Low concentrated Bk | A |

As shown in Table 19, black ink compositions (K11 to K14) using an aged water-soluble polyurethane resin exhibited better storage stability. To the contrary, all of black ink compositions K2 to K5 using a not aged water-soluble polyurethane resin had not better storage stability. Thereby, it was seen that better storage stability is obtained by using an aged water-soluble polyurethane resin aqueous solution. In addition, black ink compositions (K6 to K9 and K15 and K16 (using pH-adjusted resin emulsion A)) not using a water-soluble polyurethane resin also existed better storage stability, and it is clear that use of a water-soluble polyurethane resin reduces storage stability of an ink composition.

In addition, results of the assessment methods 1 to 3 are shown in Table 20, summarizing the black ink set.

TABLE 20

|  | Resin used for ink composition | Surface glossiness | | | Ink storage stability | |
|---|---|---|---|---|---|---|
|  |  | Phase shift | Golden gloss | Surface defect | Intermediate concentrated Bk | Low concentrated Bk |
| Example 4 | Polyurethane resin aqueous solution | 0/5 | 0/5 | 0/5 | B | C |
| Example 5 | Polyurethane resin aqueous solution | 0/5 | 0/5 | 0/5 | B | C |
| Example 6 | Aged polyurethane resin aqueous solution | 0/5 | 0/5 | 0/5 | A | A |
| Example 7 | Aged polyurethane resin aqueous solution | 0/5 | 0/5 | 0/5 | A | A |
| Comparative Example 4 | None | 4/5 | 5/5 | 5/5 | A | A |
| Comparative Example 5 | None | 5/5 | 5/5 | 5/5 | A | A |
| Comparative Example 6 | pH-adjusted resin emulsion A | 0/5 | 0/5 | 5/5 | A | A |

As shown in Table 20, it was seen that ink sets of Examples 6 to 7 with a black ink composition using an aged water-soluble polyurethane resin have excellent properties (improvement in phase shift and golden gloss as well as suppression of surface defect) due to use of a water-soluble polyurethane resin and, at the same time, have better storage stability, overcoming storage unstability due to a water-soluble polyurethane resin. That is, by using an aged water-soluble polyurethane resin, storage stability can be improved while better surface property obtained by a water-soluble polyurethane resin is maintained.

Example IV

In the following Examples, various color ink compositions were prepared, and uneven glossiness and storage stability were assessed.

(1) Preparation of Color Ink Composition

According to a composition shown in Table 21, ten kinds of color ink compositions of Example and five kinds of color ink compositions of Comparative Example were prepared. Specifically, various pigments and a water-soluble resin (dispersant) shown in Table 21 were mixed to prepare a pigment dispersion solution, the aged polyurethane resin aqueous solution prepared in Example III or a polyurethane resin aqueous solution before the aging was further added, and this was dispersed together with glass beads [diameter=1.7 mm; 1.5-fold amount (weight) of mixture] in a sand mill (manufactured by Yasukawa Seisakusho) for 2 hours to obtain a total of 15 kinds of color ink compositions. As the water-soluble resin (dispersant) described in Table 21, a styrene-acrylic acid copolymer (molecular weight=15000; acid value=100) was used.

TABLE 21

Color ink composition

|  | Ink No. | | | | | | | | |
|---|---|---|---|---|---|---|---|---|---|
|  | C1 | C2 | C3 | C4 | C5 | C6 | C7 | C8 | C9 |
| Pigment violet 19 | 1.0 | 1.0 | 1.0 |  |  |  | 5.5 | 5.5 | 5.5 |
| Pigment blue 15:3 |  |  |  | 1.0 | 1.0 | 1.0 |  |  |  |
| Pigment yellow 74 |  |  |  |  |  |  |  |  |  |
| Water-soluble resin (dispersant) | 0.15 | 0.15 | 0.15 | 0.3 | 0.3 | 0.3 | 0.15 | 0.15 | 0.15 |
| Water-soluble polyurethane resin aqueous solution (solid matter 15%) | 6.67 |  |  | 6.67 |  |  | 5.5 |  |  |
| Water-soluble polyurethane resin aqueous solution* after aging |  | 6.67 |  |  | 6.67 |  |  | 5.5 |  |
| AQ593 (solid matter 30%) | 0.67 | 0.67 | 0.67 | 0.67 | 0.67 | 0.67 |  |  |  |
| Glycerin | 19 | 19 | 20 | 19 | 20 | 20 | 14.5 | 14.5 | 18 |
| 1,2-Hexanediol | 4.75 | 4.75 | 5 | 4.75 | 4.75 | 5 | 4.7 | 4.7 | 5 |
| Triethanolamine | 0.9 | 0.9 | 0.9 | 0.9 | 0.9 | 0.9 | 0.9 | 0.9 | 0.9 |
| BYK348 | 0.5 | 0.5 | 0.5 | 0.5 | 0.5 | 0.5 | 0.8 | 0.8 | 0.8 |
| EDTA | 0.02 | 0.02 | 0.02 | 0.02 | 0.02 | 0.02 | 0.02 | 0.02 | 0.02 |
| Pure water | Residual quantity | Residual quantity | Residual quantity | Residual quantity | Residual quantity | Residual quantity | Residual quantity | Residual quantity | Residual quantity |
| Total (Weight %) | 100 | 100 | 100 | 100 | 100 | 100 | 100 | 100 | 100 |
| Additional amount of polyurethane resin in ink (%) | 1.0 | 1.0 | 0.0 | 1.0 | 1.0 | 0.0 | 0.8 | 0.8 | 0.0 |

|  | Ink No. | | | | | |
|---|---|---|---|---|---|---|
|  | C10 | C11 | C12 | C13 | C14 | C15 |
| Pigment violet 19 |  |  |  |  |  |  |
| Pigment blue 15:3 | 4.0 | 4.0 | 4.0 |  |  |  |
| Pigment yellow 74 |  |  |  | 5.0 | 5.0 | 5.0 |
| Water-soluble resin (dispersant) | 0.3 | 0.3 | 0.3 | 0.25 | 0.25 | 0.25 |
| Water-soluble polyurethane resin aqueous solution (solid matter 15%) | 8.0 |  |  | 6.67 |  |  |

TABLE 21-continued

| | Color ink composition | | | | | |
|---|---|---|---|---|---|---|
| Water-soluble polyurethane resin aqueous solution* after aging | | 8.0 | | | 6.67 | |
| AQ593 (solid matter 30%) | | | | | | |
| Glycerin | 9 | 9 | 15 | 13.5 | 13.5 | 18 |
| 1,2-Hexanediol | 4.6 | 4.6 | 5 | 4.67 | 4.67 | 5 |
| Triethanolamine | 0.9 | 0.9 | 0.9 | 0.9 | 0.9 | 0.9 |
| BYK348 | 0.5 | 0.5 | 0.5 | 0.5 | 0.5 | 0.5 |
| EDTA | 0.02 | 0.02 | 0.02 | 0.02 | 0.02 | 0.02 |
| Pure water | Residual quantity | Residual quantity | Residual quantity | Residual quantity | Residual quantity | Residual quantity |
| Total (Weight %) | 100 | 100 | 100 | 100 | 100 | 100 |
| Additional amount of polyurethane resin in ink (%) | 1.2 | 1.2 | 0.0 | 1.0 | 1.0 | 0.0 |

*Resin solid matter 15%

(2) Assessment Method 1 (Uneven Glossiness)

Prepared various colored ink compositions (C1 to C15) and black ink compositions (K1 to K3, K6, K7, K11 and K12, see Examples I and III) were assigned to various ink chambers of an exclusive use cartridge of an ink jet printer (PM-G900; manufactured by Seiko Epson Corporation), and filled therein as shown in Table 22.

TABLE 22

| Measurement of surface glossiness | |
|---|---|
| Ink composition used | Ink chamber used |
| High concentrated black ink composition(K1) | Black ink chamber |
| Intermediate concentrated black ink composition(K2, K6, K11) | Mat black ink chamber |
| Low concentrated black ink composition(K3, K7, K12) | Yellow ink chamber |
| Cyan ink composition(C10, C11, C12) | Red ink chamber |
| Light cyan ink composition(C4, C5, C6) | Cyan ink chamber |
| Magenta ink composition(C7, C8, C9) | Blue ink chamber |
| Light magenta ink composition(C1, C2, C3) | Magenta ink chamber |
| Yellow ink composition(C13, C14, C15) | Gloss optimizer ink chamber |

Figure 12:
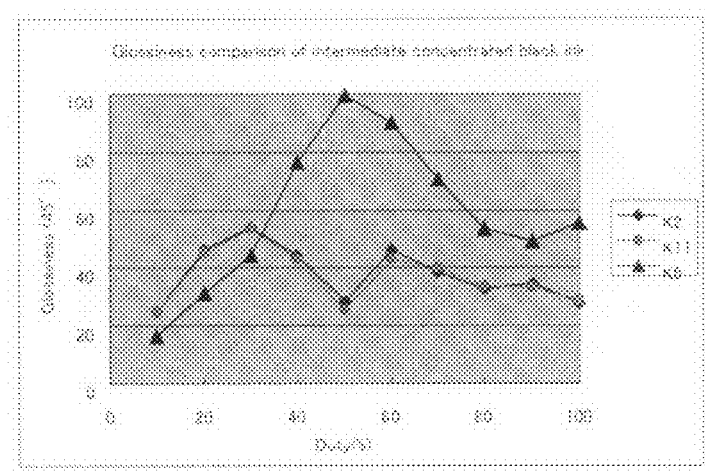
FIG. 12 is a view showing a relationship between printing duty and glossiness of a black ink composition having an intermediate concentration.
Figure 13:
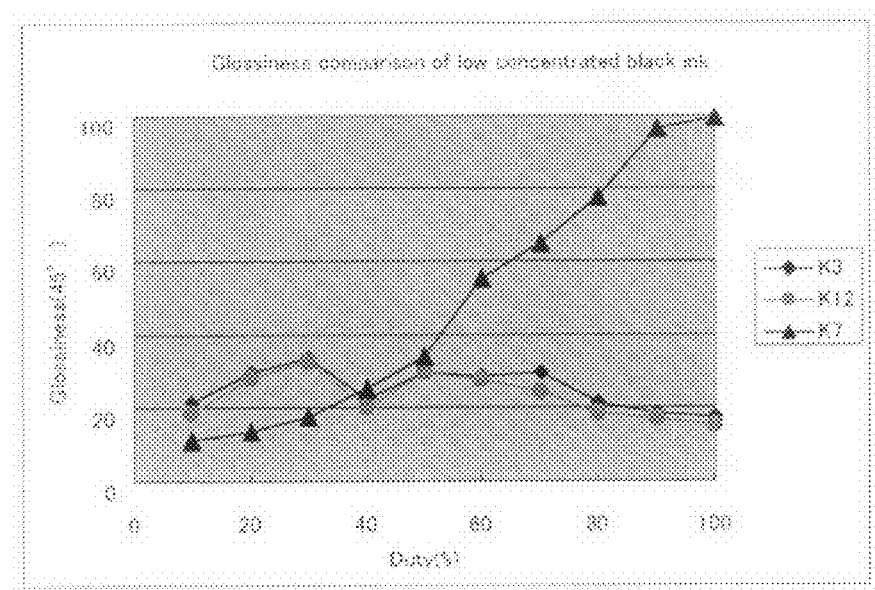
FIG. 13 is a view showing a relationship between printing duty and glossiness of a black ink composition having a low concentration.

In outputting, each ink was printed by 10 patches of Duty 10 to 100% on an ink jet exclusive use recording paper (PM photographic paper; manufactured by Seiko Epson Corporation) at resolution of 1440×720 dpi and a single color. After a printed sample was dried for 1 day, a 45 degree glossiness was measured using an automatically goniophotometer (GP-200; Murakami Color Research Laboratory). Results are shown in Table 23 and FIG. 7 to FIG. 11. In addition, regarding a black ink composition, a 45 degree glossiness was measured similarly. Results are shown in Table 24, and FIG. 12 and FIG. 13. In addition, results of assessment of uneven glossiness based on the following standard are shown in Table 25.

A: A difference between a Max value and a Min value at 45 degree gloss of 10 patches of Duty 10 to 100% is not less than 0 and less than 30.

B: A difference between a Max value and a Min value at 45 degree gloss of 10 patches of Duty 10 to 100% is not less than 30 and less than 60.

C: A difference between a Max value and a Min value at 45 degree gloss of 10 patches of Duty 10 to 100% is not less than 60.

TABLE 23

| | | | A change in a 45 degree glossiness by addition of resin (Color) | | | | | | | | | | | | |
|---|---|---|---|---|---|---|---|---|---|---|---|---|---|---|---|
| | Kind | | Duty(Duty: %) | | | | | | | | | | | | |
| Ink No. | of ink | Additive resin | 10 | 20 | 30 | 40 | 50 | 60 | 70 | 80 | 90 | 100 | Max | Min | Difference |
| C1 | Light | A | 21.0 | 34.0 | 40.0 | 36.0 | 35.0 | 41.0 | 38.0 | 35.0 | 35.0 | 30.0 | 41.0 | 21.0 | 20 |
| C2 | Magenta | B | 20.9 | 32.4 | 43.2 | 38.7 | 35.3 | 42.6 | 39.8 | 34.0 | 33.3 | 28.3 | 43.2 | 20.9 | 22 |
| C3 | | None | 13.0 | 24.0 | 32.2 | 59.0 | 73.0 | 41.0 | 24.1 | 38.2 | 43.2 | 35.8 | 73.0 | 13.0 | 60 |
| C4 | Light | A | 25.0 | 36.0 | 42.0 | 38.0 | 37.0 | 36.0 | 37.0 | 33.0 | 30.0 | 31.0 | 42.0 | 25.0 | 17 |
| C5 | Cyan | B | 27.0 | 38.0 | 41.0 | 39.0 | 39.0 | 38.0 | 35.0 | 34.0 | 32.0 | 28.0 | 41.0 | 27.0 | 14 |
| C6 | | None | 16.1 | 31.5 | 45.1 | 76.3 | 63.0 | 33.0 | 23.7 | 34.2 | 34.3 | 27.5 | 76.3 | 16.1 | 60 |
| C7 | Magenta | A | 5.3 | 9.5 | 14.2 | 15.3 | 16.8 | 17.1 | 15.5 | 15.6 | 18.2 | 22.0 | 22.0 | 5.3 | 17 |
| C8 | | B | 6.0 | 12.0 | 16.0 | 18.0 | 18.0 | 16.0 | 16.5 | 17.0 | 20.0 | 23.0 | 23.0 | 6.0 | 17 |
| C9 | | None | 6.2 | 8.2 | 12.5 | 25.3 | 32.3 | 18.5 | 23.2 | 20.8 | 18.9 | 16.7 | 32.3 | 6.2 | 26 |
| C10 | Cyan | A | 12.7 | 20.8 | 24.7 | 22.6 | 27.2 | 28.0 | 30.4 | 31.2 | 27.6 | 23.5 | 31.2 | 12.7 | 19 |
| C11 | | B | 14.0 | 21.0 | 26.0 | 20.0 | 26.0 | 29.0 | 31.0 | 34.0 | 29.0 | 25.0 | 34.0 | 14.0 | 20 |
| C12 | | None | 8.0 | 20.0 | 28.0 | 34.0 | 44.0 | 30.0 | 33.0 | 30.0 | 25.0 | 22.0 | 44.0 | 8.0 | 36 |
| C13 | Yellow | A | 9.2 | 12.5 | 13.9 | 15.2 | 13.9 | 16.0 | 14.8 | 11.8 | 11.0 | 11.7 | 16.0 | 9.2 | 7 |
| C14 | | B | 9.2 | 12.5 | 13.9 | 15.2 | 13.9 | 16.0 | 14.8 | 11.8 | 11.0 | 11.7 | 16.0 | 9.2 | 7 |
| C15 | | None | 7.3 | 18.4 | 20.6 | 26.8 | 19.3 | 15.2 | 17.6 | 14.3 | 17.0 | 14.3 | 26.8 | 7.3 | 20 |

A: Polyurethane resin
B: Aged polyurethane resin aqueous solution

TABLE 24

A change in a 45 degree glossiness by addition of resin (Black)

| Ink No. | Kind of ink | Additive resin | 10 | 20 | 30 | 40 | 50 | 60 | 70 | 80 | 90 | 100 | Max | Min | Difference |
|---|---|---|---|---|---|---|---|---|---|---|---|---|---|---|---|
| K2 | Intermediate | A | 25.0 | 46.2 | 54.3 | 44.2 | 28.4 | 46.5 | 38.5 | 32.7 | 34.5 | 27.9 | 54.3 | 25.0 | 29 |
| K11 | concerntrated | B | 24.8 | 45.3 | 53.6 | 42.7 | 25.5 | 43.0 | 40.2 | 33.8 | 33.3 | 29.0 | 53.6 | 24.8 | 29 |
| K6 | Bk | None | 16.6 | 31.2 | 44.6 | 76.5 | 99.4 | 90.5 | 70.5 | 53.8 | 49.1 | 55.5 | 99.4 | 16.6 | 83 |
| K3 | Low | A | 21.3 | 29.4 | 33.6 | 22.1 | 29.4 | 28.7 | 29.4 | 21.4 | 18.6 | 17.5 | 33.6 | 17.5 | 16 |
| K12 | concerntrated Bk | B | 18.6 | 28.0 | 32.5 | 20.1 | 29.5 | 27.9 | 24.2 | 18.7 | 16.9 | 15.3 | 32.5 | 15.3 | 17 |
| K7 | | None | 11.0 | 13.8 | 17.5 | 25.2 | 34.1 | 55.1 | 64.9 | 77.9 | 96.4 | 99.3 | 99.3 | 11.0 | 88 |

TABLE 25

Result of assessment of color ink composition

| Ink composition | Kind of ink | Resin used for ink composition | Result of ink storage stability | Result of assessment of uneven glossiness |
|---|---|---|---|---|
| C1 | Light | Polyurethane resin aqueous solution | B | A |
| C2 | Magenta | Aged Polyurethane resin aqueous solution | A | A |
| C3 | | None | A | C |
| C4 | Light | Polyurethane resin aqueous solution | B | A |
| C5 | Cyan | Aged Polyurethane resin aqueous solution | A | A |
| C6 | | None | A | C |
| C7 | Magenta | Polyurethane resin aqueous solution | B | A |
| C8 | | Aged Polyurethane resin aqueous solution | A | A |
| C9 | | None | A | A |
| C10 | Cyan | Polyurethane resin aqueous solution | B | A |
| C11 | | Aged Polyurethane resin aqueous solution | A | A |
| C12 | | None | A | B |
| C13 | Yellow | Polyurethane resin aqueous solution | B | A |
| C14 | | Aged Polyurethane resin aqueous solution | A | A |
| C15 | | None | A | A |

TABLE 26

Result of assessment of black ink composition

| Ink composition | Kind of ink | Resin used for ink composition | Result of ink storage stability | Result of assessment of uneven glossiness |
|---|---|---|---|---|
| K2 | Intermediate | Polyurethane resin aqueous solution | B | A |
| K11 | concerntrated | Aged Polyurethane resin aqueous solution | A | A |
| K6 | Bk | None | A | C |
| K3 | Low | Polyurethane resin aqueous solution | C | A |
| K12 | concerntrated | Aged Polyurethane resin aqueous solution | A | A |
| K7 | Bk | None | A | C |

As shown in Table 23 and FIGS. 7 to 11, color ink compositions of Example (C1, C2, C4, C5, C7, C8, C10, C11, C13 and C14) had a stable brilliance at a wide range of count amount as compared with color ink compositions (C3, C6, C9, C12 and C15) of Comparative Example, respectively. Particularly, it was seen that such the inconvenience was avoided or suppressed by using a water-soluble polyurethane resin although remarkable in color ink compositions having a low pigment concentration. In addition, as shown in Table 24 as well as FIG. 12 and FIG. 13, it was seen that uneven glossiness can be avoided or suppressed by using a water-soluble polyurethane resin also in a black ink composition.

(3) Assessment Method 2 (Ink Storage Stability)

Then, regarding color ink compositions of Example and color ink compositions of Comparative Example, ink storage stability was assessed. In the assessment method, 50 cc of an aqueous ink composition was sealed into an ink pack immediately after preparation thereof and this was left to stand for 6 days (144 hours) under environment at 70° C. Viscosities of an ink composition before and after leaving to stand were measured (measuring temperature 20° C.) using a viscoelasticity testing machine manufactured by Physica and a viscosity change rate (ΔV) was obtained by the following equation. A viscosity change rate was assessed based on the following standard. Results are also shown in Table 25.

$$\Delta V(\%) = |V - V_0|/V_0 \times 100$$

Wherein $V_0$ is a viscosity at leaving to stand, and V is a viscosity at passage of 6 days.

Assessment A: Change in a viscosity of an ink was less than 4%.

Assessment B: Change in a viscosity of an ink was not less than 4% and less than 7%.

Assessment C: Change in a viscosity of an ink was not less than 7%.

As shown in Table 25, color ink compositions (C2, C5, C8, C11 and C14) using an aged water-soluble polyurethane resin exhibited better storage stability. To the contrary, storage stability of color ink compositions (C1, C4, C7, C10 and C13) using a not aged water-soluble polyurethane resin was not good. Thereby, it was seen that, also in a color ink composition, better storage stability is obtained by using an aged water-soluble polyurethane resin aqueous solution. In addition, color ink compositions (C3, C6, C9, C12 and C15) not using a water-soluble polyurethane resin exhibit better storage stability, and it is clear that use of a water-soluble polyurethane resin reduces storage stability of an ink composition.

From the foregoing, as shown in Table 25, it was seen that, a color ink composition using an aged water-soluble polyurethane resin has excellent property (avoidance or suppression of uneven glossiness) due to a water-soluble polyurethane resin, and, at the same time, also has better storage stability, overcoming storage unstability due to a water-soluble polyurethane resin. That is, by using an aged water-soluble polyurethane resin, storage stability can be improved while better surface property obtained by a water-soluble polyurethane resin is maintained.

Example V

Preparation of Aged Resin

Samples A to F of a polyurethane resin composition (resin Solution) having a resin solid matter of a water-dispersible polyether-based polyurethane resin (molecular weight about 6000) of 15% were prepared so that they have a composition shown in Table 27. Samples A to C are an Example sample containing 1,2-hexanediol in a solution, and samples D to F are a Comparative Example sample not containing 1,2-hexanediol in a solution. These samples A to F were filled into a sealed container, this was allowed to stand under each condition also shown in Table 28, and an aging step was performed to obtain polyurethane resin aqueous solutions A to F. Resin aqueous solutions A to C contains 1,2-hexanediol at 33.3% relative to a water-soluble polyurethane resin solid matter.

which aging is performed with 1,2-hexanediol, a high viscosity is exhibited before initiation of an aging step, but thereafter, a viscosity was remarkably reduced after passage of 5 days and, thereafter, a viscosity was stabilized. On the other hand, in polyurethane resin aqueous solutions D to F of Comparative Example, at initiation of an aging step, and at any time thereafter, a viscosity was lower than that of Example, but a degree of reduction in a viscosity was small, and reduction was slow.

TABLE 28

| Kind of polyurethane resin aqueous solution | 1,2-HD | Aging time, day | Viscosity mPa·s |
|---|---|---|---|
| Initial | 5 wt % | 0 | 7.13 |
| A | ↓ | 5 | 5.32 |
| B | ↓ | 7 | 5.11 |
| C | ↓ | 9 | 4.95 |
| Initial | 0 wt % | 0 | 4.06 |
| D | ↓ | 5 | 3.82 |
| E | ↓ | 7 | 3.65 |
| F | ↓ | 9 | 3.51 |

(Preparation of Ink Composition)

Then, aqueous ink compositions having a composition shown in Table 29 were prepared. All of these aqueous ink compositions are a light black ink composition having a carbon black content of less than 0.4%. Specifically, respective incorporation components for each black ink composition described in the following Table 3 were mixed and dispersed together with glass beads [diameter=1.7 mm; 1.5-fold amount (weight) of mixture] in a sand mill (manufactured by Yasukawa Seisakusho) for 2 hours to prepare a total of six kinds of three kinds of Example and three kinds of Comparative Example of black ink compositions. As the water-soluble resin (dispersant) described in Table 3, a styrene-acrylic acid

TABLE 27

| | Kind of polyurethane resin aqueous solution | | | | | |
|---|---|---|---|---|---|---|
| Component | A | B | C | D | E | F |
| Water-soluble polyurethane resin | 15 | 15 | 15 | 15 | 15 | 15 |
| 1,2-Hexanediol | 5 | 5 | 5 | — | — | — |
| Pure water | Residual quantity | Residual quantity | Residual quantity | Residual quantity | Residual quantity | Residual quantity |
| Aging temperature ° C. | | | 70° C. | | | |
| Aging time (days, hr) | 5 days (120 hr) | 7 days (168 hr) | 9 days (216 hr) | 5 days (120 hr) | 7 days (168 hr) | 9 days (216 hr) |

Unit: wt %

Results (measuring temperature 20° C.) of viscosities of respective aged resin aqueous solutions A to F measured using a viscoelasticity testing machine manufactured by Physica are shown in Table 28. As shown in Table 28, in polyurethane resin aqueous solutions A to C of Example in copolymer (molecular weight=15000; acid value=100) was used. In addition, AQ593 is a polypropylene-type emulsion (manufactured by Bigchemie Japan), and BYK348 is a silicone-based surfactant. Furthermore, in Table 29, each ink further contains pure water to a total of 100 wt %.

TABLE 29

| | Kind of ink | | | | | |
|---|---|---|---|---|---|---|
| Ink component | Example 1 | Example 2 | Example 3 | Comparative Example 1 | Comparative Example 2 | Comparative Example 3 |
| Carbon black | 0.21 | 0.21 | 0.21 | 0.21 | 0.21 | 0.21 |
| Pigment blue 15:3 | 0.03 | 0.03 | 0.03 | 0.03 | 0.03 | 0.03 |
| Water-soluble resin (dispersant) | 0.24 | 0.24 | 0.24 | 0.24 | 0.24 | 0.24 |
| Polyurethane resin aqueous solution A (solid matter 15%) | 20 | | | | | |

TABLE 29-continued

|  | Kind of ink | | | | | |
|---|---|---|---|---|---|---|
| Ink component | Example 1 | Example 2 | Example 3 | Comparative Example 1 | Comparative Example 2 | Comparative Example 3 |
| Polyurethane resin aqueous solution B (solid matter 15%) |  | 20 |  |  |  |  |
| Polyurethane resin aqueous solution C (solid matter 15%) |  |  | 20 |  |  |  |
| Polyurethane resin aqueous solution D (solid matter 15%) |  |  |  | 20 |  |  |
| Polyurethane resin aqueous solution E (solid matter 15%) |  |  |  |  | 20 |  |
| Polyurethane resin aqueous solution F (solid matter 15%) |  |  |  |  |  | 20 |
| AQ593 (solid matter 30%) | 5 | 5 | 5 | 5 | 5 | 5 |
| Glycerin | 18 | 18 | 18 | 18 | 18 | 18 |
| 1,2-Hexanediol | 4 | 4 | 4 | 4 | 4 | 4 |
| Triethanolamine | 0.9 | 0.9 | 0.9 | 0.9 | 0.9 | 0.9 |
| BYK348 | 0.5 | 0.5 | 0.5 | 0.5 | 0.5 | 0.5 |
| EDTA | 0.02 | 0.02 | 0.02 | 0.02 | 0.02 | 0.02 |
| Pure water | Residual quantity | Residual quantity | Residual quantity | Residual quantity | Residual quantity | Residual quantity |
| Total (%) | 100 | 100 | 100 | 100 | 100 | 100 |

Unit: wt %

(Assessment of Ink Storage Stability)

Then, using the above-prepared aqueous ink compositions of Examples 1 to 3 and Comparative Examples 1 to 3, ink storage stability was assessed. In an assessment method, immediately after preparation of the aqueous ink composition, 50 cc of the composition was sealed into an ink pack and this was left to stand for 6 days (144 hours) under environment of 70° C. Viscosities of the ink composition before and after allowing to stand were measured (measuring temperature 20° C.) using a viscoelasticity testing machine manufactured by Physica, and a viscosity change rate ($\Delta V$) was obtained by the following equation. A viscosity change rate was assessed based on the following standard. Results are shown in Table 30.

$$\Delta V(\%) = |V - V_0|/V_0 \times 100$$

Wherein $V_0$ is a viscosity at leaving to stand, and V is a viscosity at passage of 6 days.

Assessment A: Change in a viscosity of an ink was less than 4%.
Assessment B: Change in a viscosity of an ink was not less than 4% and less than 7%.
Assessment C: Change in a viscosity of an ink was not less than 7%.

TABLE 30

| Kind of ink | Assessment |
|---|---|
| Example 1 | B |
| Example 2 | A |
| Example 3 | A |
| Comparative Example 1 | C |
| Comparative Example 2 | C |
| Comparative Example 3 | C |

As shown in Table 30, all of aqueous ink compositions of Examples 1 to 3 had a viscosity change rate of less than 7% and exhibited better stability. Among them, Examples 2 and 3 had the rate of less than 4% and exhibited further better stability. To the contrary, in all of aqueous ink compositions of Comparative Examples 1 to 3, a viscosity change rate was not less than 7%. From these things, it was shown that, accordingto the present Example, a water-soluble polyurethane resin, by mixing with a water-soluble organic solvent used in an aqueous ink composition in advance and aging this, stabilizes a viscosity of an aqueous ink composition at preparation of the composition as compared with aging with only a polyurethane resin and water. In addition, it was shown that it is preferable to age the water-soluble polyurethane resin with 1,2-hexanediol.

Furthermore, it was shown that, according to the present Example, by aging polyurethane resin compositions A to C of the present Example for not shorter than 5 days (120 hours) and not longer than 9 days (216 hours) at 70° C., a preferable light black ink composition is obtained. In addition, it was also shown that aging for not shorter than 7 days (168 hours) and not longer than 9 days (216 hours) at 70° C. is more preferable.

Example VI

Preparation of Aged Resin

Samples 2A to 2H of a water-soluble polyurethane resin composition (resin composition) having a resin solid matter of a water-dispersible polyether-based polyurethane resin (molecular weight about 6000) of 15% were prepared so that they have a composition shown in Table 31. Samples 2A to 2F are an Example sample containing 1,2-hexanediol and glycerin in a solution, a sample 2G is an Example sample containing only 1,2-hexanediol, and 2H is a Comparative Example sample not containing 1,2-hexanadiol in a solution. These samples 2A to 2H were filled into a sealed container, this was allowed to stand under each condition also shown in Table 31, and an aging step was performed to obtain polyurethane resin aqueous solutions 2A to 2H. Resin aqueous solutions 2A to 2G contained 1,2-hexanediol at 33.3% relative to a water-soluble polyurethane resin solid matter, 2A to 2C contained glycerin at 33.3% relative to a water-soluble polyurethane resin solid matter, and 2D to 2F contained the same at 66.6%.

TABLE 31

| Prepared resin aqueous solution | Addition ratio (wt. %) | | | | Aging condition |
|---|---|---|---|---|---|
| | Polyurethane resin | 1,2-Hexanediol | Glycerin | Water | |
| Resin 2A | 15 | 5 | 5 | 75 | 70° C. × 5 days |
| Resin 2B | 15 | 5 | 5 | 75 | 70° C. × 7 days |
| Resin 2C | 15 | 5 | 5 | 75 | 70° C. × 9 days |
| Resin 2D | 15 | 5 | 10 | 70 | 70° C. × 5 days |
| Resin 2E | 15 | 5 | 10 | 70 | 70° C. × 7 days |
| Resin 2F | 15 | 5 | 10 | 70 | 70° C. × 9 days |
| Resin 2G | 15 | 5 | 0 | 80 | 70° C. × 7 days |
| Resin 2H | 15 | 0 | 0 | 85 | 70° C. × 7 days |

(Low Temperature Storage Assessment)

Regarding the thus aged respective water-soluble polyurethane resin aqueous solutions 2A to 2H, low temperature storage was assessed by the following method. That is, 50 ml of a polyurethane resin aqueous solution was sealed into a glass bottle, this was allowed to stand for 4 days under the environment of −20° C., viscosities of the polyurethane resin aqueous solution before and after allowing to stand were measured (measuring temperature 20° C.) using a viscoelasticity testing machine manufactured by Physica, and a viscosity change rate was calculated. Low temperature assessment was performed based on the following standard. Results are shown in Table 32.

Assessment A: Change in a viscosity of a polyurethane resin aqueous solution is less than 6%.
Assessment B: Change in a viscosity of a polyurethane resin aqueous solution is not less than 6% and less than 10%.
Assessment C: Change in a viscosity of a polyurethane resin aqueous solution is not less than 10%.

TABLE 32

| Polyurethane resin aqueous solution | Result of low temperature storage |
|---|---|
| Resin 2A | A |
| Resin 2B | A |
| Resin 2C | A |
| Resin 2D | A |
| Resin 2E | A |
| Resin 2F | A |
| Resin 2G | C |
| Resin 2H | C |

As shown in Table 32, the result was as follows: Water-soluble polyurethane resin aqueous solutions of 2A to 2G containing 1,2-hexanediol and glycerin had better viscosity stability even when stored a low temperature, while in both of a resin aqueous solution 2G containing only 1,2-hexanediol and a resin aqueous solution 2H containing only a polyurethane resin and not containing an organic solvent, a viscosity was increased from freezing to thawing, and a viscosity change rate exceeded 10%.

(Preparation of Ink Composition)

Then, using prepared water-soluble polyurethane resin aqueous solutions 2A to 2H, aqueous ink compositions were prepared according to a composition shown in Table 33. These aqueous ink compositions are all a light black ink composition having a carbon black content of less than 0.4 wt %. Specifically, respective incorporation components for each black ink composition described in the following Table 7 were mixed, and this was dispersed with glass beads [diameter=1.7 mm; 1.5-fold amount (weight) of mixture] in a sand mill (manufactured by Yasukawa Seisakusho) for 2 hours to prepare a total of six kinds of three kinds of Example and three kinds of Comparative Example of black ink compositions. As the water-soluble resin (dispersant) described in Table 33, a styrene-acrylic acid copolymer (molecular weight=15000; acid value=100) was used. In addition, AQ593 is a polypropylene-type emulsion (manufactured by Bigchemie Japan) and BYK348 is a silicone-based surfactant. Furthermore, in Table 33, each ink further contains pure water to a total of 100 wt %.

TABLE 33

| | Example 4 | Example 5 | Example 6 | Example 7 | Example 8 | Example 9 | Example 10 | Comparative Example 4 |
|---|---|---|---|---|---|---|---|---|
| Carbon black | 0.21 | 0.21 | 0.21 | 0.21 | 0.21 | 0.21 | 0.21 | 0.21 |
| Pigment blue 15:3 | 0.03 | 0.03 | 0.03 | 0.03 | 0.03 | 0.03 | 0.03 | 0.03 |
| Water-soluble resin (dispersant) | 0.24 | 0.24 | 0.24 | 0.24 | 0.24 | 0.24 | 0.24 | 0.24 |
| Water-soluble polyurethane resin 2A (solid matter 15%) | 20 | | | | | | | |
| Water-soluble polyurethane resin 2B (solid matter 15%) | | 20 | | | | | | |
| Water-soluble polyurethane resin 2C (solid matter 15%) | | | 20 | | | | | |
| Water-soluble polyurethane resin 2D (solid matter 15%) | | | | 20 | | | | |
| Water-soluble polyurethane resin 2E (solid matter 15%) | | | | | 20 | | | |
| Water-soluble polyurethane resin 2F (solid matter 15%) | | | | | | 20 | | |
| Water-soluble polyurethane resin 2G (solid matter 15%) | | | | | | | 20 | |
| Water-soluble polyurethane resin 2H (solid matter 15%) | | | | | | | | 20 |

TABLE 33-continued

|  | Example 4 | Example 5 | Example 6 | Example 7 | Example 8 | Example 9 | Example 10 | Comparative Example 4 |
|---|---|---|---|---|---|---|---|---|
| AQ593 (solid matter 30%) | 5 | 5 | 5 | 5 | 5 | 5 | 5 | 5 |
| Glycerin | 18 | 18 | 18 | 18 | 18 | 18 | 18 | 18 |
| 1,2-Hexanediol | 4 | 4 | 4 | 5 | 5 | 5 | 5 | 5 |
| Triethanolamine | 0.9 | 0.9 | 0.9 | 0.9 | 0.9 | 0.9 | 0.9 | 0.9 |
| BYK348 | 0.5 | 0.5 | 0.5 | 0.5 | 0.5 | 0.5 | 0.5 | 0.5 |
| EDTA | 0.02 | 0.02 | 0.02 | 0.02 | 0.02 | 0.02 | 0.02 | 0.02 |
| Pure water | Residual quantity | Residual quantity | Residual quantity | Residual quantity | Residual quantity | Residual quantity | Residual quantity | Residual quantity |
| Total (%) | 100 | 100 | 100 | 100 | 100 | 100 | 100 | 100 |

(Weight %)

(Assessment of Ink Storage Stability)

Then, using aqueous ink compositions of Examples 4 to 10 and Comparative Example 4 using water-soluble polyurethane resin aqueous solutions 2A to 2H prepared by performing the aging step as described above, ink storage stability was assessed. In an assessment method, immediately after preparation of the aqueous ink composition, 50 cc of the composition was sealed into an ink pack, and left to stand for 6 days (144 hours) under the environment of 70° C. Viscosities of the ink composition before and after leaving to stand were measured (measuring temperature 20° C.) using a viscoelasticity testing machine manufactured by Physica, and a viscosity change rate (ΔV) was obtained by the following equation. A viscosity change rate was assessed based on the following standard. Results are shown in Table 34.

$$\Delta V(\%) = |V - V_0|/V_0 \times 100$$

Wherein $V_0$ is a viscosity at leaving to stand, and V is a viscosity at passage of 6 days.

Assessment A: Change in a viscosity of an ink was less than 4%.
Assessment B: Change in a viscosity of an ink was not less than 4% and less than 7%.
Assessment C: Change in a viscosity of an ink was not less than 7%.

TABLE 34

| Ink composition | Result of storage stability |
|---|---|
| Example 4 | B |
| Example 5 | A |
| Example 6 | A |
| Example 7 | B |
| Example 8 | A |
| Example 9 | A |
| Example 10 | A |
| Comparative Example 4 | C |

As shown in Table 34, all of aqueous ink compositions of Examples 4 to 10 had a viscosity change rate of less than 7% and exhibited better stability. Among them, Examples 5, 6, 8, 9 and 10 had the rate of less than 4% and exhibited further better stability. To the contrary, the aqueous ink composition of Comparative Example 4 had a viscosity change rate of not less than 7%. From these things, it was shown that a water-soluble polyurethane resin, by mixing with diols and triols used in an aqueous ink composition in advance and aging this, is excellent in low temperature storage as compared with aging with only a polyurethane resin and water, and as compared with aging of a polyurethane resin with 1,2-hexanediol and, at the same time, even when such triols are contained, it is not necessary to change the aging condition, and a viscosity of an aqueous ink composition is stabilized at preparation of the composition.

Example VII

Preparation of Ink Composition

Using aged resins 2E, 2G and 2H prepared in Example VI, a total of 15 kinds of Examples 11 to 20 and Comparative Examples 5 to 9 of aqueous color ink compositions were prepared according to a composition shown in Table 35. Specifically, respective incorporation components for each color ink composition described in Table 35 were mixed, and this was dispersed with glass beads [diameter=1.7 mm; 1.5-fold amount (weight)] in a sand mill (manufactured by Yasukawa Seisakusho) for 2 hours to prepare compositions. In addition, as the water-soluble resin (dispersant) described in Table 35, a styrene-acrylic acid copolymer (molecular weight=15000; acid value=100) was used.

TABLE 35

| Ink component | Example | | | | | |
|---|---|---|---|---|---|---|
|  | 11 | 12 | 13 | 14 | 15 | 16 |
| Pigment violet 19 | 1.0 | 1.0 |  |  | 5.5 | 5.5 |
| Pigment blue 15:3 |  |  | 1.0 | 1.0 |  |  |
| Pigment yellow |  |  |  |  |  |  |
| Water-soluble resin (dispersant) | 0.15 | 0.15 | 0.3 | 0.3 | 0.15 | 0.15 |
| Polyurethane resin aqueous solution 2E (solid matter 15%) | 6.67 |  | 6.67 |  | 5.5 |  |

TABLE 35-continued

| | | | | | | |
|---|---|---|---|---|---|---|
| Polyurethane resin aqueous solution 2G (solid matter 15%) | | 6.67 | | 6.67 | | 5.5 |
| Polyurethane resin aqueous solution 2H (solid matter 15%) | | | | | | |
| AQ593 (solid matter 30%) | 0.67 | 0.67 | 0.67 | 0.67 | | |
| Glycerin | 19 | 20 | 19 | 20 | 14.5 | 15 |
| 1,2-Hexanediol | 4.5 | 4.5 | 4.5 | 4.5 | 4.7 | 4.7 |
| Triethanolamine | 0.9 | 0.9 | 0.9 | 0.9 | 0.9 | 0.9 |
| BYK348 | 0.5 | 0.5 | 0.5 | 0.5 | 0.8 | 0.8 |
| EDTA | 0.02 | 0.02 | 0.02 | 0.02 | 0.02 | 0.02 |
| Pure water | Residual quantity | Residual quantity | Residual quantity | Residual quantity | Residual quantity | Residual quantity |
| Total (%) | 100 | 100 | 100 | 100 | 100 | 100 |
| Addition amount % of polyurethane resin in ink | 1.00 | 1.00 | 1.00 | 1.00 | 0.83 | 0.83 |

| | Example | | | | Comparative Example | | | | |
|---|---|---|---|---|---|---|---|---|---|
| Ink component | 17 | 18 | 19 | 20 | 5 | 6 | 7 | 8 | 9 |
| Pigment violet 19 | | | | | 1.0 | | 5.5 | | |
| Pigment blue 15:3 | 4.0 | 4.0 | | | | 1.0 | | 4.0 | |
| Pigment yellow | | | 5.0 | 5.0 | | | | | 5.0 |
| Water-soluble resin(dispersant) | 0.3 | 0.3 | 0.25 | 0.25 | 0.15 | 0.3 | 0.15 | 0.3 | 0.25 |
| Polyurethane resin aqueous solution 2E (solid matter 15%) | 8 | | 6.67 | | | | | | |
| Polyurethane resin aqueous solution 2G (solid matter 15%) | | 8 | | 6.67 | | | | | |
| Polyurethane resin aqueous solution 2H (solid matter 15%) | | | | | 6.67 | 6.67 | 5.5 | 8 | 6.67 |
| AQ593 (solid matter 30%) | | | | | 0.67 | 0.67 | | | |
| Glycerin | 9 | 10 | 13.5 | 14 | 20 | 20 | 15 | 10 | 14 |
| 1,2-Hexanediol | 4.6 | 4.6 | 4.67 | 4.67 | 5 | 5 | 5 | 5 | 5 |
| Triethanolamine | 0.9 | 0.9 | 0.9 | 0.9 | 0.9 | 0.9 | 0.9 | 0.9 | 0.9 |
| BYK348 | 0.5 | 0.5 | 0.5 | 0.5 | 0.5 | 0.5 | 0.8 | 0.5 | 0.5 |
| EDTA | 0.02 | 0.02 | 0.02 | 0.02 | 0.02 | 0.02 | 0.02 | 0.02 | 0.02 |
| Pure water | Residual quantity | Residual quantity | Residual quantity | Residual quantity | Residual quantity | Residual quantity | Residual quantity | Residual quantity | Residual quantity |
| Total (%) | 100 | 100 | 100 | 100 | 100 | 100 | 100 | 100 | 100 |
| Addition amount % of polyurethane resin in ink | 1.20 | 1.20 | 1.00 | 1.00 | 1.00 | 1.00 | 0.83 | 1.20 | 1.00 |

Unit: wt %

(Assessment of Ink Storage Stability)

Then, regarding a total of 15 kinds of color ink compositions of Examples 11 to 20 and Comparative Examples 5 to 9, ink storage stability was assessed.

Assessment was performed by sealing 50 cc of the aqueous ink composition into an ink pack immediately after preparation of the composition and leaving this to stand for 6 days (144 hours) under the environment of 70° C. Viscosities of the ink composition before and after leaving to stand were measured (measuring temperature 20° C.) using a viscoelasticity testing machine manufactured by Physica, and a viscosity change rate (ΔV) was obtained by the following equation. A viscosity change rate was assessed based on the following standard. Results are shown in Table 36.

$$\Delta V(\%) = |V - V_0|/V_0 \times 100$$

Wherein $V_0$ is a viscosity at leaving to stand, and V is a viscosity at passage of 6 days.

Assessment A: Change in a viscosity of an ink was less than 4%.

Assessment B: Change in a viscosity of an ink was not less than 4% and less than 7%.

Assessment C: Change in a viscosity of an ink was not less than 7%.

TABLE 36

| Kind of ink | | Assessment |
|---|---|---|
| Example | 11 | A |
| | 12 | A |
| | 13 | A |
| | 14 | A |
| | 15 | A |
| | 16 | A |
| | 17 | A |
| | 18 | A |
| | 19 | A |
| | 20 | A |
| Comparative Example | 5 | C |
| | 6 | C |
| | 7 | C |
| | 8 | C |
| | 9 | C |

As shown in Table 36, all of color ink compositions of Examples 11 to 20 had a viscosity change rate of less than 4% and exhibited better stability. To the contrary, in all of color ink compositions of Comparative Examples 5 to 9, a viscosity change rate was not less than 7%. From these things, it was shown that a water-soluble polyurethane resin, by mixing with diols or diols and triols used in an aqueous ink composition in advance and aging this, stabilizes a viscosity of an aqueous ink composition at preparation of the composition as compared with aging with only a polyurethane resin and water.

The present invention claims the benefit of priority from Japanese Patent Application No. 2005-042141 filed on Feb. 18, 2005, Japanese Patent Application No. 2005-065926 filed on Mar. 9, 2005, Japanese Patent Application No. 2005-137394 filed on May 10, 2005, Japanese Patent Application No. 2005-137395 filed on May 10, 2005, Japanese Patent Application No. 2006-039706 filed on Feb. 16, 2006, and Japanese Patent Application No. 2006-039707 filed on Feb. 16, 2006, the contents of all of which are incorporated by reference herein in their entirety.

INDUSTRIAL APPLICABILITY

The present invention is applicable to inks, printers, and a variety of printings.

The invention claimed is:

1. A black ink composition comprising water, carbon black, a fine particle emulsion which is a polyalkylene-type emulsion and a water-soluble polyurethane resin, wherein a content of the carbon black is less than 0.4% by weight, and the content of solid matter of the water-soluble polyurethane resin is not less than 7.5-fold of the content of the carbon black.

2. The black ink composition according to claim 1, wherein the solid matter of the water-soluble polyurethane resin is not less than 1% by weight and not more than 10% by weight.

3. The black ink composition according to claim 1, wherein a total content of the solid matter of the water-soluble polyurethane resin and the solid matter of the fine particle emulsion is not less than 0.5% by weight and not more than 20% by weight.

4. The black ink composition according to claim 1, wherein the composition contains a coloring agent for color complementarity.

5. The black ink composition according to claim 1, wherein the black ink composition is prepared by adding a polyurethane resin composition to other components of the black ink composition, the polyurethane resin composition comprising at least a part of the water-soluble polyurethane resin, a water-soluble organic solvent and water.

6. The black ink composition according to claim 5, wherein the water-soluble organic solvent is one or two or more kinds of diols.

7. The black ink composition according to claim 5, wherein the black ink composition contains the water-soluble organic solvent at not less than 10 wt% and not more than 50 wt% relative to a solid matter of the water-soluble polyurethane resin.

8. The black ink composition according to claim 5, wherein the water-soluble organic solvent contains one or two or more kinds of diols, and one or two or more kinds of triols.

9. The black ink composition according to claim 8, wherein the triols contain glycerin.

10. The black ink composition according to claim 8, wherein the black ink composition contains the triols at not less than 10 wt% and not more than 100 wt% relative to a solid matter of the water-soluble polyurethane resin.

11. The black ink composition according to claim 8, wherein the diols contain 1,2-hexanediol and the triols contain glycerin.

12. The black ink composition according to claim 5, wherein the polyurethane resin composition contains not less than 0.5 wt% and not more than 20 wt% of the water-soluble organic solvent.

13. The black ink composition according to claim 5, wherein the polyurethane resin composition contains not less than 5 wt% and not more than 50 wt% of the water-soluble polyurethane resin.

14. The composition according to claim 5, wherein the polyurethane resin composition is obtained by aging accompanying with heating.

15. The composition according to claim 5, wherein a viscosity change rate ($\Delta V$) obtained based on the following equation (1) from viscosities, obtained by sealing a prescribed amount of the polyurethane resin composition, allowing this to stand still at a constant temperature of 70° C.±3C° for 24 hours, and measuring viscosities at initiation of the allowing to stand still and after completion of the allowing to stand still, is not more than 2.5%.

16. The composition according to claim 1, which is an ink composition for ink jet recording.

17. The black ink composition according to claim 1, wherein a solid matter content of the fine particle emulsion is an amount which is 20-fold or more than the content of the carbon black, but less than 50-fold the content of the carbon black.

18. The composition according to claim 1, wherein the water-soluble polyurethane resin consists of a reaction product of a diisocyanate compound and a diol compound.

19. An ink set comprising:
one or two or more kinds of black ink compositions as defined in claim 1, and
other black ink composition having a higher carbon black concentration than a carbon black concentration of these black ink compositions.

20. The ink set according to claim 19, wherein the one or two or more kinds of the black ink compositions is a black ink composition having a carbon black content of less than 0.4% by weight, and a black ink composition having a carbon black content of not less than 0.4% by weight and less than 1.5% by weight, and the other black ink composition is a composition having a carbon black content of not less than 1.5% by weight.

21. The ink set according to claim 19, wherein the other black ink composition is a composition containing not less than 6% by weight of carbon black.

22. The ink set according to claim 21, wherein the other black ink composition is a composition containing self-dispersion carbon black.

23. The ink set according to claim 19, wherein the set contains a cyan ink composition, a magenta ink composition, and a yellow ink composition.

24. The ink set according to claim 23, wherein the set contains a light cyan ink composition, and a light magenta ink composition.

25. The ink set according to claim 23, wherein the color ink compositions other than the black ink composition contain a water-soluble polyurethane resin.

26. The ink set according to claim 25, wherein at least a part of the water-soluble polyurethane resin in the color ink composition contains a water-soluble polyurethane resin, a water-soluble organic solvent and water, and is added as a polyurethane resin composition having no substantial change in a viscosity.

27. A recording method of discharging droplets of an ink composition, and adhering the droplets to a recording medium to form in an image, comprising using an ink set as defined in claim 19.

28. A recorded matter having an image on a recording medium, comprising an image consisting of an adhesion layer of an ink composition contained in an ink set as defined in claim 19 on the recording medium.

29. A black ink composition comprising water, carbon black, a fine particle emulsion and a water-soluble polyurethane resin, wherein a content of the carbon black is less than 0.4% by weight, and the content of solid matter of the water-soluble polyurethane resin is not less than 7.5-fold of the content of the carbon black and wherein a solid matter content of the fine particle emulsion is an amount which is 20-fold or more than the content of the carbon black, but less than 50-fold the content of the carbon black.

* * * * *